United States Patent
Watanabe et al.

(10) Patent No.: US 12,487,487 B2
(45) Date of Patent: Dec. 2, 2025

(54) TRANSFLECTIVE LIQUID CRYSTAL DISPLAY DEVICE

(71) Applicant: Sharp Display Technology Corporation, Kameyama (JP)

(72) Inventors: Kouichi Watanabe, Kameyama (JP); Shinichi Terashita, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/765,408

(22) Filed: Jul. 8, 2024

(65) Prior Publication Data
US 2025/0076703 A1   Mar. 6, 2025

(30) Foreign Application Priority Data

Aug. 9, 2023   (JP) .............................. JP2023-130129

(51) Int. Cl.
  *G02F 1/1335*   (2006.01)
  *G02F 1/1333*   (2006.01)
  (Continued)

(52) U.S. Cl.
  CPC .. *G02F 1/133555* (2013.01); *G02F 1/133371* (2013.01); *G02F 1/13338* (2013.01);
  (Continued)

(58) Field of Classification Search
  CPC ........... G02F 1/13355; G02F 1/133555; G02F 1/133638; G02F 1/1396; G02F 1/134363; G02F 1/134372; G02F 1/134381
  (Continued)

(56) References Cited

U.S. PATENT DOCUMENTS

| 7,106,400 B1 | 9/2006 | Tsuda et al. |
| 2005/0264720 A1 | 12/2005 | Itou et al. |
| | (Continued) | |

FOREIGN PATENT DOCUMENTS

| JP | 3394926 B2 | 4/2003 |
| JP | 2005-338256 A | 12/2005 |
| | (Continued) | |

*Primary Examiner* — Jessica M Merlin
(74) *Attorney, Agent, or Firm* — ScienBiziP, P.C.

(57) ABSTRACT

A transflective liquid crystal display device includes a first polarizer, a first phase difference layer, a first substrate, a liquid crystal layer, a second substrate, a second phase difference layer, and a second polarizer. The first substrate includes a reflective layer, a pair of electrodes configured to generate a transverse electrical field in the liquid crystal layer, and a first horizontal alignment film. The second substrate includes a second horizontal alignment film. The first phase difference layer includes a first λ/2 plate and a first λ/4 plate. The second phase difference layer includes a second λ/2 plate and a second λ/4 plate. At least one of the first phase difference layer and the second phase difference layer further includes a positive C plate. The liquid crystal layer includes a liquid crystal material having a negative-type anisotropy of dielectric constant and takes a twist alignment when no voltage is applied. Each of pixels includes a reflective region in which light is reflected by the reflective layer to perform display and a transmissive region in which light is transmitted to perform display.

18 Claims, 73 Drawing Sheets

(51) Int. Cl.
 *G02F 1/13363* (2006.01)
 *G02F 1/1343* (2006.01)
(52) U.S. Cl.
 CPC .. *G02F 1/133531* (2021.01); *G02F 1/133638* (2021.01); *G02F 1/134309* (2013.01)
(58) Field of Classification Search
 USPC ........................................................ 349/114
 See application file for complete search history.

(56) References Cited

U.S. PATENT DOCUMENTS

| | | | |
|---|---|---|---|
| 2005/0264731 A1 | 12/2005 | Itou et al. | |
| 2006/0092356 A1* | 5/2006 | Morimoto | G02F 1/13363 349/114 |
| 2006/0192912 A1 | 8/2006 | Itou et al. | |
| 2012/0138922 A1 | 6/2012 | Yamazaki et al. | |
| 2013/0077034 A1* | 3/2013 | Jung | G02F 1/1345 349/122 |
| 2013/0214273 A1 | 8/2013 | Yamazaki et al. | |
| 2013/0320334 A1 | 12/2013 | Yamazaki et al. | |
| 2014/0183532 A1 | 7/2014 | Yamazaki et al. | |
| 2014/0286076 A1 | 9/2014 | Aoki et al. | |
| 2015/0179805 A1 | 6/2015 | Yamazaki et al. | |
| 2016/0240694 A1 | 8/2016 | Yamazaki et al. | |
| 2017/0033229 A1 | 2/2017 | Yamazaki et al. | |
| 2017/0309751 A1 | 10/2017 | Yamazaki et al. | |
| 2017/0309754 A1 | 10/2017 | Yamazaki et al. | |
| 2018/0308989 A1 | 10/2018 | Yamazaki et al. | |
| 2021/0159345 A1 | 5/2021 | Yamazaki et al. | |

FOREIGN PATENT DOCUMENTS

| | | | |
|---|---|---|---|
| JP | 2005-338264 A | 12/2005 | |
| JP | 2006-126551 A | 5/2006 | |
| JP | 2012-134475 A | 7/2012 | |
| JP | 2014-007399 A | 1/2014 | |
| JP | 2014-209727 A | 11/2014 | |
| WO | WO-2006064903 A1 * | 6/2006 | ........... G02B 6/0056 |

* cited by examiner

| | EXAMPLE 3-9 |
|---|---|
| WHITE BRIGHTNESS DISTRIBUTION DIAGRAM |  |
| TEST CELL No. | 9000 |
| OBLIQUE GAMMA CHARACTERISTICS |  |
| AZIMUTHAL DIRECTION III |  |
| AZIMUTHAL DIRECTION IV |  |

TRANSFLECTIVE LIQUID CRYSTAL DISPLAY DEVICE

CROSS-REFERENCE TO RELATED APPLICATIONS

This application claims the benefit of priority to Japanese Patent Application Number 2023-130129 filed on Aug. 9, 2023. The entire contents of the above-identified application are hereby incorporated by reference.

BACKGROUND

Technical Field

The disclosure described below relates to a transflective liquid crystal display device.

Liquid crystal display devices, which utilize a liquid crystal material to function as a display device, are generally classified into transmissive liquid crystal display devices and reflective liquid crystal display devices depending on a display method. The transmissive liquid crystal display devices are devices that perform display in a transmission mode in which transmitted light from backlight on a back face of a screen is used, and the reflective liquid crystal display devices are devices that perform display in a reflection mode in which external light (also referred to as ambient light) instead of the backlight is used. As a display device having the features described above, a transflective liquid crystal display device has been proposed in which each pixel has a region for performing display in the transmission mode and a region for performing display in the reflection mode.

Liquid crystal display devices may be roughly classified according to a liquid crystal driving method. For example, a vertical electrical field mode in which a liquid crystal layer is driven by an electrical field in a direction substantially perpendicular to a substrate plane to perform display, and a transverse electrical field mode in which a liquid crystal layer is driven by an electrical field in a direction substantially parallel to a substrate plane to perform display are known. Examples of the vertical electrical field mode include a Twisted Nematic (TN) mode and a Multi-domain Vertical Alignment (MVA) mode, and examples of the transverse electrical field mode include an In-plane Switching (IPS) mode and a Fringe Field Switching (FFS) mode. JP 2006-126551 A, JP 2005-338256 A, and JP 2005-338264 A disclose a transflective liquid crystal display device of a transverse electrical field mode.

SUMMARY

In recent years, liquid crystal display devices used in smartphones, tablets, and the like are usually provided with a touch sensor function. Various types of touch sensors are known, such as a resistive film type, a capacitive type, and an optical type. A liquid crystal display device provided with a touch sensor (also referred to as a touch panel) is categorized into a type in which the touch sensor is externally attached (external type) and a type in which the touch sensor is built in (built-in type). The built-in type touch panel is more advantageous than the external type touch panel in terms of frame narrowing, thickness in body, light weight, and the like, and also has an advantage in that the light transmittance can be increased.

There are two types of built-in touch panels: on-cell type and in-cell type. The cell means a display panel (also referred to as a liquid crystal panel) including an active matrix substrate represented by a thin film transistor (TFT) substrate, a counter substrate disposed so as to face the substrate, and a liquid crystal layer held between the substrates. In general, in the in-cell type, a layer having a touch sensor function is disposed in the display panel, and in the on-cell type, the layer having a touch sensor function is disposed between the display panel and a polarizer provided on an observation face side of the display panel. In particular, the in-cell type can in principle achieve the thinnest and lightest touch panel.

The inventors of the technique according to the disclosure have studied liquid crystal display devices capable of being used as in-cell type touch panels, and have found that a transmissive liquid crystal display device has insufficient brightness and poor viewability in a high illuminance environment (i.e., bright environment) such as being outdoors under direct sunlight, while a reflective liquid crystal display device has good viewability (see FIG. 36A), and that a reflective liquid crystal display device is darker in display than a transmissive liquid crystal display device and has poor viewability in a low illuminance environment (i.e., dark environment) such as being indoors or at night (see FIG. 36B). FIG. 36A is an observation photograph when an image is displayed by each of a transmissive liquid crystal display device 1T and a reflective liquid crystal display device 1R outdoors under direct sunlight (illuminance is about 70000 lx). It is understood that the viewability is poor in the transmissive liquid crystal display device 1T while the viewability is good in the reflective liquid crystal display device 1R. FIG. 36B is an observation photograph when an image is displayed by each of the transmissive liquid crystal display device 1T and the reflective liquid crystal display device 1R indoors (illuminance is about 1000 lx). It is understood that the viewability is good in the transmissive liquid crystal display device 1T while the viewability is poor in the reflective liquid crystal display device 1R.

On the other hand, the inventors of the disclosure have focused on a fact that an in-cell type touch panel capable of reflection mode display has not been achieved yet, and have considered that the reason why such an in-cell type touch panel has not been achieved yet is as follows: in the current reflective liquid crystal display devices, one of a pair of electrodes (also referred to as a counter electrode or a common electrode) for applying a voltage to a liquid crystal layer is disposed at a side of a counter substrate.

Then, to secure good viewability in any environment, the inventors of the disclosure have focused on transflective liquid crystal display devices, and have carried out intensive studies on a transflective liquid crystal display device of a transverse electrical field mode in which both of a pair of electrodes are provided at only one substrate side. However, known devices (see, for example, JP 2006-126551 A, JP 2005-338256 A, and JP 2005-338264 A) have a problem particularly in terms of viewing angle characteristics. In addition, it was studied to constitute a device by using a special optical film or the like, but in that case, the desired cost reduction was not obtained.

The technique according to the disclosure has been conceived in view of the above-mentioned current circumstances, and it is an object thereof to provide, at low cost, a transflective liquid crystal display device excellent in viewing angle characteristics and useful as an in-cell type touch panel.

(1) A transflective liquid crystal display device of an embodiment according to the disclosure is a liquid crystal display device provided with a plurality of pixels, the liquid crystal display device including a first polarizer, a first phase difference layer, a first substrate, a liquid crystal layer, a second substrate, a second phase difference layer, and a second polarizer in order from a back face side toward an observation face side. The first substrate includes a reflective layer, a pair of electrodes configured to generate a transverse electrical field in the liquid crystal layer, and a first horizontal alignment film in contact with the liquid crystal layer. The second substrate includes a second horizontal alignment film in contact with the liquid crystal layer. The first phase difference layer includes a first λ/2 plate and a first λ/4 plate. The second phase difference layer includes a second λ/2 plate and a second λ/4 plate. At least one of the first phase difference layer and the second phase difference layer further includes a positive C plate. The liquid crystal layer includes a liquid crystal material having a negative-type anisotropy of dielectric constant and takes a twist alignment when no voltage is applied. Each of the plurality of pixels includes a reflective region in which light is reflected by the reflective layer to perform display and a transmissive region in which light is transmitted to perform display.

(2) A transflective liquid crystal display device of a certain embodiment according to the disclosure has the configuration of (1) described above, and satisfies any one of the following (i) to (iii).

(i) The second phase difference layer includes the positive C plate of one piece, and the first phase difference layer includes no positive C plate.

(ii) The second phase difference layer includes the positive C plate of one piece, and the first phase difference layer includes the positive C plates of two pieces.

(iii) Each of the first phase difference layer and the second phase difference layer includes the positive C plates of two pieces.

(3) A transflective liquid crystal display device of a certain embodiment according to the disclosure is such that, in addition to having the configuration of (1) or (2) described above. the first λ/2 plate and the first λ/4 plate are located in this order from the back face side, the second λ/2 plate and the second λ/4 plate are located in this order from the observation face side, in-plane phase differences Re of the first λ/2 plate and the second λ/2 plate are substantially the same, and in-plane phase differences Re of the first λ/4 plate and the second λ/4 plate are substantially the same.

(4) A transflective liquid crystal display device of a certain embodiment according to the disclosure is such that, in addition to having the configuration of (1), (2), or (3) described above, the positive C plate is located between the first λ/2 plate and the first λ/4 plate and/or between the second λ/2 plate and the second λ/4 plate.

(5) A transflective liquid crystal display device of a certain embodiment according to the disclosure is such that, in addition to having the configuration of (1), (2), (3), or (4) described above, an absolute value of a thickness-direction phase difference Rth (nm) of the positive C plate is 150 to 270 nm.

(6) A transflective liquid crystal display device of a certain embodiment according to the disclosure is such that, in addition to having the configuration of (1), (2), (3), (4), or (5) described above, the phase difference layer further includes a second positive C plate, and the second positive C plate is located between the first λ/2 plate and the first polarizer and between the second λ/2 plate and the second polarizer.

(7) A transflective liquid crystal display device of a certain embodiment according to the disclosure is such that, in addition to having the configuration of (6) described above, an absolute value of a thickness-direction phase difference Rth (nm) of the second positive C plate is 50 to 130 nm.

(8) A transflective liquid crystal display device of a certain embodiment according to the disclosure is such that, in addition to having the configuration of (1), (2), (3), (4), (5), (6), or (7) described above, a twist angle of the liquid crystal layer when no voltage is applied is 70° or greater and 85° or less.

(9) A transflective liquid crystal display device of a certain embodiment according to the disclosure is such that, in addition to having the configuration of (1), (2), (3), (4), (5), (6), (7), or (8) described above, a product (dΔn) of a thickness d of the liquid crystal layer and a birefringence index Δn of a liquid crystal material constituting the liquid crystal layer is 218 nm or more and 255 nm or less.

(10) A transflective liquid crystal display device of a certain embodiment according to the disclosure is such that, in addition to having the configuration of (1), (2), (3), (4), (5), (6), (7), (8), or (9) described above, when an alignment direction of a liquid crystal molecule defined by the first horizontal alignment film is taken as a reference (0°) and a twist direction is set as a positive angle, a polarization axis of the first polarizer, an in-plane slow axis of the first λ/2 plate, and an in-plane slow axis of the first λ/4 plate are located at angles of 33.6 to 40.2°, 48.8 to 52.1°, and −74.8 to −68.2°, respectively.

(11) A transflective liquid crystal display device of a certain embodiment according to the disclosure is such that, in addition to having the configuration of (1), (2), (3), (4), (5), (6), (7), (8), (9), or (10) described above, when the alignment direction of the liquid crystal molecule defined by the first horizontal alignment film is taken as the reference (0°) and the twist direction is set as a positive angle, a polarization axis of the second polarizer, an in-plane slow axis of the second λ/2 plate, and an in-plane slow axis of the second λ/4 plate are located at angles of −69.5° to −64.0°, −51.5° to −47.50, and −26.9° to −22.9°, respectively.

(12) A transflective liquid crystal display device of a certain embodiment according to the disclosure is such that, in addition to having the configuration of (1), (2), (3), (4), (5), (6), (7), (8), (9), (10), or (11) described above, at least one of the pair of electrodes includes a plurality of belt-shaped portions and a slit located between two belt-shaped portions adjacent to each other among the plurality of belt-shaped portions.

(13) A transflective liquid crystal display device of a certain embodiment according to the disclosure is such that, in addition to having the configuration of (1), (2), (3), (4), (5), (6), (7), (8), (9), (10), (11), or (12) described above, the alignment direction of the liquid crystal molecule defined by the first horizontal alignment film is in a range from −30° to 30° when a direction in which the plurality of belt-shaped portions extend is taken as a reference (0°).

(14) A transflective liquid crystal display device of a certain embodiment according to the disclosure is such that, in addition to having the configuration of (1), (2), (3), (4), (5), (6), (7), (8), (9), (10), (11), (12), or (13) described above, a single domain alignment is used.

(15) A transflective liquid crystal display device of a certain embodiment according to the disclosure is such that, in addition to having the configuration of (1), (2), (3), (4), (5), (6), (7), (8), (9), (10), (11), (12), (13), or (14) described above, display is performed in a normally black mode.

(16) A transflective liquid crystal display device of a certain embodiment according to the disclosure is such that, in addition to having the configuration of (1), (2), (3), (4), (5), (6), (7), (8), (9), (10), (11), (12), (13), (14), or (15) described above, one of the pair of electrodes is a pixel electrode provided in each of the plurality of pixels and the other one is a common electrode including a plurality of segments each configured to function as a touch sensor electrode, and the first substrate includes a plurality of touch wiring lines each connected to the corresponding touch sensor electrode.

(17) A transflective liquid crystal display device of a certain embodiment according to the disclosure is such that, in addition to having the configuration of (1), (2), (3), (4), (5), (6), (7), (8), (9), (10), (11), (12), (13), (14), (15), or (16) described above, a light source is further provided.

According to the disclosure, it is possible to provide, at low cost, a transflective liquid crystal display device excellent in viewing angle characteristics and useful as an in-cell type touch panel.

BRIEF DESCRIPTION OF DRAWINGS

The disclosure will be described with reference to the accompanying drawings, wherein like numbers reference like elements.

DESCRIPTION OF EMBODIMENTS

Definition of Terms

Figure 1:
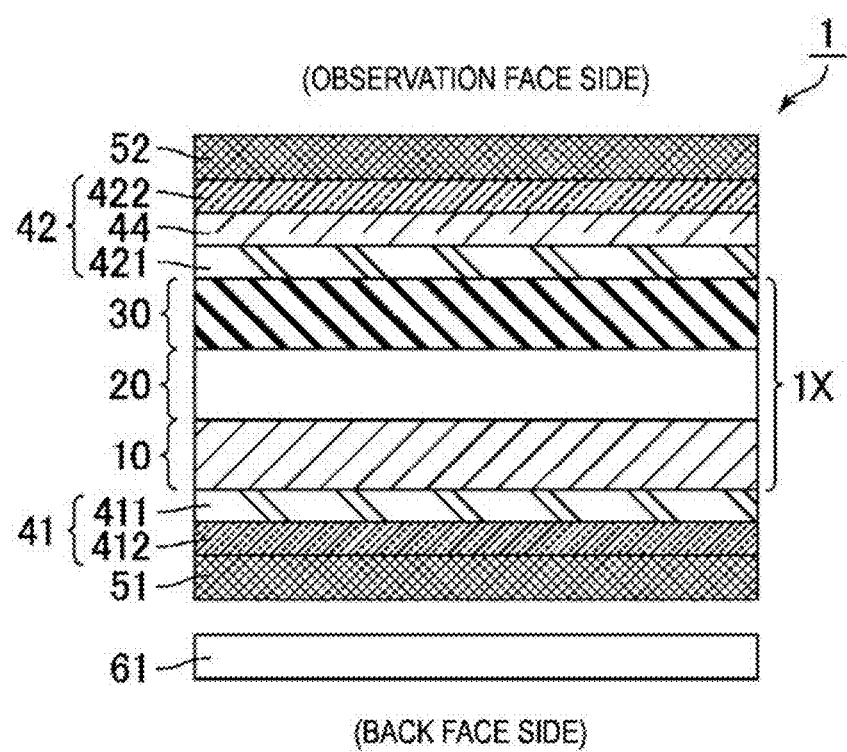
FIG. 1 is a schematic cross-sectional view of a liquid crystal display device 1.

In the present specification, an observation face side means a side closer to a screen (display surface) of a liquid crystal display device, and a back face side means a side farther from the screen (display surface) of the liquid crystal display device.

A voltage non-applied state means a state in which a voltage applied to a liquid crystal layer is less than a threshold voltage (including no voltage application). A voltage applied state means a state in which a voltage applied to the liquid crystal layer is a threshold voltage or higher. In the present specification, the voltage non-applied state is also referred to as "when no voltage is applied", and the voltage applied state is also referred to as "when a voltage is applied".

A polar angle means an angle formed between a subject direction (for example, a measurement direction) and a normal direction of the screen of the liquid crystal panel. An azimuthal direction means a direction when the subject direction is projected onto the screen of the liquid crystal panel, and is expressed by an angle (azimuth angle) formed between the subject direction and a reference azimuthal direction. Herein, the reference azimuthal direction (0°) is set to a horizontal right direction (i.e., x-axis right direction) of the screen of the liquid crystal panel unless otherwise specified. In the angle and the azimuth angle, a positive angle is counterclockwise from the reference azimuthal direction, and a negative angle is clockwise from the reference azimuthal direction. Counterclockwise and clockwise both represent the rotation direction when the screen of the liquid crystal panel is viewed from the observation face side (front). The angle represents a value measured in a state where the screen of the liquid crystal panel is viewed in a plan view, and means an acute angle unless the rotation direction or the like is specified.

An axial azimuthal direction of the optical film means an azimuthal direction of a polarization axis of a polarizer in a case of the polarizer, and means an azimuthal direction of a slow axis in a case of a phase difference layer. The polarization axis of the polarizer means an absorption axis in a case of an absorption-type polarizer, and means a reflection axis in a case of a reflection-type polarizer. The axial azimuthal direction of the phase difference layer means an azimuthal direction of an in-plane slow axis of the phase difference layer unless otherwise specified.

The phase difference layer means a layer in which at least one of an in-plane retardation (also referred to as an in-plane phase difference) Re and a thickness direction retardation (also referred to as a thickness-direction phase difference) Rth has a value of 10 nm or greater. Preferably, the phase difference layer has a value of 20 nm or greater. It should be noted that numerical values described herein as Re and Rth are absolute values unless otherwise specified.

The in-plane phase difference Re is defined as $Re=(nx-ny)\times d$. The thickness-direction phase difference Rth is defined as $Rth=\{nz-(nx+ny)/2\}\times d$. nx represents a principal refractive index in an in-plane slow axis direction of each phase difference layer. ny represents a principal refractive index in an in-plane fast axis direction of each phase difference layer. nz represents a principal refractive index in a direction perpendicular to a plane of each phase difference layer. The slow axis direction is an azimuthal direction in which the refractive index is maximized, and the fast axis direction is an azimuthal direction in which the refractive index is minimized. d represents a thickness of the phase difference layer.

An A plate is a phase difference plate satisfying "nx>ny≈nz". Among C plates, a positive C plate (also referred to as +C-plate) is a phase difference plate satisfying "nz>nx≈ny" with Rth indicating a positive value. A negative C plate (also referred to as −C-plate) is a phase difference plate satisfying "nz<nx≈ny" with Rth indicating a negative value.

A measurement wavelength for an optical parameter such as a refractive index and a phase difference is 550 nm unless otherwise specified.

Being substantially parallel means that an angle (absolute value) formed between two lines is within a range of 0°±10°, and such an angle is preferably within a range of 0°±5°, and more preferably 0° (that is, being parallel in a narrow sense is meant). Being substantially orthogonal (or being substantially perpendicular) means that an angle (absolute value) formed between two lines is within a range of 90°±10°, preferably within a range of 90°±5°, and more preferably 90° (that is, being orthogonal or perpendicular in a narrow sense is meant).

Transflective liquid crystal display devices (also simply referred to as "liquid crystal display devices") according to embodiments of the disclosure will be described below. The disclosure is not limited to the contents described in the following embodiments, and design changes can be made as appropriate within the scope that satisfies the configuration of the disclosure.

First Embodiment

Figure 2:
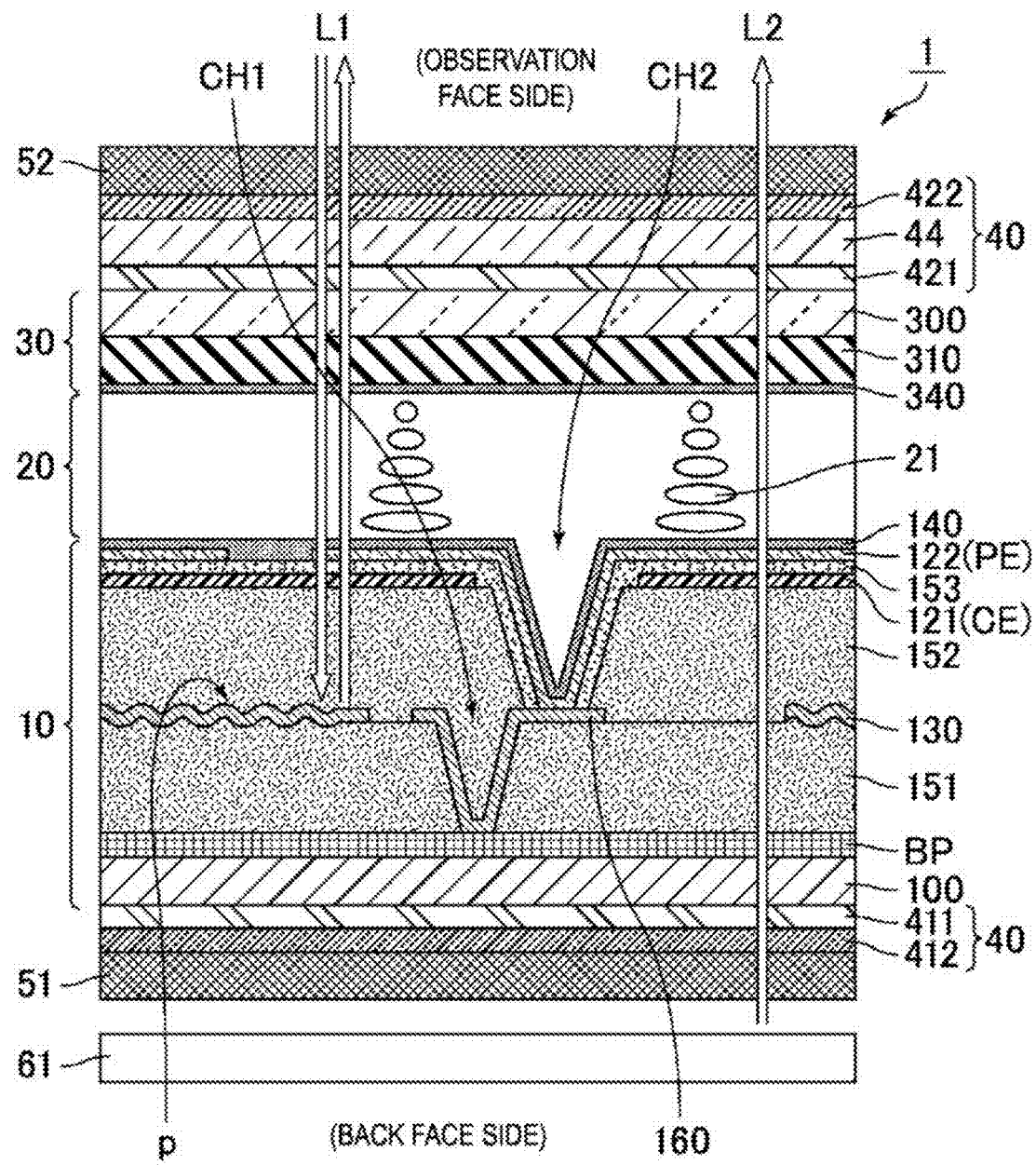
FIG. 2 is a schematic cross-sectional view illustrating more specifically the liquid crystal display device 1.
Figure 3:
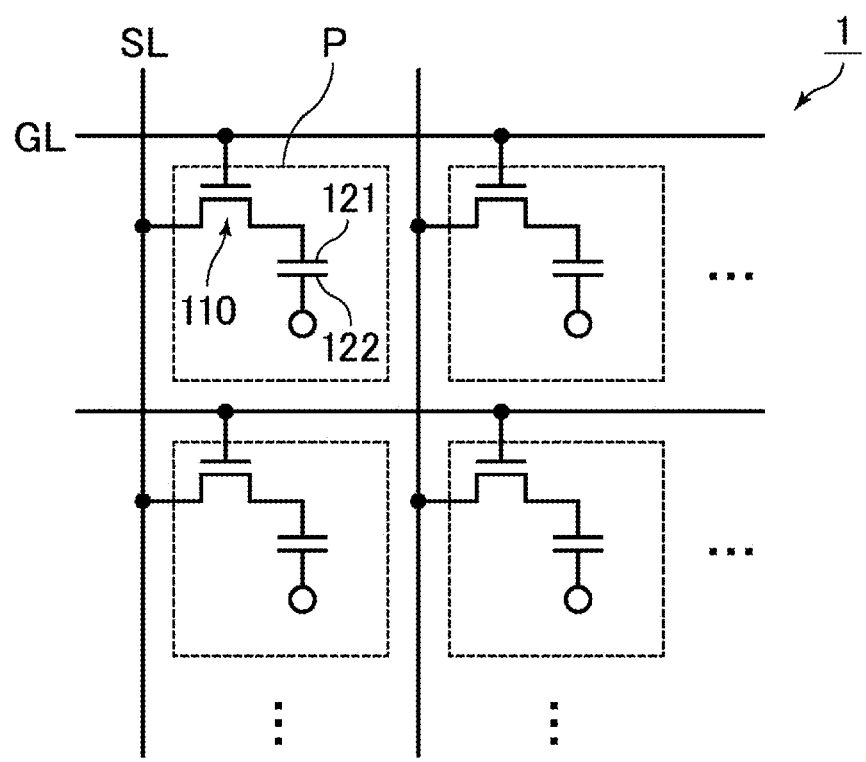
FIG. 3 is a schematic plan view of the entire liquid crystal display device 1 when viewed from an observation face side.

FIG. 1 is a schematic cross-sectional view of a liquid crystal display device 1 according to an example of the present embodiment, and FIG. 2 is a schematic cross-sectional view illustrating more specifically the liquid crystal display device 1 according to an example of the present embodiment. FIG. 3 is a schematic plan view obtained when a whole of the liquid crystal display device 1 according to an example of the present embodiment is viewed from an observation face side. As illustrated in FIG. 1, the liquid crystal display device 1 includes a first polarizer 51, a first phase difference layer 41, a first substrate 10, a liquid crystal layer 20, a second substrate 30, a second phase difference layer 42, and a second polarizer 52 in order from a back face side toward an observation face side. The first substrate 10 includes a reflective layer 130 as described below. The first phase difference layer 41 includes a λ/4 plate 411 and a λ/2 plate 412, and the second phase difference layer 42 includes a λ/4 plate 421 and a λ/2 plate 422. The second phase difference layer 42 further includes a positive C plate 44. In the present embodiment, a TFT substrate is used as the first substrate 10. Note that a portion or a structural body including a structure in which the liquid crystal layer 20 is interposed between the first substrate 10 and the second substrate 30 is also referred to as a liquid crystal panel 1X.

Figure 4:
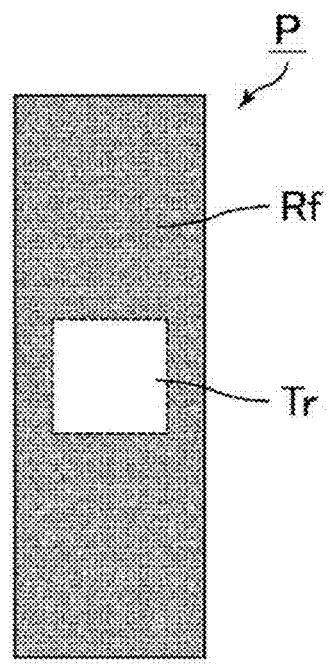
FIG. 4 is a schematic plan view conceptually describing that each of pixels P includes a reflective region Rf and a transmissive region Tr in the liquid crystal display device 1.

In the liquid crystal display device 1 according to the present embodiment, each of pixels P has a reflective region Rf for display by reflecting the light (i.e., a region for display in a reflection mode) and a transmissive region Tr for display by transmitting the light (a region for display in a transmission mode) (see FIG. 4). This makes it possible to exhibit favorable viewability in any environment. FIG. 4 is a schematic plan view conceptually illustrating that each pixel P has the reflective region Rf and the transmissive region Tr in the liquid crystal display device 1 of the present embodiment.

The reflective layer 130 is disposed in the reflective region Rf. For example, light L1 (for example, external light) enters the liquid crystal display device 1 from the observation face side, is reflected by the reflective layer 130, and then is emitted from the observation face side (see FIG. 2). On the other hand, the reflective layer 130 is not disposed in the transmissive region Tr (see FIG. 2). For example, when backlight 61 is disposed on the back face side, light L2 from the backlight 61 passes through the region (transmissive region Tr) without the reflective layer 130 disposed, and is emitted from the observation face side (see FIG. 2).

A proportion of an area occupied by the transmissive region Tr (aperture ratio) in each pixel P can be set as appropriate depending on an application or the like, but is preferably 5% or more and 95% or less, for example, when the area of one pixel P is taken as 100%. The position and the shape of the transmissive region Tr within the pixel P may also be appropriately set depending on the application or the like.

The liquid crystal display device 1 includes a plurality of the pixels P arrayed in a matrix shape, as illustrated in FIG. 3. Although the plurality of pixels P typically include three types of pixels, that is, a red pixel, a green pixel, and a blue pixel, the number of types of pixels may be two or less or four or greater. Each pixel P includes a thin film transistor (TFT) 110 and a first electrode 121 and a second electrode 122 that may generate a transverse electrical field in the liquid crystal layer 20. A gate electrode of the TFT 110 is electrically connected to a corresponding gate wiring line (also referred to as a scanning wiring line) GL, and a source electrode of the TFT 110 is electrically connected to a corresponding source wiring line (also referred to as a signal wiring line) SL. A drain electrode of the TFT 110 is electrically connected to the second electrode 122.

First Substrate

As illustrated in FIG. 2, the first substrate 10 includes the reflective layer 130 configured to reflect light, the first electrode 121, the second electrode 122, and a first horizontal alignment film 140 in contact with the liquid crystal layer 20 in order from the back face side to the observation face side. It is preferable that the first substrate 10 further include a support substrate 100 and a backplane circuit BP on the back face side of the reflective layer 130. If necessary, an insulating layer (also referred to as an insulating film) is provided between the layers and the like. For example, a first interlayer insulating layer 151 is provided so as to cover the backplane circuit BP, a second interlayer insulating layer 152 is provided on the first interlayer insulating layer 151 with a reflective layer 130 interposed therebetween, and a dielectric layer (also referred to as a third interlayer insulating layer) 153 is provided between the first electrode 121 and the second electrode 122.

The support substrate 100 is preferably transparent and has an insulating property, and examples of the support substrate 100 include a glass substrate and a plastic substrate.

The backplane circuit BP is provided on the support substrate 100. The backplane circuit BP is a circuit for driving the plurality of pixels P, and includes the TFT 110, the gate wiring line GL, and the source wiring line SL. The backplane circuit BP usually includes a gate insulating film as well.

The TFT 110 is provided in each of the plurality of pixels P. Each TFT 110 suitably includes an oxide semiconductor layer as an active layer (and is also referred to as an oxide semiconductor TFT). The oxide semiconductor contained in the oxide semiconductor layer has recently attracted attention as an active layer material that may replace amorphous silicon or polycrystalline silicon, and has higher mobility than amorphous silicon. Therefore, the oxide semiconductor TFT is capable of operating faster than the amorphous silicon TFT. Further, since the oxide semiconductor layer is formed by a process simpler than that for the polycrystalline silicon layer, the oxide semiconductor layer can be applied to a device that requires a large area.

Since the oxide semiconductor TFT has excellent off-leakage characteristics, a driving method can be used that performs display with a reduced rewriting frequency of an image. For example, when displaying a still image, the oxide semiconductor TFT can be operated so that the image data is rewritten at a frequency of once per second. Such a driving method is called pause driving or low frequency driving, and allows for significant reduction of a power consumption of the liquid crystal display device. By adopting the pause driving and performing touch detection in a period in which rewriting of an image is not performed, it is possible to suppress a decrease in the sensitivity of a touch operation due to noise from the drive circuit and to increase an S/N ratio (signal-to-noise ratio) to approximately 10 times that in the related art, for example.

The oxide semiconductor TFT is also advantageous in reducing a size of the TFT, and thus, a configuration in which a memory circuit is provided for each pixel P (also referred to as MIP (Memory In Pixels)) can be suitably achieved.

The oxide semiconductor may be an amorphous oxide semiconductor or a crystalline oxide semiconductor including a crystalline portion. Examples of the crystalline oxide semiconductor include a polycrystalline oxide semiconductor, a microcrystalline oxide semiconductor, and a crystalline oxide semiconductor having a c-axis oriented substantially perpendicular to a layer surface.

The oxide semiconductor layer may be a single layer, or may have a layered structure including two or more layers. The oxide semiconductor layer having a layered structure may include an amorphous oxide semiconductor layer and a crystalline oxide semiconductor layer, may include a plurality of crystalline oxide semiconductor layers with different crystal structures, and may include a plurality of amorphous oxide semiconductor layers. When the oxide semiconductor layer has a dual-layer structure including an upper layer and a lower layer, an energy gap of the oxide semiconductor included in the lower layer and an energy gap of the oxide semiconductor included in the upper layer may be different.

Materials, structures, and film formation methods of an amorphous oxide semiconductor and the above-described crystalline oxide semiconductors, a configuration of an oxide semiconductor layer having a layered structure, and the like are described in, for example, JP 2014-007399 A. The entire contents of the disclosure of JP 2014-007399 A are incorporated herein by reference.

Specifically, the oxide semiconductor layer suitably contains at least one metal element among In (indium), Ga (gallium), and Zn (zinc). In particular, an oxide semiconductor film containing a ternary oxide of In, Ga, and Zn is more preferable. A preferable example of the ternary oxide of In, Ga, and Zn is indium gallium zinc oxide. A semiconductor containing a ternary oxide of In, Ga, and Zn is called an In—Ga—Zn—O-based semiconductor, but in such a semiconductor, a proportion (composition ratio) of In, Ga, and Zn is not particularly limited, and for example, In:Ga:Zn=2:2:1, In:Ga:Zn=1:1:1, In:Ga:Zn=1:1:2, and the like may be adopted.

The In—Ga—Zn—O-based semiconductor may be amorphous or crystalline. In the crystalline In—Ga—Zn—O-based semiconductor, a c-axis is suitably oriented approximately perpendicular to a layer surface.

The crystal structure of the crystalline In—Ga—Zn—O-based semiconductor is disclosed in, for example, JP 2014-007399 A, JP 2012-134475 A, and JP 2014-209727 A. The entire disclosed contents of JP 2012-134475 A and JP 2014-209727 A are incorporated herein by reference. The TFT having the In—Ga—Zn—O-based semiconductor layers, which has high mobility (more than 20 times compared to a-Si TFT) and a low leakage current (less than 1/100 compared to a-Si TFT), is suitably used as a drive TFT (for example, a TFT included in a drive circuit provided around a display region including a plurality of pixels on the same substrate as the display region) and a pixel TFT (TFT provided in a pixel).

The oxide semiconductor layer may include an oxide semiconductor other than the In—Ga—Zn—O-based semiconductor. Examples include a ternary oxide of In, Sn (tin), and Zn, and preferred examples include $In_2O_3$—$SnO_2$—ZnO; InSnZnO. A semiconductor including a ternary oxide of In, Sn, and Zn is referred to as an In—Sn—Zn—O-based semiconductor. Alternatively, the oxide semiconductor layer may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, and an In—Ga—Zn—Sn—O based semiconductor.

The first interlayer insulating layer 151 is provided so as to cover the backplane circuit BP. A surface of the first interlayer insulating layer 151 on the reflective layer 130 side preferably has an uneven shape (also referred to as an uneven surface structure). Accordingly, the reflective layer 130 is capable of having an uneven surface structure reflecting such an uneven shape. The first interlayer insulating layer 151 having an uneven surface structure may be suitably formed by using a photosensitive resin, for example, as described in JP 3394926 B.

The reflective layer (also referred to as a reflective film) 130 is provided on the first interlayer insulating layer 151. The reflective layer 130 is formed from a material that reflects light. In particular, the reflective layer is preferably formed of a metal material having high reflectivity. Examples of the material of the reflective layer 130 include a silver alloy, an aluminum alloy, and an aluminum alloy.

The reflective layer 130 preferably has an uneven shape reflecting the uneven surface structure preferably provided in the first interlayer insulating layer 151. That is, the reflective layer 130 also suitably has the uneven surface structure. Such an uneven surface structure is also called MRS (Micro Reflective Structure), and is provided to diffusely reflect ambient light and achieve white display close to paper white. The uneven surface structure is preferably configured of a plurality of protruding portions p randomly arranged, for example, such that a center interval between the adjacent protruding portions p is 5 μm or greater and 50 μm or less. The center interval between the adjacent protruding portions p is more preferably 10 μm or greater and 20 μm or less. Suitably, a shape of each protruding portion p is substantially circular or substantially polygonal when viewed from a normal direction of the support substrate. An area of the protruding portion p occupying one pixel P is preferably about 20 to 40%, for example, and a height of the protruding portion p is preferably 1 μm or greater and 5 μm or less, for example.

As described above, the transmissive region Tr does not include the reflective layer 130. For example, the reflective region Rf including the reflective layer 130 and the transmissive region Tr not including the reflective layer 130 can be formed by forming the reflective layer 130 and then removing part of the reflective layer 130 when manufacturing the first substrate 10.

The second interlayer insulating layer 152 is provided on the first interlayer insulating layer 151 so as to cover the reflective layer 130. That is, between the first interlayer insulating layer 151 and the second interlayer insulating layer 152, the reflective layer 130 is disposed.

Here, the first interlayer insulating layer 151 and the second interlayer insulating layer 152 are preferably formed of an organic insulating material or an inorganic insulating material. Examples of the organic insulating film obtained by using the organic insulating material include an organic film (relative dielectric constant ε=2 to 5) such as acrylic resin, polyimide resin, and novolac resin, and layered bodies thereof. A film thickness of the organic insulating film is not particularly limited, but is 2 μm or greater and 4 μm or less, for example. Examples of the inorganic insulating films obtained by using the inorganic insulating material include an inorganic film (relative dielectric constant ε=5 to 7) such as silicon nitride (SiNx) and silicon oxide (SiO$_2$), and a layered film thereof. A film thickness of the inorganic insulating film is not particularly limited, but is 1500 Å or greater and 3500 Å or less, for example. Alternatively, a layered body of the organic insulating film and the inorganic insulating film may be used. In particular, the first interlayer insulating layer 151 and the second interlayer insulating layer 152 are suitably an organic insulating film.

From the viewpoint of manufacturing, the interlayer insulating layers 151 and 152 preferably have high transparency, and are preferably formed of the same material having high transmittance. The first interlayer insulating layer 151 farther from the observation face side than the reflective layer 130 may have low transmittance or be opaque. From the viewpoint of light usage efficiency, the second interlayer insulating layer 152 may have high transparency, and may be made of a material with high transmittance different from that of the first interlayer insulating layer 151.

The first electrode 121 is disposed on the reflective layer 130 via the second interlayer insulating layer 152, and the dielectric layer 153 is disposed between the first electrode 121 and the second electrode 122. Therefore, the reflective layer 130 is located on a side opposite to the liquid crystal layer 20 with respect to the first electrode 121 and the second electrode 122 (that is, on a side closer to the back face side with respect to the first electrode 121 and the second electrode 122). Note that of the first electrode 121 and the second electrode 122, in the present embodiment, the second electrode 122 is located relatively on the observation face side, and the first electrode 121 is located on the back face side. An electrode located relatively on the observation face side is also referred to as an upper layer electrode, and an electrode located relatively on the back face side is also referred to as a lower layer electrode.

One of the first electrode 121 and the second electrode 122 is a pixel electrode PE, and the other is a common electrode CE. A pixel electrode is provided for each of the plurality of pixels P. The pixel electrode is electrically connected to the backplane circuit BP. In the present embodiment, the first electrode 121 (lower layer electrode) is the common electrode CE, and the second electrode 122 (upper layer electrode) is the pixel electrode PE.

At least one of the first electrode 121 and the second electrode 122 suitably includes a plurality of belt-shaped portions SP and a slit Sl located between two adjacent belt-shaped portions of the plurality of belt-shaped portions. Each belt-shaped portion SP corresponds to an electrode portion, and the slit Sl corresponds to an opening portion. Such an electrode is also referred to as a slit electrode or a finger electrode. From the viewpoint of easily generating a transverse electrical field, it is suitable that at least the upper layer electrode (pixel electrode PE in the present embodiment) is a slit electrode. In such a case, the lower layer electrode (common electrode CE in the present embodiment) may be a planar electrode, that is, a so-called solid electrode, or may be a slit electrode.

It is preferable for the extending directions of the plurality of belt-shaped portions SP constituting the slit electrode to be substantially parallel to each other. Further, it is preferable that they have a linear shape extending in the same direction. The linear shape means that not the outer edge of the belt-shaped portion SP but the center line of the belt-shaped portion SP has a linear shape, and the center line of the belt-shaped portion SP means a line bisecting the belt-shaped portion SP in a width direction thereof. The width direction means a direction substantially perpendicular to a direction in which the belt-shaped portions SP extend in a plan view. The belt-shaped portion SP may have a bent portion (also referred to as a kink portion) at a midway portion (for example, an end portion) thereof, but preferably does not have a bent portion.

The extending directions of the plurality of belt-shaped portions SP may be different for each pixel, but are preferably the same in two or more adjacent pixels. In particular, it is most preferable that the extending directions of all the pixels be the same in terms of maximizing the display performance.

A width L of each belt-shaped portion SP differs depending on an application voltage or the like, but is preferably in a range from 0.3 to 10 μm, for example. More preferably, the width is 1 to 5 μm. An interval between two belt-shaped portions SP adjacent to each other (that is, an interval between the center lines of the belt-shaped portions) also differs depending on the application voltage or the like, but is preferably in a range from 0.3 to 10 μm, for example. More preferably, the interval is 1 to 5 μm.

A ratio L/S (also referred to as an L/S condition) of the width L per belt-shaped portion in a plan view relative to a width S per slit in a plan view is preferably 0.4 to 0.7/1. With this, reflectivity of white display (also referred to as white reflectivity) is improved, and thus a contrast ratio (also simply referred to as "contrast") is further improved. Specifically, the following ratios may be cited: L/S=1.6/3 (i.e., 0.533/1), L/S=2.2/4.1 (i.e., 0.537/1), and L/S=3/5 (i.e., 0.6/1), for example.

Figure 5:
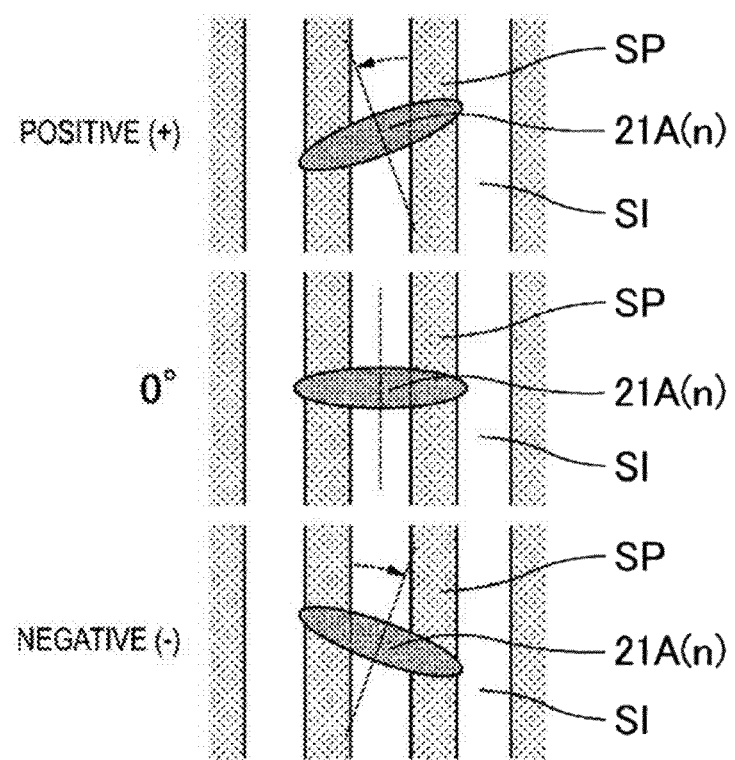
FIG. 5 is a diagram for explaining a slit angle of a negative-type liquid crystal molecule.

In this case, the alignment direction of a liquid crystal molecule 21A on the first substrate 10 side (i.e., the alignment direction of the liquid crystal molecule 21A defined by the first horizontal alignment film 140) when no voltage is applied is suitably in a range from −30° to 30° while taking the extending direction of the plurality of belt-shaped portions SP as a reference (0°). As for this angle, that is, in the case where the extending direction of the plurality of belt-shaped portions SP is taken as the reference (0°), and an angle rotated clockwise is defined as a positive angle (+) and an angle rotated counterclockwise is defined as a negative angle (−), an angle formed by the alignment direction of the liquid crystal molecule 21A on the first substrate 10 side when no voltage is applied is referred to as a slit angle. The definition of the slit angle will be described with reference to FIG. 5. FIG. 5 is a diagram for explaining the slit angle of the liquid crystal molecule. A symbol of (n) added to the end of a reference symbol of each liquid crystal molecule means a negative-type liquid crystal molecule. In the present specification, a liquid crystal molecule 21 in the vicinity of the first horizontal alignment film 140 (i.e., the liquid crystal molecule on the first substrate 10 side) is also referred to as the liquid crystal molecule 21A, and the liquid crystal molecule 21 in the vicinity of a second horizontal alignment film 340 (i.e., the liquid crystal molecule on the second substrate 30 side) is also referred to as a liquid crystal molecule 21B.

Negative-type liquid crystal materials (and liquid crystal molecules) are used in the present embodiment as described below, and in the case of the negative-type liquid crystal molecules, the alignment direction of the liquid crystal molecule 21A on the first substrate 10 side when no voltage is applied corresponds to a long-axis direction of the liquid crystal molecule 21A. However, since the negative-type liquid crystal has a larger dielectric constant in a short-axis direction than in the long-axis direction as described below, a direction orthogonal to the long-axis direction of the liquid crystal molecule 21A, that is, the short-axis direction is taken as a reference (0°). In this case, when the short-axis direction of the liquid crystal molecule 21A is parallel to the extending direction of the plurality of belt-shaped portions SP, the slit angle is 0° (see a "0°" section in FIG. 5). With the short-axis direction of the liquid crystal molecule 21A being the reference (0°), when the extending direction of the plurality of belt-shaped portions SP is rotated clockwise, the slit angle takes a positive angle (+) (see a "positive (+)" section in FIG. 5). With the short-axis direction of the liquid crystal molecule 21A being the reference (0°), when the extending direction of the plurality of belt-shaped portions SP is rotated counterclockwise, the slit angle takes a negative angle (−) (see a "negative (−)" section in FIG. 5).

Therefore, it can be said that the slit angle is an angle formed by an axis having a larger absolute value of a dielectric constant, in the liquid crystal molecules 21A on the first substrate 10 side when no voltage is applied, when the extending direction of the plurality of belt-shaped portions is used as a reference (0°).

The suitable range of the slit angle varies depending on a condition of the width L of each belt-shaped portion SP and the width S of each slit Sl (also referred to as an L/S condition), a twist angle, whether the liquid crystal material is a positive-type material or a negative-type material, and the like. In particular, in a monodomain structure, when an optimum slit angle is selected according to the L/S condition, it is possible to maximize the reflectivity (particularly, a white reflectivity).

Figure 6:
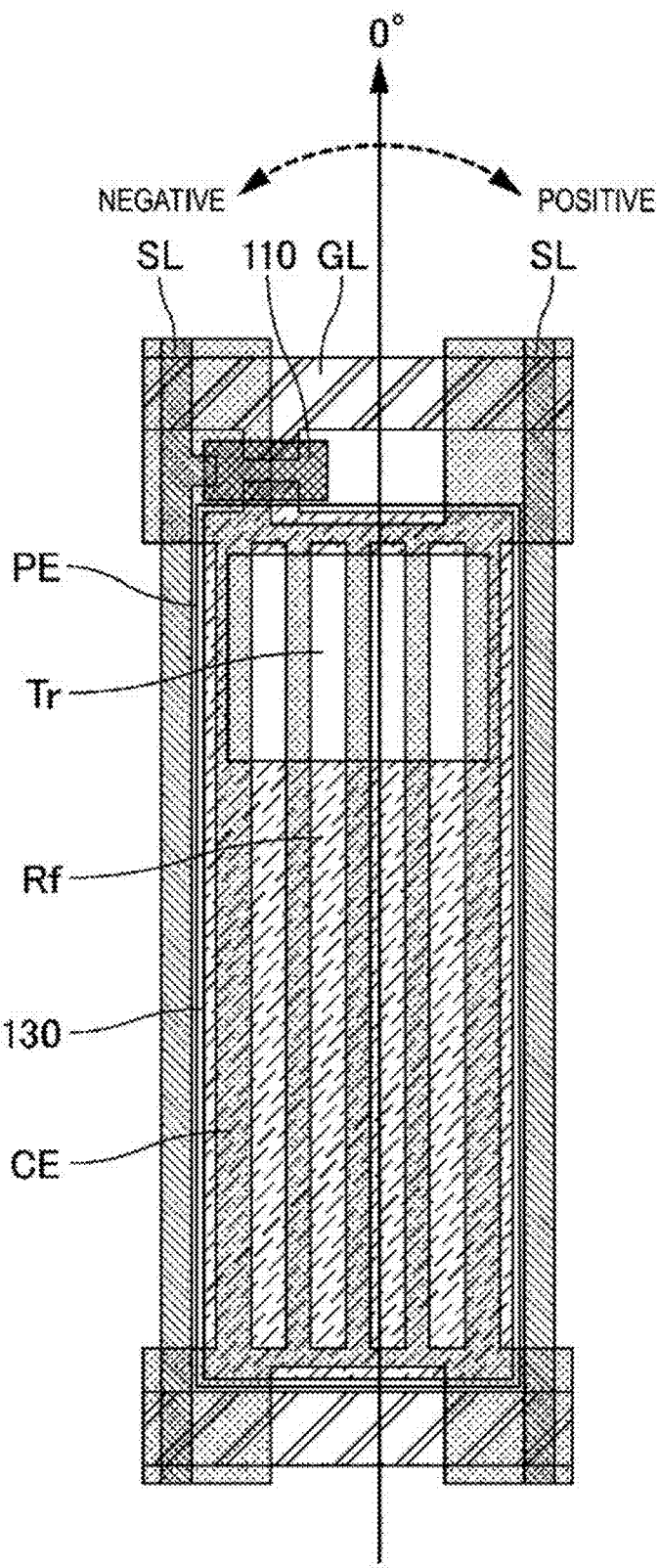
FIG. 6 is a schematic plan view schematically illustrating a specific example of a pixel.
Figure 7A:
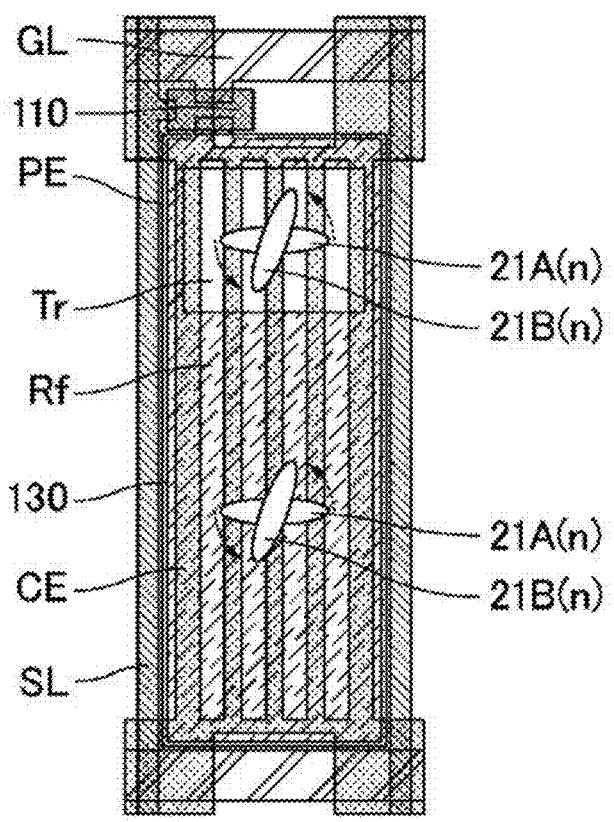
FIG. 7A is a schematic plan view schematically illustrating a specific example of a pixel.
Figure 7B:
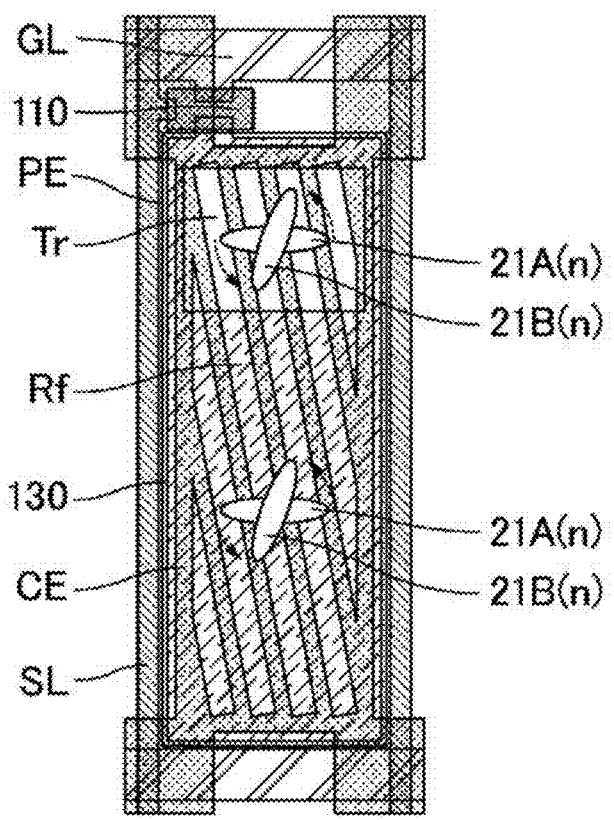
FIG. 7B is a schematic plan view schematically illustrating a specific example of a pixel.
Figure 7C:
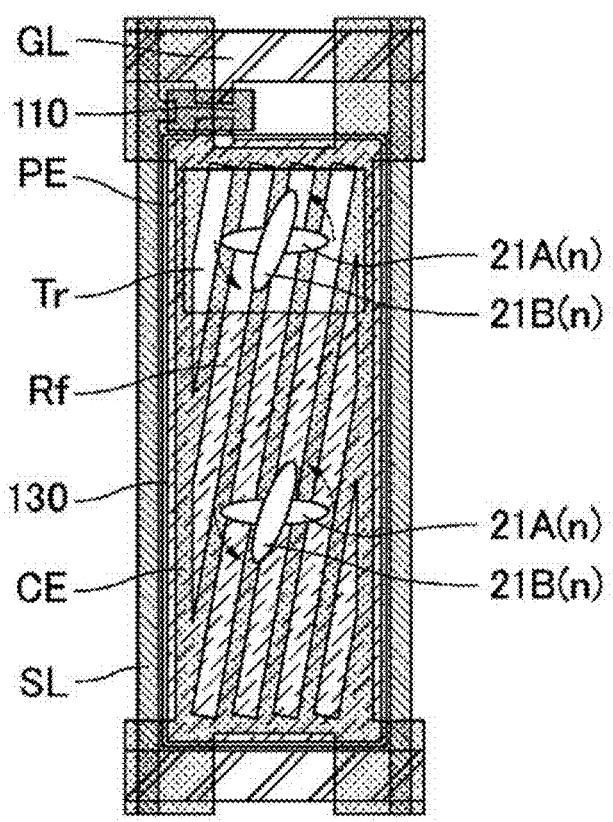
FIG. 7C is a schematic plan view schematically illustrating a specific example of a pixel.
Figure 7D:
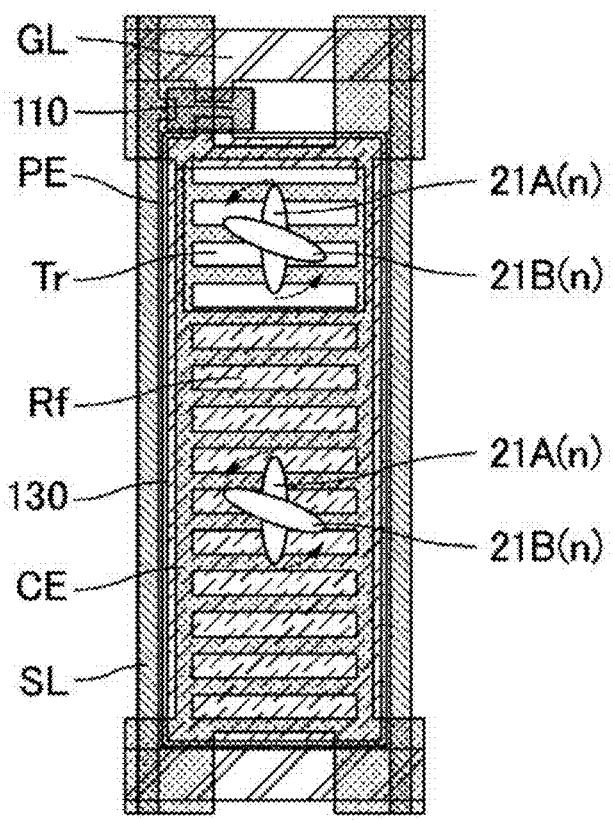
FIG. 7D is a schematic plan view schematically illustrating a specific example of a pixel.
Figure 7E:
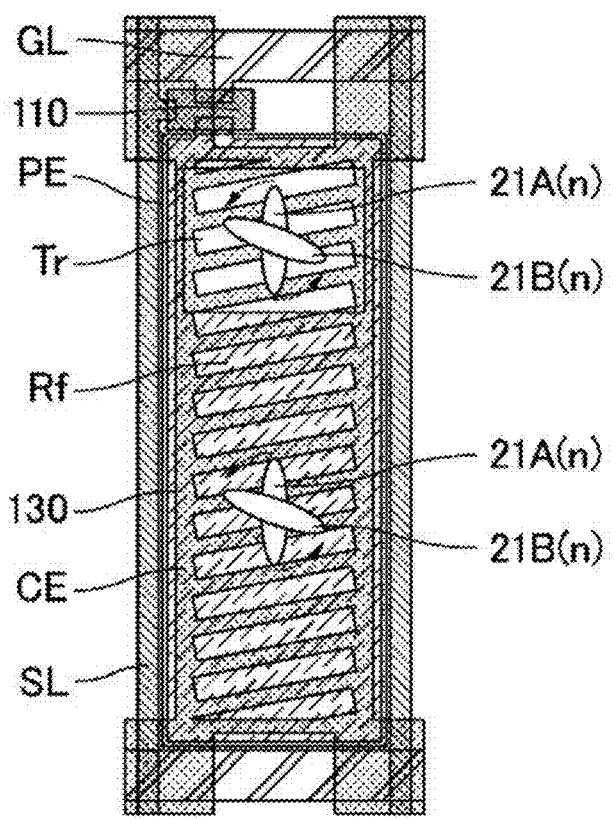
FIG. 7E is a schematic plan view schematically illustrating a specific example of a pixel.
Figure 7F:
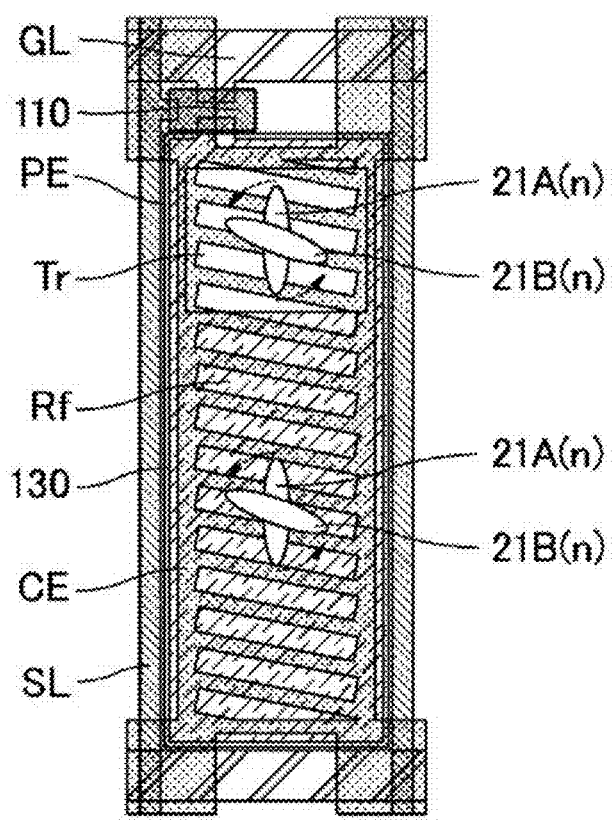
FIG. 7F is a schematic plan view schematically illustrating a specific example of a pixel.

FIG. 6 and FIG. 7A each illustrate an example in which, with an extending direction of the source wiring line SL being a reference (0°), when an angle rotated clockwise is defined as a positive angle (+) and an angle rotated counterclockwise is defined as a negative angle (−), the extending direction of the plurality of belt-shaped portions SP (such angle is referred to as an angle X) is 0°. Examples in which the angles X are −10°, +10°, −90°, −100°, and −80° are illustrated in FIG. 7B, FIG. 7C, FIG. 7D, FIG. 7E, and FIG. 7F, respectively. An aspect in which the angle X is 0° (see FIG. 6 and FIG. 7A) corresponds to an aspect in which the extending direction of the plurality of belt-shaped portions SP is parallel to the extending direction of the source wiring line SL, and an aspect in which the angle X is −90° (see FIG. 7D) corresponds to an aspect in which the extending direction of the plurality of belt-shaped portions SP is parallel to an extending direction of the gate wiring line GL. FIG. 6 and FIG. 7A to FIG. 7F are schematic plan views schematically illustrating specific examples of the pixel. Of the above-mentioned drawings, FIG. 6 is a schematic plan view illustrating an example of a structure of the pixel, and FIG. 7A to FIG. 7F are schematic plan views each illustrating an example of the pixel being arrayed. FIG. 7A to FIG. 7F illustrate a twist alignment of the liquid crystal molecules 21.

Each of the first electrode 121 and the second electrode 122 is preferably formed of a transparent conductive material. Examples of the transparent conductive material include indium tin oxide (ITO), indium zinc oxide (IZO) (registered trademark)), and a mixture thereof.

In an aspect illustrated in FIG. 2, the pixel electrode PE (second electrode 122 in the present embodiment) is electrically connected to the backplane circuit (more specifically, to a drain electrode of the TFT 110) via a contact electrode 160. The contact electrode 160 is formed in the same layer as the reflective film 130, and is formed of the same material (metal film and the like) as the reflective film 130. The first interlayer insulating layer 151 is formed with a first contact hole CH1 that exposes a part of the backplane circuit BP (more specifically, at least a part of the drain electrode of the TFT 110), and in the first contact hole CH1, the contact electrode 160 is connected to the backplane circuit BP. The second interlayer insulating layer 152 is formed with a second contact hole CH2 that exposes a part of the contact electrode 160, and the pixel electrode PE (second electrode 122 in the present embodiment) is connected to the contact electrode 160, in the second contact hole CH2.

The dielectric layer 153 is provided so as to cover the first electrode 121. The dielectric layer 153 is preferably formed of an inorganic insulating material. The inorganic insulating film obtained by using the inorganic insulating material has already been described above.

The first horizontal alignment film 140 is provided on the second electrode 122 and is in contact with the liquid crystal layer 20. Therefore, it can be said that the first electrode 121 and the second electrode 122 are disposed between the second interlayer insulating layer 152 and the first horizontal alignment film 140.

The first horizontal alignment film 140 and the second horizontal alignment film 340 described later are each subjected to an alignment treatment, and define the orientation direction (also referred to as an alignment direction) of the liquid crystal molecules 21 included in the liquid crystal layer 20. For example, the alignment treatment is preferably performed by a photo-alignment treatment or a rubbing treatment. In the photo-alignment treatment, a photo-decomposition type photo-alignment film material can be used, and in the rubbing treatment, an alignment film material such as polyimide is preferably used.

Each of the first horizontal alignment film 140 and the second horizontal alignment film 340 is a horizontal alignment film that aligns the liquid crystal molecules 21 in a direction horizontal to the first substrate 10 and the second substrate 30, in a state where no voltage is applied to the liquid crystal layer 20. That is, the liquid crystal molecules 21 are horizontally oriented in a state where no voltage is applied to the liquid crystal layer 20. A pretilt angle is substantially 0°.

The orientation direction of the liquid crystal molecules 21 defined by the first horizontal alignment film 140 and the orientation direction of the liquid crystal molecules 21 defined by the second horizontal alignment film 340 are different from each other. Therefore, the liquid crystal layer 20 takes a twist alignment when no voltage is applied (see FIG. 2). When a voltage is applied to the liquid crystal layer 20, that is, when a transverse electrical field is generated in the liquid crystal layer 20 by the first electrode 121 and the second electrode 122, an alignment state of the liquid crystal layer 20 is changed by the transverse electrical field (fringe electrical field).

In the present embodiment, a configuration in which the pixel electrode PE is provided above the common electrode CE is described, and in a relatively large liquid crystal display device, that is, a liquid crystal display device in which the pixel P area is relatively large, the pixel electrode PE is preferably provided above the common electrode CE. In such a configuration (also referred to as a V2 structure), it is not necessary to form a slit in the common electrode CE serving as a lower layer electrode, and thus, as compared with a configuration in which the common electrode CE is provided above the pixel electrode PE (also referred to as a V3 structure), an increase in resistivity (sheet resistivity) of the common electrode CE is suppressed, and therefore, a decrease in a fringe electrical field applied to the liquid crystal layer 20 is suppressed. In such a configuration (V2 structure), if the pixel electrode PE is a slit electrode, the resistivity of the pixel electrode PE increases, but since a voltage input from outside is applied to the pixel electrode PE, it is easy to reduce an influence caused due to the increase of the resistivity (that is, to suppress weakening of a fringe electrical field). Note that in order to suppress the increase in the resistivity of the common electrode CE, it is possible to consider using a low resistance wiring line formed from a metal material (for example, connecting the low resistance wiring line to a common electrode), but in such a configuration, an adverse effect on the display due to specular reflection and the like resulting from the low resistance wiring line (for example, a glare, an iridescent diffraction, and an interference pattern) may occur, and it is necessary to block light with a black matrix, and the like, and a reflection aperture ratio may not be sufficiently improved.

In a configuration in which the pixel electrode PE is provided above the common electrode CE, the common electrode CE does not exist in a region where the second contact hole CH2 is formed, and thus, such a region no longer contributes to reflective display, and as compared with a configuration in which the common electrode CE is provided above the pixel electrode PE, the reflectivity may be lower. The area of the region that does not contribute to the reflective display, such as the contact hole, is required to be of a certain size regardless of the size of the pixel P area. Thus, the proportion of the region that does not contribute to the reflective display in the pixel P increases as the pixel P area decreases (that is, as the definition increases), and the above-described decrease in the reflectivity becomes significant. Conversely, in a relatively large liquid crystal display device, it is easier to reduce a proportion occupied by a region not contributing to the reflective display within the pixel P, and therefore, it is easier to suppress the decrease in reflectivity described above. For these reasons, in a relatively large liquid crystal display device, it is advantageous to have a configuration in which the pixel electrode PE is provided above the common electrode CE.

On the other hand, as described above, the decrease in reflectivity due to the region where the second contact hole CH2 is formed not contributing to the reflective display increases as the pixel P area becomes smaller (that is, the higher the definition becomes), and thus, in a liquid crystal display device having a relatively high-definition, that is, in a liquid crystal display device in which the pixel P area is relatively small, it is preferable that the common electrode CE be provided above the pixel electrode PE (see a first modified example of the first embodiment described later).

Liquid Crystal Layer

The liquid crystal layer 20 is located between the first substrate 10 and the second substrate 30 and contains a negative-type liquid crystal material. The negative-type liquid crystal material means a liquid crystal material having a negative-type anisotropy of dielectric constant, that is, a nematic liquid crystal material having a negative anisotropy of dielectric constant $\Delta_\varepsilon$. The positive-type liquid crystal material means a liquid crystal material having a positive-type anisotropy of dielectric constant, that is, a nematic liquid crystal material having a positive anisotropy of dielectric constant $\Delta_\varepsilon$. The anisotropy of dielectric constant $\Delta_\varepsilon$ is a difference between the dielectric constant $\varepsilon_{//}$ in the long-axis direction and the dielectric constant $\varepsilon_\perp$ in the short-axis direction of the liquid crystal molecules 21 (that is, $\varepsilon_{//}-\varepsilon_\perp$).

A birefringence index $\Delta n$ of the negative-type liquid crystal material is, for example, preferably 0.123 or less, and more preferably 0.12. In particular, it is suitable that the thickness d of the liquid crystal layer 20 is 2 μm or greater and $\Delta n$ is 0.123 or less. More preferably, d is 2.5 μm or greater and $\Delta n$ is 0.098 or less. The anisotropy of dielectric constant $\Delta_\varepsilon$ of the liquid crystal material is preferably, for example, −5 or less. Note that as $\Delta_\varepsilon$ is smaller (or an absolute value of $\Delta_\varepsilon$ is larger), a VR curve (a threshold value, a reflectivity Max value, or the like) is shifted to a lower voltage side.

The liquid crystal layer 20 may further contain a chiral agent, if necessary. The liquid crystal layer 20 can be formed, for example, by a dropping method.

The thickness d (also referred to as a cell gap or a cell thickness) of the liquid crystal layer 20 is preferably 3.6 μm or less. The thickness is more preferably 2.0 to 3.4 μm. From the viewpoint of a response speed, the thickness is preferably 3 μm or less. It is suitable that the cell thickness is small from the viewpoint of cost reduction because the number of materials can be reduced. However, in a case where the thickness is too small, display quality may not be improved because of unevenness of the cell thickness, foreign matters, and the like. Therefore, the cell thickness is a trade-off issue between the cost reduction and the rate of occurrence of display quality defects. From the viewpoint of a yield, the thickness is suitably equal to or greater than 2 μm, as described above.

A retardation $d\Delta n$ of the liquid crystal layer 20, that is, a product of the thickness d of the liquid crystal layer 20 and the birefringence index $\Delta n$ of the liquid crystal material ($d\Delta n$) is preferably in a range from 230 nm to 260 nm. From the viewpoint of further improving the contrast ratio, it is more preferably in a range from 232 nm to 250 nm, still more preferably in a range from 235 nm to 246 nm, and particularly preferably in a range from 236 nm to 245 nm.

The liquid crystal layer 20 may have a multi-domain alignment such as a dual domain alignment. The liquid crystal layer 20 suitably has a single domain alignment (also referred to as a monodomain alignment) from the viewpoint of maximizing a liquid crystal mode reflective efficiency and a liquid crystal mode transmissive efficiency.

Second Substrate

The second substrate 30 is disposed to face the first substrate 10 with the liquid crystal layer 20 interposed therebetween, and includes the second horizontal alignment film 340 in contact with the liquid crystal layer 20. The second substrate 30 preferably further includes a support substrate 300 and a color filter layer 310. For example, as illustrated in FIG. 2, the second substrate 30 includes the second horizontal alignment film 340, the color filter layer 310, and the support substrate 300, in order from the liquid crystal layer 20 side. The second substrate 30 also preferably includes a plurality of columnar spacers (not illustrated). Note that the first substrate 10 may have a plurality of columnar spacers.

The support substrate 300 preferably is transparent and has an insulating property, and examples of the support substrate 300 include a glass substrate and a plastic substrate. A high-resistance transparent conductive film may be formed on a surface of the support substrate 300 on the opposite side to the liquid crystal layer 20 (for example, in FIG. 2, the surface of the support substrate 300 on the side of a phase difference layer 40) as a countermeasure against static electricity image-sticking in the liquid crystal cell. The high-resistance transparent conductive film may have a multilayer structure in consideration of suppression of a decrease in transmittance or suppression of an increase in reflectivity.

The color filter layer 310 typically includes a red color filter being provided in a region corresponding to a red pixel and transmitting red light, a green color filter being provided in a region corresponding to a green pixel and transmitting green light, and a blue color filter being provided in a region corresponding to a blue pixel and transmitting blue light. However, the number of types of color filters may be two or less, or four or greater. Further, when color display is not performed, the color filter layer 310 is omitted.

An overcoat layer (also referred to as a flattened layer) may be provided to cover the color filter layer 310 if necessary. Note that depending on a material forming an electrode (for example, a transparent conductive material), a material forming an interlayer insulating layer or a dielectric layer, and a material forming an alignment film, white display may be yellowish. In this case, chromaticity adjustment (that is, blue shift) may be performed by forming the overcoat layer with a blue resist to bring the chromaticity of the white display close to the chromaticity of a D65 light source, for example. The D65 light source is a CIE standard light source D65.

Phase Difference Layer

The first phase difference layer 41 is located between the first substrate 10 and the first polarizer 51, and includes the $\lambda/4$ plate 411 and the $\lambda/2$ plate 412 (see FIG. 1 and FIG. 2). The second phase difference layer 42 is located between the second substrate 30 and the second polarizer 52, and includes the $\lambda/4$ plate 421, the $\lambda/2$ plate 422, and the positive C plate 44 (see FIG. 1 and FIG. 2). As for the positional relationship between the $\lambda/4$ plate and the $\lambda/2$ plate in each of the phase difference layers, the $\lambda/2$ plate 412 and the $\lambda/4$ plate 411 are preferably disposed in this order from the back face side in the first phase difference layer 41, and the $\lambda/2$ plate 422 and the $\lambda/4$ plate 421 are preferably disposed in this order from the observation face side in the second phase difference layer 42.

The $\lambda/4$ plate means a phase difference plate that imparts an in-plane phase difference of a ¼ wavelength to incident light having a wavelength $\lambda$, and is also referred to as a $\lambda/4$ wavelength plate or a quarter-wave plate (QWP). Specifically, the $\lambda/4$ plate is capable of converting linearly polarized light into circularly polarized light or circularly polarized light into linearly polarized light. For example, the linearly polarized light entering the $\lambda/4$ plate becomes circularly polarized light when emitted therefrom.

The $\lambda/2$ plate means a phase difference plate that imparts an in-plane phase difference of a ½ wavelength to incident light having a wavelength $\lambda$, and is also referred to as a $\lambda/2$ wavelength plate, a half-wavelength plate, or a half-wave plate (HWP). Specifically, the $\lambda/2$ plate is capable of rotating a vibration direction of an incident light beam by approximately 90°. For example, the circularly polarized light entering the $\lambda/2$ plate becomes circularly polarized light with the turning direction reversed when emitted therefrom.

It is preferable that the first $\lambda/4$ plate 411 and the second $\lambda/4$ plate 421 have substantially the same in-plane phase difference Re. In this case, "substantially the same" means that a difference between these in-plane phase differences Re is less than 5 nm. The difference in in-plane phase difference Re is preferably less than 1 nm.

It is preferable that the first $\lambda/2$ plate 412 and the second $\lambda/2$ plate 422 have substantially the same in-plane phase difference Re. In this case, "substantially the same" means that a difference between these in-plane phase differences Re is less than 5 nm. The difference in in-plane phase difference Re is preferably less than 1 nm.

General-purpose phase difference plates may be used for the $\lambda/4$ plates 411 and 421 and the $\lambda/2$ plates 412 and 422. More specifically, it is preferable to use, for example, a phase difference plate which is generally distributed as a circular polarizer or the like of an anti-reflection film. In the disclosure, by preferably controlling the optical axis setting of each optical film within a predetermined range to be described later, the contrast ratio and the viewing angle can be improved even when not a special phase difference plate but a general-purpose phase difference plate is used as the $\lambda/4$ plate and the $\lambda/2$ plate in spite of the transflective liquid crystal display device of the transverse electrical field mode. Thus, the above-mentioned display device is also useful as an in-cell type touch panel, thereby making it possible to achieve cost reduction. In particular, from the user's point of view, the device is very useful because the total cost can be reduced. When the transflective liquid crystal display device of the disclosure is used not only as a built-in touch panel such as an in-cell type touch panel but also as an external touch panel, cost reduction can be similarly achieved.

Specifically, it is preferable to use a uniaxial A plate as the $\lambda/4$ plates 411 and 421 and the $\lambda/2$ plates 412 and 422.

As described above, in the disclosure, since each of the phase difference layers 41 and 42 includes the $\lambda/4$ plate and the $\lambda/2$ plate, and at least one of the phase difference layers 41 and 42 further includes the positive C plate, it is possible to achieve excellent viewing angle characteristics and high contrast in the obtained liquid crystal display device. In particular, brightness floating (also referred to as black floating) at the time of black display is sufficiently suppressed, and the viewing angle at the time of black display is widened. From the viewpoint of further exhibiting the effect, it is suitable for the positive C plate to be located between the $\lambda/4$ plate and the $\lambda/2$ plate. In particular, when the phase difference layer includes one positive C plate, this arrangement is preferable. In the present embodiment, only the second phase difference layer 42 includes one positive C plate 44. In this case, it is suitable that the $\lambda/4$ plate 421, the positive C plate 44, and the $\lambda/2$ plate 422 are located in this order from the liquid crystal layer 20 (and the second substrate 30) side (see FIG. 1).

The positive C plate 44 (and positive C plates 43, 45, 46 and the like described below) may be each formed of a single film or may be a layered body of two or more phase difference films.

In the present specification, a portion (structural body) that is interposed between layers other than the positive C plate and that functions as a positive C plate is counted as "one positive C plate". At this time, it does not matter whether or not the positive C plate is a layered body. Thus, for example, when the phase difference layer includes a λ/4 plate, a positive C plate having a multilayer structure, and a λ/2 plate in this order, it is said that "the phase difference layer includes one positive C plate". When the phase difference layer includes a λ/4 plate, two commercially-available positive C plates, and a λ/2 plate in this order, it is also said that "the phase difference layer includes one positive C plate". When the phase difference layer includes a λ/4 plate, a first positive C plate (regardless of whether it is a layered body or not), a λ/2 plate, and a second positive C plate (regardless of whether it is a layered body or not) in this order, it is said that "the phase difference layer includes two positive C plates".

As the positive C plate 44 (and the positive C plates 43, 45, 46, and the like to be described below), for example, it is preferable to use a plate obtained by subjecting a film containing a material having negative intrinsic birefringence as a component to longitudinal and lateral biaxial stretching processing, a plate coated with a liquid crystalline material such as nematic liquid crystal, or the like. Examples of the material having negative intrinsic birefringence include a resin composition containing an acrylic resin and a styrene resin, polystyrene, polyvinyl naphthalene, polyvinyl biphenyl, polyvinyl pyridine, polymethyl methacrylate, polymethyl acrylate, an N-substituted maleimide copolymer, polycarbonate having a fluorene skeleton, and triacetylcellulose (particularly having a low degree of acetylation).

Specific examples of the positive C plate 44 (and the positive C plates 43, 45, 46, and the like) include a positive C plate manufactured by ENEOS Corporation or Hayashi Telempu Co., Ltd., and a Positive-C phase difference film manufactured by Nippon Kayaku Co., Ltd.

From the viewpoint of further exhibiting the viewing angle improvement effect, the thickness-direction phase difference Rth of the positive C plate 44 (and the positive C plate 43) is preferably 150 to 270 nm. More preferably, it is from 160 to 250 nm, and still more preferably from 170 to 240 nm.

The thickness of each of the positive C plate 44 (and the positive C plate 43) is preferably, for example, 0.1 to 100 μm. Within this range, more excellent mechanical strength and display uniformity can be obtained. More preferably, the thickness thereof is 0.1 to 80 μm, and still more preferably 0.1 to 50 μm. When the positive C plate 44 (and positive C plate 43) each have a layered structure, the total thickness of each plate is preferably set to be within the above range, and the thicknesses of each phase difference film may be the same or may be different from each other.

The phase difference layer including the positive C plate (corresponding to the second phase difference layer 42 in the present embodiment) may include another positive C plate (referred to as a second positive C plate) different from the above positive C plate. In this case, it is preferable for the second positive C plate to be located between the λ/2 plate and the polarizer. In a second embodiment described below, an aspect in which a first phase difference layer 41 includes a first positive C plate and a second positive C plate will be described in detail. In a third embodiment described below, an aspect in which a first phase difference layer 41 and a second phase difference layer 42 each include a first positive C plate and a second positive C plate will be described in detail.

In the disclosure, from the viewpoint of further improving viewing angle characteristics and contrast, it is particularly suitable to satisfy any of the following (i) to (iii). Among them, in the present embodiment, an aspect satisfying the following (i) is described in detail (see FIG. 2). In the second embodiment to be described later, an aspect satisfying the following (ii) will be described in detail. In the third embodiment, an aspect satisfying the following (iii) will be described in detail.

(i) The second phase difference layer 42 includes one positive C plate, and the first phase difference layer 41 includes no positive C plate.
(ii) A second phase difference layer 42 includes one positive C plate, and a first phase difference layer 41 includes two positive C plates.
(iii) Each of a first phase difference layer 41 and a second phase difference layer 42 includes two positive C plates.

Polarizer

The first polarizer 51 is located on the back face side relative to the first phase difference layer 41 (see FIG. 1 and FIG. 2). The second polarizer 52 is located on the observation face side relative to the second phase difference layer 42 (see FIG. 1 and FIG. 2). The polarizers 51 and 52 may each be a circular polarizer or a linear polarizer. Here, the linear polarizer means a polarizer having a function of extracting polarized light (linearly polarized light) vibrating only in a specific direction from unpolarized light (natural light), partially polarized light, or polarized light, and is distinguished from a circular polarizer. In particular, the polarizers 51 and 52 are preferably the linear polarizers.

The polarizers 51 and 52 may each be an absorption-type polarizer or a reflection-type polarizer. The absorption-type polarizer is a polarizer having a function of absorbing light vibrating in a specific direction and transmitting polarized light (linearly polarized light) vibrating in a direction perpendicular to such a specific direction. The reflection-type polarizer is a polarizer having a function of reflecting light vibrating in a specific direction and transmitting polarized light (linearly polarized light) vibrating in a direction perpendicular to such a specific direction. In particular, the polarizers 51 and 52 are preferably the absorption-type polarizers. In particular, the absorption-type linear polarizers are suitably used.

Examples of the absorption-type polarizer include a polarizer obtained by dying and adsorbing a polyvinyl alcohol film with an anisotropic material such as an iodine complex (or dye), which is followed by stretching and orienting the film. In general, when the absorption-type polarizer is put to practical use, in order to ensure mechanical strength and resistance to moisture and heat, a protection film such as a triacetyl cellulose film is layered on both sides of the polyvinyl alcohol film. Examples of the reflection-type polarizer include a film in which a plurality of dielectric thin films are layered, a film in which a plurality of thin films having different refractive index anisotropy are layered, a nanowire grid polarizer, and a polarizer using selective reflection of a Cholesteric LC.

Other Configurations

In the liquid crystal display device 1 according to the present embodiment, display is performed in the transverse electrical field mode in which the liquid crystal layer 20 takes a twist alignment when no voltage is applied. This makes it possible to achieve a sufficiently improved contrast ratio of the reflective display. A twist angle $\theta_1$ of the liquid crystal layer 20 when no voltage is applied is suitably 70° or greater and 85° or less. A more preferable range will be described later.

The twist angle $\theta_1$ of the liquid crystal layer 20 is an angle formed by the orientation direction of the liquid crystal molecules 21 defined by the first horizontal alignment film 140 and the orientation direction of the liquid crystal molecules 21 defined by the second horizontal alignment film 340. That is, the angle is formed by the long-axis direction of the liquid crystal molecules 21A in the vicinity of the first horizontal alignment film 140 (also referred to as the liquid crystal molecules 21A on the first substrate 10 side when no voltage is applied) and the long-axis direction of the liquid crystal molecules 21B in the vicinity of the second horizontal alignment film 340 (also referred to as the liquid crystal molecules 21B on the second substrate 30 side when a voltage is applied).

The liquid crystal display device 1 is suitably in a normally black mode from the viewpoint of further increasing a contrast ratio. The normally black mode is a display mode in which black display is performed in a voltage non-applied state and white display is performed in a voltage applied state.

The liquid crystal display device 1 preferably further includes a light source. In the present embodiment, the liquid crystal display device 1 further includes the light source 61 (also referred to as backlight) on the back face side relative to the liquid crystal layer 20 (see FIG. 1). The light source 61 (backlight) is not particularly limited as long as the light source 61 emits light, and may be a direct type, an edge type, or any other type. Specifically, for example, the light source 61 preferably has a light source such as a light emitting diode (LED), a light guide plate, and a reflective sheet, and may further include a diffuser sheet or a prism sheet.

In addition to the above-mentioned members, the liquid crystal display device 1 is configured by a plurality of members such as an external circuit such as a tape carrier package (TCP) and printed wiring board (PCB); an optical film such as a viewing angle expansion film and a brightness enhancement film; and a bezel (frame), and some of such members may be incorporated into another member. Such members are not particularly limited, and those commonly used in the field of liquid crystal display devices can be used, and thus, the explanation will be omitted.

Examples of Preferred Optical Settings

Hereinafter, preferable optical axis settings of each optical film (i.e., polarizer and phase difference layer) and verification results having achieved the settings will be further described. The absorption-type polarizer is used as the polarizer. As the liquid crystal layer 20, a liquid crystal layer that performs normally black display in a monodomain structure is assumed, and a negative-type liquid crystal material is used as a liquid crystal material constituting the liquid crystal layer 20. Since the slow axis angle of the positive C plate is in the film normal direction (i.e., 90° when the orientation direction of the liquid crystal molecules 21A defined by the first horizontal alignment film 140 is 0°), the examination was performed in an aspect with no positive C plate provided. In a case where the positive C plate is provided, each of the preferable settings is the same.

(I) Preferred Settings

Figure 8:
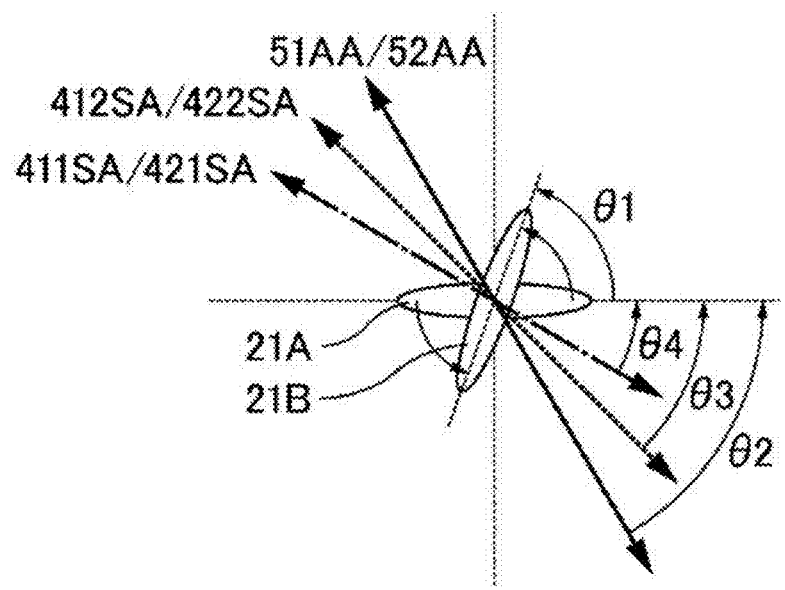
FIG. 8 is a plan view conceptually illustrating a relationship between a long-axis direction of a liquid crystal molecule 21A of the liquid crystal layer 20 and an optical axis of each optical film when no voltage is applied in the liquid crystal display device 1.

FIG. 8 is a plan view conceptually illustrating a relationship between the long-axis direction of the liquid crystal molecule 21A included in the liquid crystal layer 20 when no voltage is applied and the optical axis of each optical film (i.e., the in-plane slow axes of the λ/4 plate and the λ/2 plate, and the polarization axis of the polarizer), in the liquid crystal display device 1 (see FIG. 1) including the first polarizer 51, the first phase difference layer 41, the first substrate 10, the liquid crystal layer 20, the second substrate 30, the second phase difference layer 42, and the second polarizer 52 in order from the back face side toward the observation face side. In FIG. 8, as the liquid crystal molecule 21, the liquid crystal molecule 21A in the vicinity of the first horizontal alignment film 140 and the liquid crystal molecule 21B in the vicinity of the second horizontal alignment film 340 are illustrated.

Figure 9:
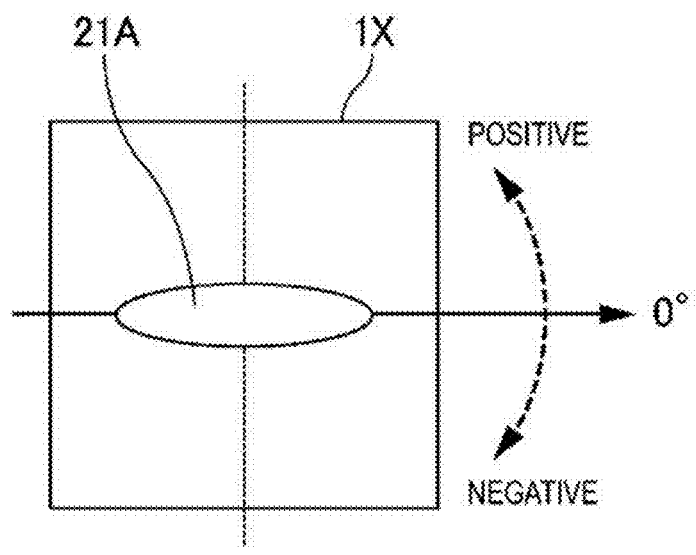
FIG. 9 is a diagram for explaining an optical axis angle of an optical film.

In the present specification, unless otherwise specified, each angle (for example, a twist angle, an optical axis angle, or the like) is an angle when the orientation direction of the liquid crystal molecule 21A defined by the first horizontal alignment film 140 is taken as a reference azimuthal direction, i.e., a 0° direction (3 o'clock direction) and the twist direction is positive (counterclockwise) while regarding the liquid crystal panel 1X as a dial (see FIG. 9). FIG. 9 is a diagram for explaining the optical axis angle of the optical film.

The twist angle $\theta_1$ of the liquid crystal layer 20 when no voltage is applied is suitably 70° or greater and 85° or less. It is more preferably 75° or more and 85° or less, still more preferably 80° or more and 85° or less, particularly preferably 81° or more and 84° or less, and most preferably around 83° (substantially 83°).

The angle of a polarization axis 51AA of the first polarizer 51 ($\theta_2$ in FIG. 8) is preferably 33.6° to 40.2°. It is more preferably 34.1° to 39.7°, still more preferably 34.8° to 39.0°, and particularly preferably 35.2° to 38.6°.

The angle of an in-plane slow axis 412SA of the first λ/2 plate 412 ($\theta_3$ in FIG. 8) is preferably 48.8° to 52.1°. It is more preferably 49.1° to 51.8°, still more preferably 49.4° to 51.5°, and particularly preferably 49.6° to 51.3°.

The angle of an in-plane slow axis 411SA of the first λ/4 plate 411 ($\theta_4$ in FIG. 8) is preferably −74.8° to −68.2°. It is more preferably from −74.3° to −68.7°, still more preferably from −73.6° to −69.4°, particularly preferably from −73.2° to −69.9°.

Thus, the polarization axis 51AA of the first polarizer 51, the in-plane slow axis 412SA of the first λ/2 plate 412, and the in-plane slow axis 411SA of the first λ/4 plate 411 are preferably located at the angles of 33.6° to 40.2°, 48.8° to 52.1°, and −74.8° to −68.2°, respectively, more preferably 34.1° to 39.7°, 49.1° to 51.8°, and −74.3° to −68.7°, respectively, still more preferably 34.8° to 39.0°, 49.4° to 51.5°, and −73.6° to −69.4°, respectively, and particularly preferably 35.2° to 38.6°, 49.6° to 51.3°, and −73.2° to −69.9°, respectively.

The angle of an in-plane slow axis 421SA of the second λ/4 plate 421 ($\theta_4$ in FIG. 8) is preferably −26.9° to −22.9°. It is more preferably −26.5° to −23.5°, still more preferably −26.0° to −24.0°, particularly preferably −25.5° to −24.5°.

The angle of an in-plane slow axis 422SA of the second λ/2 plate 422 ($\theta_3$ in FIG. 8) is preferably −51.5° to −47.5°. It is more preferably −51.0° to −48.0°, still more preferably −50.5° to −48.5°, and particularly preferably −50.0° to −49.0°.

The angle of a polarization axis 52AA of the second polarizer 52 ($\theta_2$ in FIG. 8) is preferably −69.5° to −64.0°. It is more preferably −69.2° to −65.5°, still more preferably −68.9° to −66.5°, and particularly preferably −68.6° to −67.5°.

Thus, the polarization axis 52AA of the second polarizer 52, the in-plane slow axis 422SA of the second λ/2 plate 422, and the in-plane slow axis 421SA of the second λ/4 plate 421 are preferably located at the angles of −69.5° to −64.0°, −51.5° to −47.5°, and −26.9° to −22.9°, respectively, more preferably −69.2° to −65.5°, −51.0° to −48.0°, and −26.5° to −23.5°, respectively, still more preferably −68.9° to −66.5°, −50.5° to −48.5°, and −26.0° to −24.0°, respectively, and particularly preferably −68.6° to −67.5°, −50.0° to −49.0°, and −25.5° to −24.5°, respectively.

(II) Verification Results by Optical Simulation

The above-described preferable settings have been found by verification using optical simulation by the inventors of the disclosure of the present application. Shintech Optics Master produced by SHINTECH Inc. was used as simulation software. The verification results are described below.

There was assumed the liquid crystal display device 1 (see FIG. 1) including the λ/4 plate 411, the λ/2 plate 412, and polarizer 51 in order from the liquid crystal panel 1X side on the back face side of the reflection-type liquid crystal panel 1X using a negative-type liquid crystal material, and also including the λ/4 plate 421, the λ/2 plate 422, and the polarizer 52 in order from the liquid crystal panel 1X side on the observation face side of the liquid crystal panel 1X. The retardation dΔn of the liquid crystal layer 20 was 245 nm. A uniaxial phase difference plate with the retardation Re being 140 nm was used as the λ/4 plates 411 and 421, and a uniaxial phase difference plate with the retardation Re being 270 nm was used as the λ/2 plates 412 and 422. The wavelength dispersion of each of these phase difference plates was set to be flat.

The orientation direction of the liquid crystal molecule 21A defined by the first horizontal alignment film 140 was set to the 90° direction (12 o'clock direction), and the twist angle $\theta_1$ was fixed to 83°. The verification was carried out in a state where no voltage was applied.

(II-1) Each optical axis setting of the optical film located on the observation face side (also referred to as a front-side optical film) of the liquid crystal panel 1X was fixed to an optimum value of the optical axis setting in the reflective liquid crystal display device. The setting mentioned above is depicted in Table 1. Then, each optical axis setting of the optical film located on the back face side (also referred to as a back-side optical film) of the liquid crystal panel 1X was changed in increments of 0.5° from a predetermined start angle to a predetermined end angle to calculate transmission mode efficiency of black display (that is, when no voltage was applied). The calculation ranges are depicted in Table 2. The transmission mode efficiency of the black display is also referred to as "black transmission mode efficiency". In the calculation process, the calculation was repeated in such a manner that only one of the optical axes was changed while the other optical axes were fixed.

TABLE 1

| Front-side optical film | Optical axis | Reference sign | Angle |
| --- | --- | --- | --- |
| Polarizer 52 | Absorption axis | 52AA | −68.3° |
| λ/2 plate 422 | Slow axis | 422SA | −49.5° |
| λ/4 plate 421 | Slow axis | 421SA | −24.9° |

TABLE 2

| Back-side optical film | Start | End | Increment |
| --- | --- | --- | --- |
| λ/4 plate 411 | −90° | 90° | 0.5° |
| λ/2 plate 412 | −90° | 90° | 0.5° |
| Polarizer 51 | −90° | 90° | 0.5° |

Here, the transmission mode efficiency was determined by Formula (1) given below:

Transmission mode efficiency (%)=(brightness with front polarizer)/(brightness without front polarizer)×100. The front polarizer means a polarizer located on the observation face side of the liquid crystal panel 1X, that is, the second polarizer 52.

Figure 11:
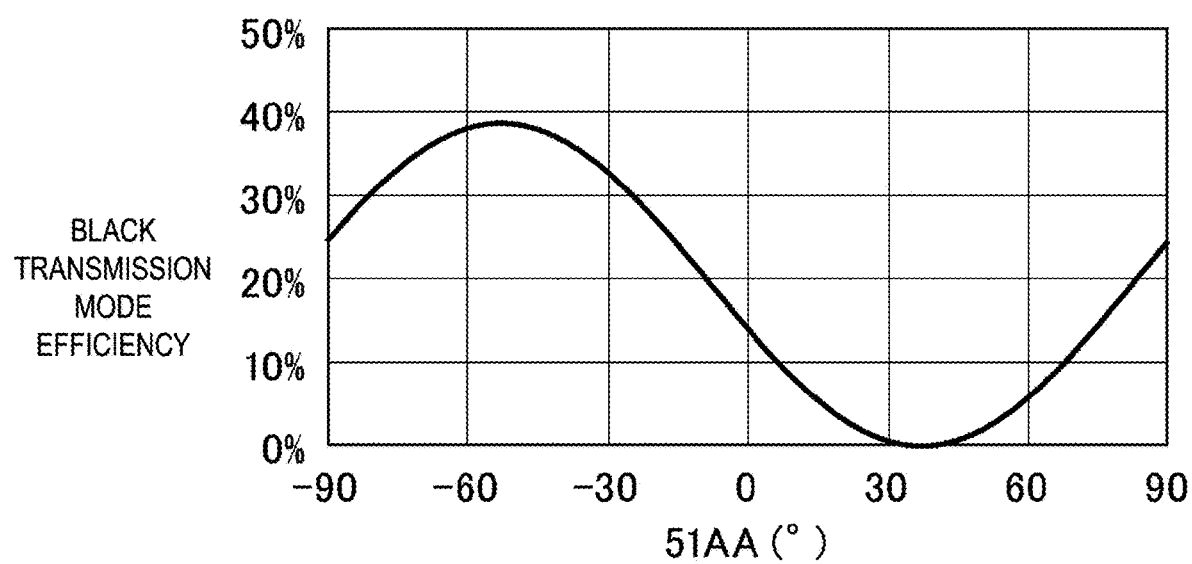
FIG. 11 is a graph depicting black transmission mode efficiency.

An example of the calculation results is depicted in FIG. 11. FIG. 11 is a graph depicting black transmission mode efficiency when the polarization axis 51AA of the first polarizer 51 is changed while the in-plane slow axis 411SA of the first λ/4 plate 411 is fixed at −71.5° and the in-plane slow axis 412SA of the first λ/2 plate 412 is fixed at 50.5°.

(II-2) The black transmission mode efficiency was calculated by changing the vicinity of each axis setting at which the black transmission mode efficiency calculated in the above (II-1) was minimum in increments of 0.1°. The calculation ranges are depicted in Table 3.

TABLE 3

| Back-side optical film | Start | End | Increment |
| --- | --- | --- | --- |
| λ/4 plate 411 | −80° | −65° | 0.1° |
| λ/2 plate 412 | 45° | 60° | 0.1° |
| Polarizer 51 | 30° | 45° | 0.1° |

Figure 12A:
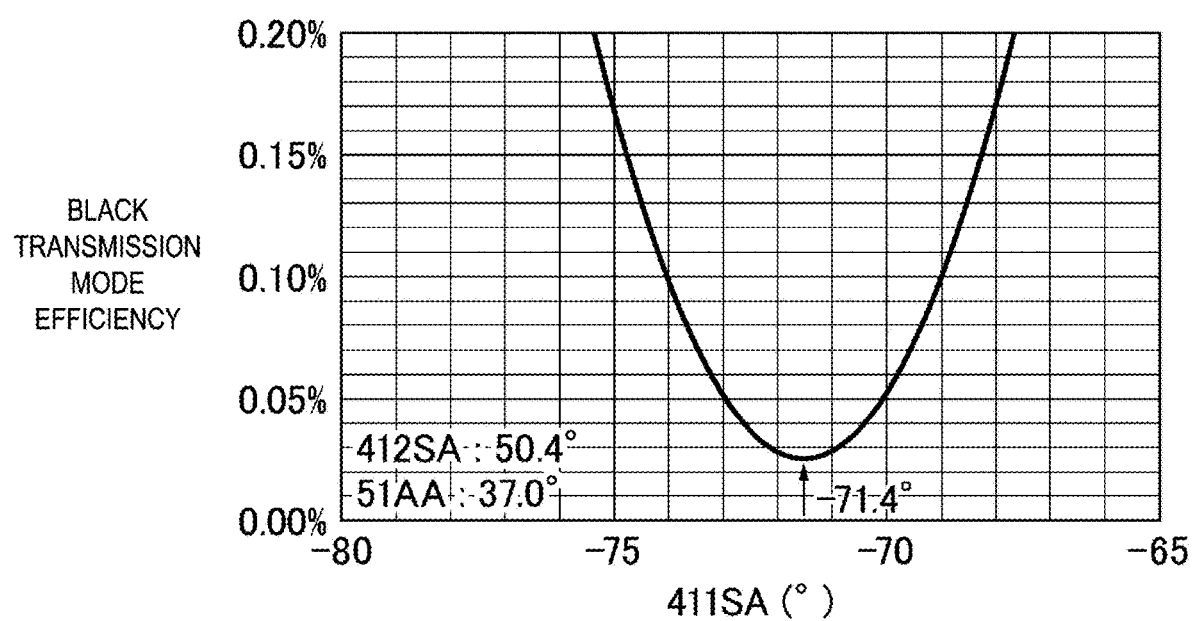
FIG. 12A is a graph depicting black transmission mode efficiency.
Figure 12B:
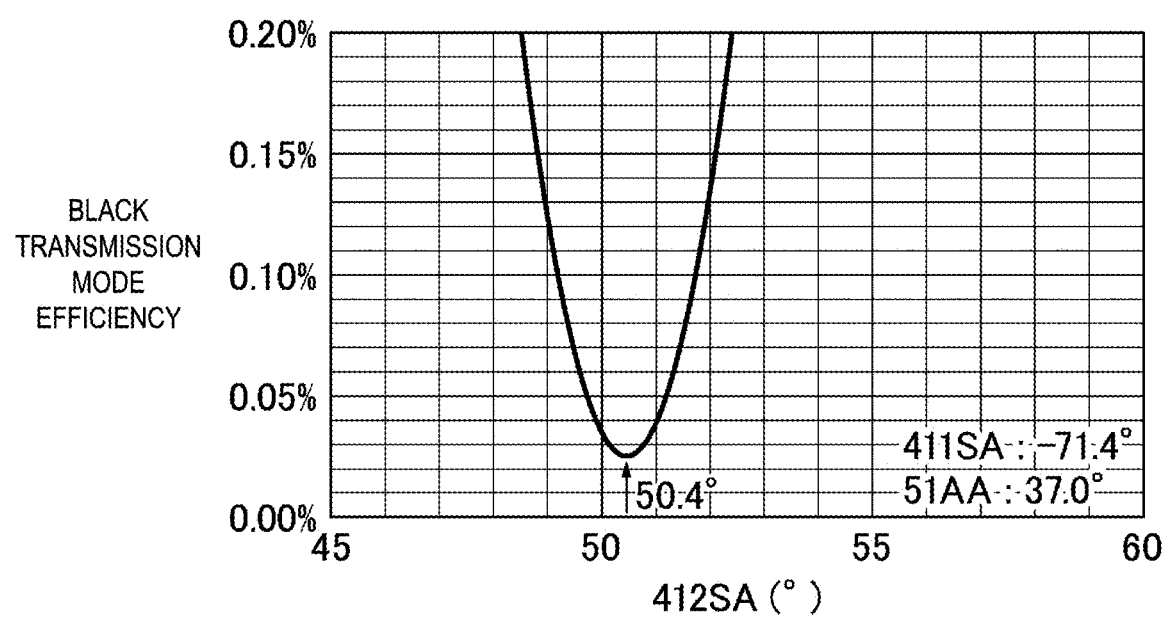
FIG. 12B is a graph depicting black transmission mode efficiency.
Figure 12C:
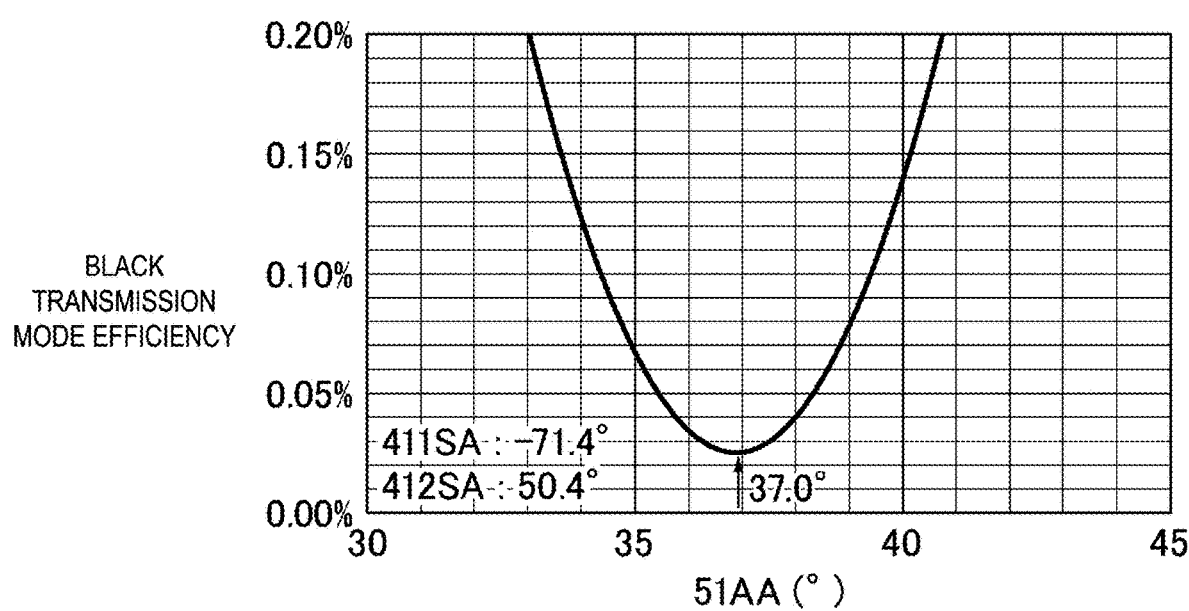
FIG. 12C is a graph depicting black transmission mode efficiency.

The calculation results are depicted in FIG. 12A to FIG. 12C. FIG. 12A is a graph depicting black transmission mode efficiency when the in-plane slow axis 411SA of the first λ/4 plate 411 is changed while the in-plane slow axis 412SA of the first λ/2 plate 412 is fixed at 50.4° and the polarization axis 51AA of the first polarizer 51 is fixed at 37.0°. FIG. 12B is a graph depicting black transmission mode efficiency when the in-plane slow axis 412SA of the first λ/2 plate 412 is changed while the in-plane slow axis 411SA of the first λ/4 plate 411 is fixed at −71.4° and the polarization axis 51AA of the first polarizer 51 is fixed at 37.0°. FIG. 12C is a graph depicting black transmission mode efficiency when the polarization axis 51AA of the first polarizer 51 is changed while the in-plane slow axis 411SA of the first λ/4 plate 411 is fixed at −71.4° and the in-plane slow axis 412SA of the first λ/2 plate 412 is fixed at 50.4°.

(II-3) The axis setting at which the black transmission mode efficiency calculated by the above (II-2) was minimum was taken as an optimum value. The setting mentioned above is depicted in Table 4.

TABLE 4

| Back-side optical film | Optical axis | Reference sign | Angle |
| --- | --- | --- | --- |
| λ/4 plate 411 | Slow axis | 411SA | −71.4° |
| λ/2 plate 412 | Slow axis | 412SA | 50.4° |
| Polarizer 51 | Absorption axis | 51AA | 37.0° |

In each of the graphs of FIG. 12A to FIG. 12C, the ranges in which the black transmission mode efficiencies are 0.16% or less, 0.12% or less, 0.08% or less, and 0.06% or less are taken as the above-described preferable range (corresponding to a range in which black display is possible), more preferable range, still more preferable range, and particularly preferable range, respectively, of each optical axis setting. From the results of 3D simulation ("Shintech LCD Master 3D" produced by SHINTECH Co., Ltd.), when the transmission mode efficiency at the time of white display is 12%, the contrasts in the preferable range, more preferable range, still more preferable range, and particularly preferable range are 75 or more, 100 or more, 150 or more, and 200 or more, respectively, of each optical axis setting.

Figure 10:
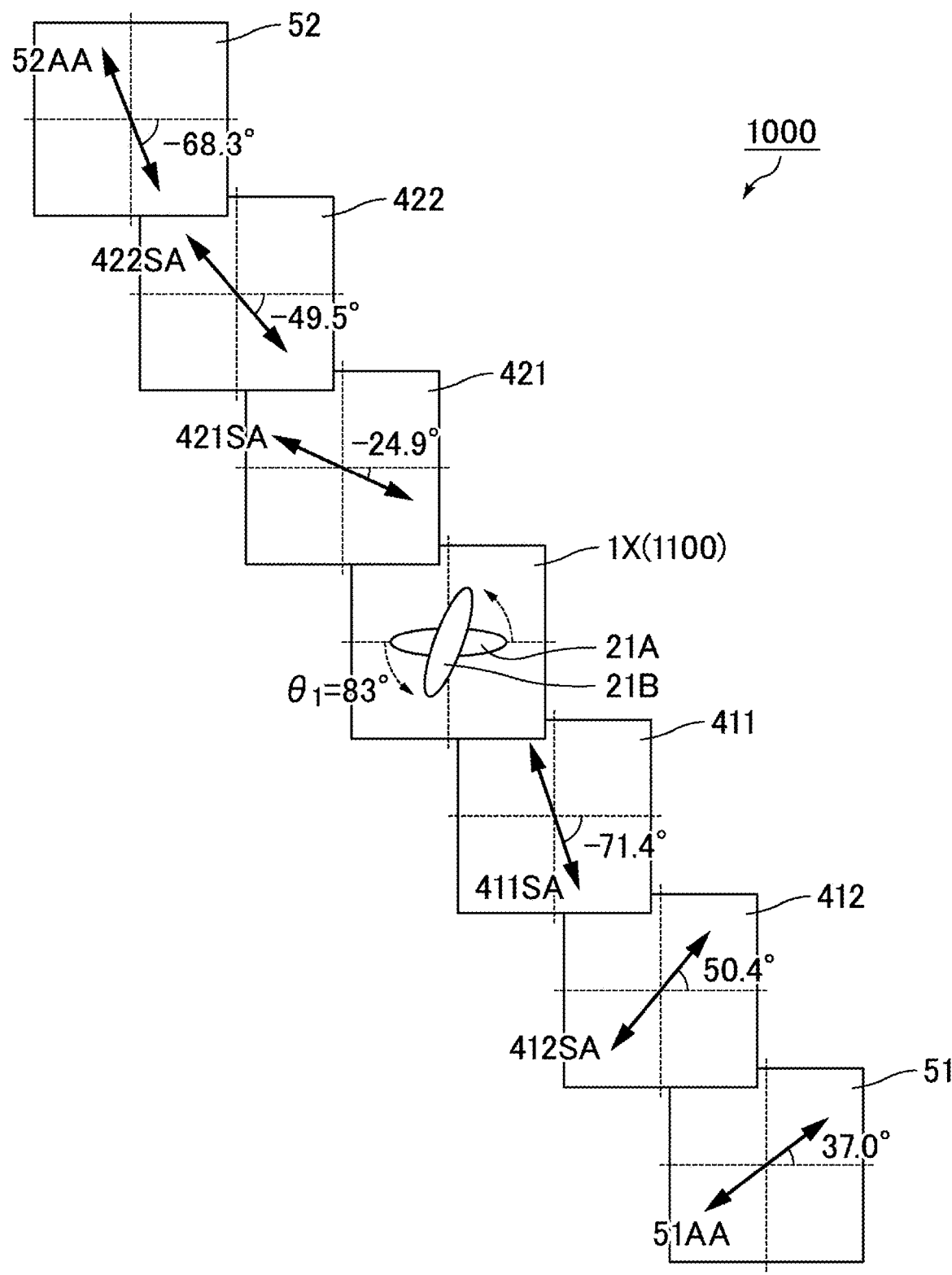
FIG. 10 is a diagram conceptually illustrating an optical axis setting.

FIG. 10 illustrates the most preferable optical axis setting from the viewpoint of improving the contrast ratio. FIG. 10 is a diagram conceptually illustrating the most preferable optical axis setting. In this optical axis setting diagram, the in-plane phase difference Re of the λ/4 plates 411 and 421 is 140 nm, and the in-plane phase difference Re of the λ/2 plates 412 and 422 is 270 nm.

Application Example

The liquid crystal display device 1 according to the present embodiment is suitably used for various purposes. In particular, the liquid crystal display device 1 can be preferably applied to a touch panel. Even when applying the liquid crystal display device 1 to either an external touch panel or a built-in touch panel, the contrast ratio can be improved at a lower cost than a known touch panel, hence being useful. In particular, the liquid crystal display device 1 can be suitably applied to the built-in touch panel, and can be particularly suitably applied to an in-cell type touch panel. Thus, when the liquid crystal display device 1 according to the present embodiment is used, it is possible to suitably achieve an in-cell type touch panel capable of performing display in a reflection mode.

Since the in-cell type touch panel capable of performing display in a reflection mode can be achieved, a frame wiring line region required for an external touch panel can be eliminated, for example, and thus, it is possible to achieve frame narrowing, and a touch panel function can be mounted without a cover glass, and thus, it is possible to contribute to reduction in thickness and weight. The touch function and the display function are driven in a time division manner, and thus, the touch panel is not affected by Liquid Crystal Display (LCD) noise which may be the largest noise source. That is, a killer pattern is not generated, and thus, tuning (adjustment) of the touch signal is easy. Further, a loss of reflected light is sufficiently small, a pen writing is more natural, and a display without a sense of incongruity is obtained. Compared with the external touch panel, a total cost can be reduced from the user's viewpoint. Input by a finger and a pen input by an electromagnetic induction method (EMR) can be combined, and a highly accurate pen writing can be achieved.

Figure 13:
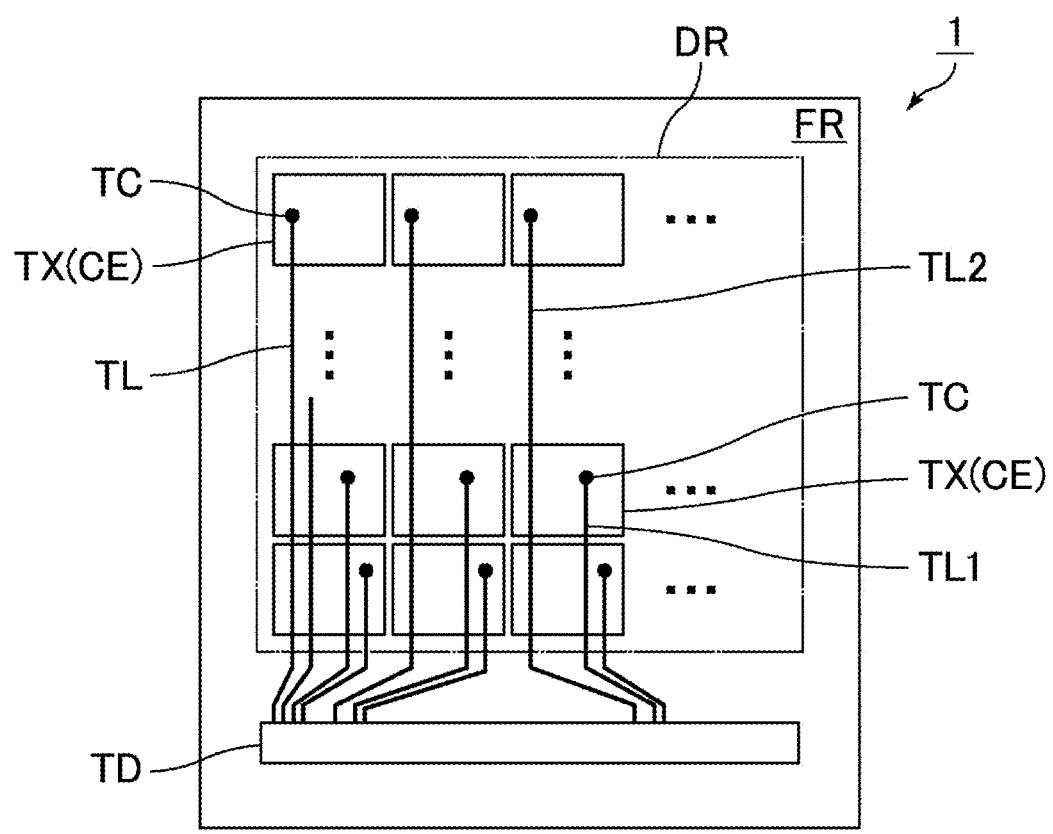
FIG. 13 is a schematic plan view exemplifying an arrangement relationship between a touch sensor electrode TX and a touch wiring line TL included in the liquid crystal display device 1.

An example in which the liquid crystal display device 1 is used as the in-cell type touch panel will be further described. FIG. 13 is a schematic plan view exemplifying an arrangement relationship between a touch sensor electrode TX and a touch wiring line TL included in the liquid crystal display device 1. As illustrated in FIG. 13, the liquid crystal display device 1 includes a display region DR and a non-display region FR. The display region DR is defined by a plurality of pixels P (see, for example, FIG. 3) arrayed in a matrix shape. The non-display region FR is located around the display region DR, and is also referred to as a peripheral region or a frame region.

Within the display region DR, the common electrode CE is divided into a plurality of segments TX. Each segment (common electrode portion) TX functions as a touch sensor electrode. In the example illustrated in FIG. 13, each touch sensor electrode TX is provided corresponding to two or more pixels P.

The liquid crystal display device 1 (more specifically, the first substrate 10) includes a plurality of the touch wiring lines TL. Each touch sensor electrode TX is electrically connected to a corresponding touch wiring line TL. A connection portion TC between the touch sensor electrode TX and the touch wiring line TL is also referred to as a touch wiring line contact portion TC.

The touch wiring line TL is connected to a touch drive unit TD provided in the non-display region FR. The touch drive unit TD is configured to switch, for example, between a display mode in which the plurality of touch sensor electrodes TX function as the common electrode CE, and a touch detection mode in which the plurality of touch sensor electrodes TX function as the touch sensor electrode TX, in a time division manner. The touch drive unit TD, for example, applies a common signal to the touch sensor electrode TX (common electrode CE) through the touch wiring line TL in the display mode. On the other hand, in the touch detection mode, the touch drive unit TD applies a touch drive signal to the touch sensor electrode TX through the touch wiring line TL.

In FIG. 13, the plurality of touch wiring lines TL extend in a column direction (the same direction as the source wiring line SL). Some touch wiring lines TL extend across one or a plurality of other touch sensor electrodes TX to the corresponding touch sensor electrodes TX.

When attention is paid to one touch sensor electrode TX, a first touch wiring line TL1 for supplying a signal to the one touch sensor electrode TX extends to the touch wiring line contact portion TC, and a second touch wiring line TL2 for supplying a signal to another touch sensor electrode TX extends across the one touch sensor electrode TX. The second touch wiring line TL2 and a touch sensor electrode TX overlap each other with an insulating layer interposed therebetween. Note that depending on a position of the touch sensor electrode TX, two or more touch wiring lines TL may be arranged so as to extend across the touch sensor electrode TX, or no touch wiring line TL crossing the touch sensor electrode TX may be arranged.

In the non-display region FR, in addition to the touch drive unit TD, a peripheral circuit including drive circuits such as a gate driver that supplies a gate signal to the gate bus line (gate wiring line) GL, and a source driver that supplies a source signal to the source bus line (source wiring line) SL is provided (not illustrated). These drive circuits may, for example, be mounted on the first substrate (TFT substrate) 10, or formed as an integral (monolithic) part. A semiconductor chip including some or all of the drive circuits may be mounted on the non-display region FR.

In the in-cell type touch panel, it is particularly preferable to use an In—Ga—Zn—O-based semiconductor for the TFT 110. From the viewpoint of achieving flickerlessness (also referred to as being flicker-free), it is particularly suitable to use a negative-type liquid crystal material. The reason for this is as follows. As a positive-type liquid crystal material, a material having a large flexoelectric coefficient is frequently used, and the flexoelectric coefficient is larger than that of the negative-type liquid crystal material. Accordingly, in a transverse electrical field mode of the FFS mode using the positive-type liquid crystal material, due to an influence of a fine slit electrode on an electrode when a voltage is applied (that is, a fringe electrical field), flexoelectric polarization spontaneously occurs in the liquid crystal layer. It is considered that the liquid crystal responds according to the flexoelectric polarization, and thus, brightness changes at the time of a polarity inversion, and therefore flicker is easily recognized.

First Modified Example of First Embodiment

In the first embodiment, the configuration in which, the first electrode 121 serving as a lower layer electrode is the common electrode CE and the second electrode 122 serving as an upper layer electrode is the pixel electrode PE, has been described. However, conversely, the second electrode 122 may be the common electrode CE and the first electrode 121 may be the pixel electrode PE. In the present example, the second electrode 122 (upper layer electrode) is the common electrode CE, and the first electrode 121 (lower layer electrode) is the pixel electrode PE (see FIG. 14).

Figure 14:
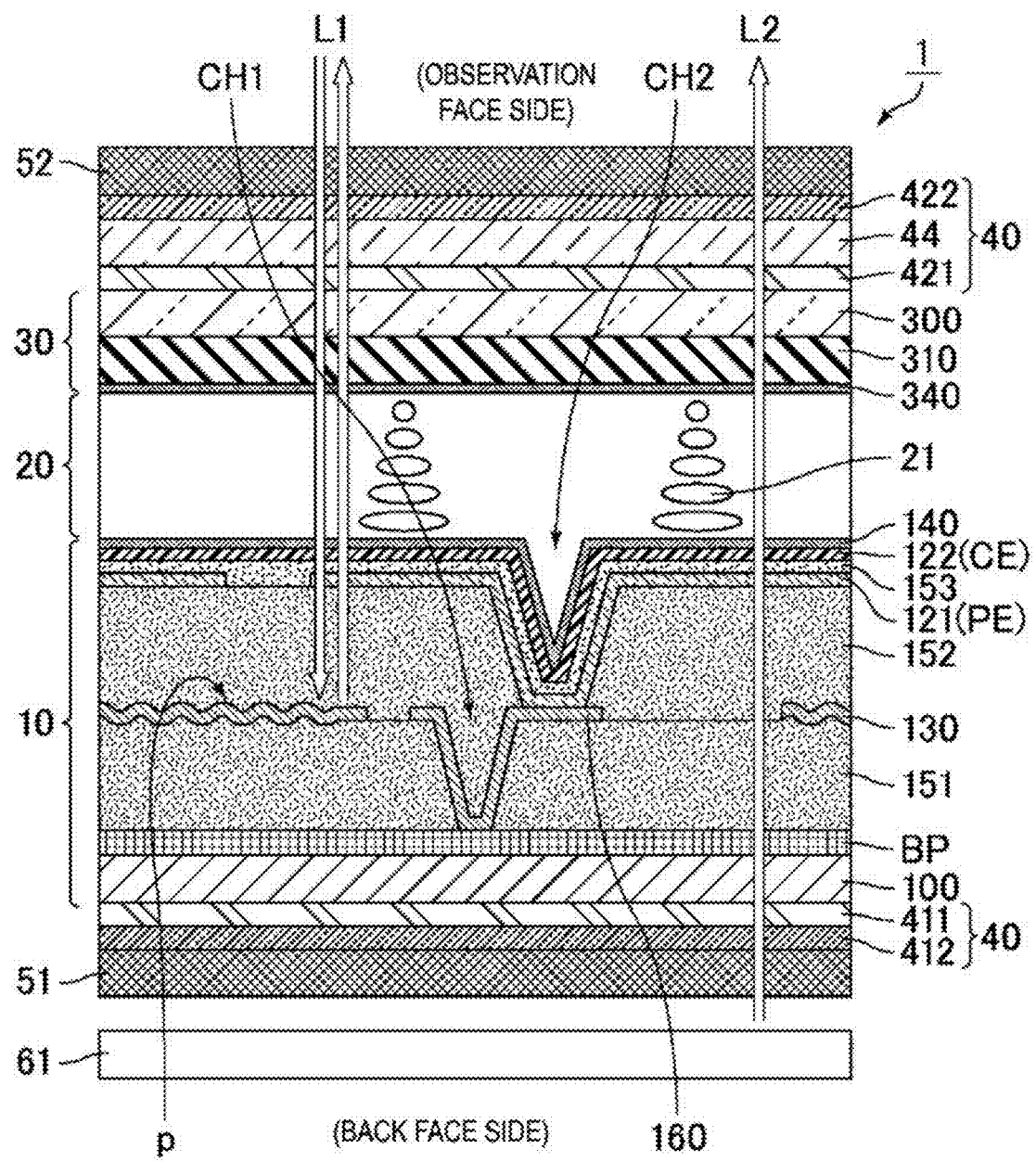
FIG. 14 is a schematic cross-sectional view illustrating more specifically the liquid crystal display device 1.

FIG. 14 is a schematic cross-sectional view illustrating more specifically the liquid crystal display device 1 according to the present example. Also in the present example, it is preferable that, from the viewpoint of easily generating a transverse electrical field, at least the upper layer electrode (common electrode CE in the present example) be a slit electrode. The lower layer electrode (pixel electrode PE in the present example) may be a planar electrode, that is, a so-called solid electrode, or may be a slit electrode. The liquid crystal display device 1 according to the present example is particularly suitable as a liquid crystal display device having a relatively high-definition as described above, that is, a liquid crystal display device in which the pixel P area is relatively small.

Second Modified Example of First Embodiment

In the first embodiment, an FFS mode liquid crystal display device has been described. However, an IPS mode liquid crystal display device may also be possible (note that the liquid crystal layer 20 takes a twist alignment when no voltage is applied). The present modified example is an IPS mode liquid crystal display device. In the present modified example, it is preferable that the first electrode 121 and the second electrode 122 be provided in the same layer, and each of both the first electrode 121 and the second electrode 122 be a slit electrode.

Second Embodiment

In the present embodiment, features unique to the present embodiment will be mainly described, and a description of contents overlapping the above-described first embodiment will be omitted. In the first embodiment, the form in which only the second phase difference layer 42 includes one positive C plate has been described, but in the present embodiment, an aspect in which only the second phase difference layer 42 includes one positive C plate and the first phase difference layer 41 includes two positive C plates (the above-described (ii)) will be described. That is, the second embodiment is substantially the same as the first embodiment except that the first phase difference layer 41 further includes two positive C plates.

Figure 15:
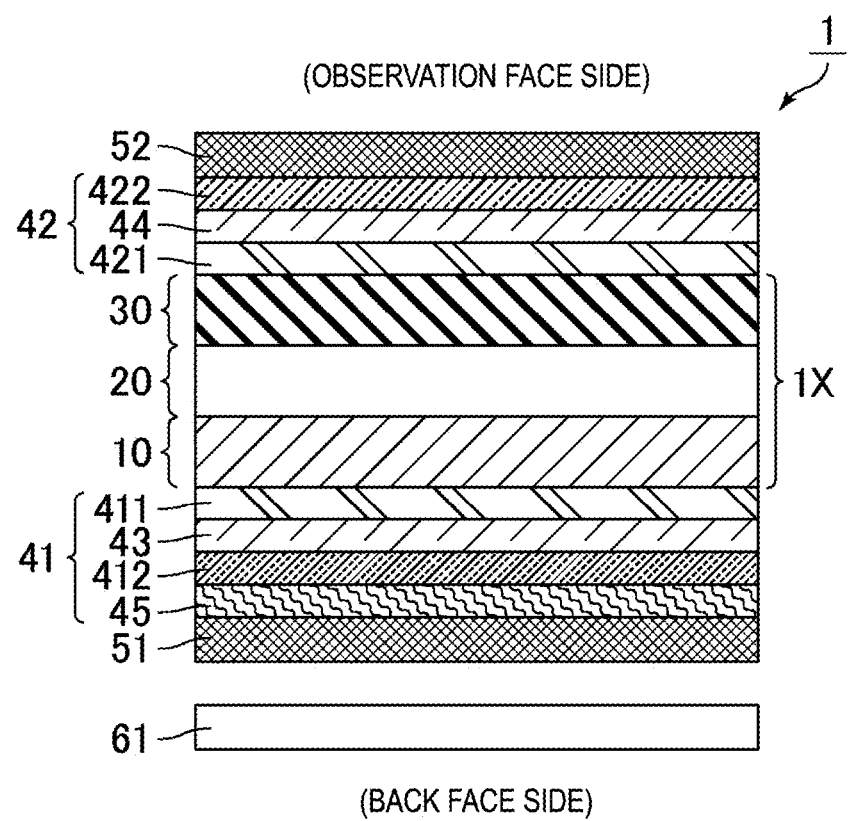
FIG. 15 is a schematic cross-sectional view of the liquid crystal display device 1.

FIG. 15 is a schematic cross-sectional view of a liquid crystal display device 1 according to an example of the present embodiment. As illustrated in FIG. 15, the liquid crystal display device 1 includes a first polarizer 51, the first phase difference layer 41, a first substrate 10, a liquid crystal layer 20, a second substrate 30, the second phase difference layer 42, and a second polarizer 52 in order from a back face side toward an observation face side. The first phase difference layer 41 includes a positive C plate (also referred to as a first positive C plate) 43 and a positive C plate (also referred to as a second positive C plate) 45 in addition to a λ/4 plate 411 and a λ/2 plate 412, and the second phase difference layer 42 includes a λ/4 plate 421, a λ/2 plate 422, and a positive C plate (also referred to as a first positive C plate) 44.

In the case where the first phase difference layer 41 includes the first positive C plate 43 and the second positive C plate 45, and the second phase difference layer 42 includes the positive C plate 44, the viewing angle characteristics are more favorable than those of the first embodiment and a third embodiment to be described later. From the viewpoint of more sufficiently exhibiting such an effect, the first positive C plates 43 and 44 are each preferably located between the λ/4 plate and the λ/2 plate, and the second positive C plate 45 is preferably located between the λ/2 plate and the polarizer. In the present embodiment, the first phase difference layer 41 preferably includes the second positive C plate 45, the λ/2 plate 412, the first positive C plate 43, and the λ/4 plate 411 in order from the back face side, and the second phase difference layer 42 preferably includes the λ/4 plate 421, the positive C plate 44, and the λ/2 plate 422 in order from the back face side (see FIG. 15).

The second positive C plate 45 (and a second positive C plate 46 described later) may be the same as the first positive C plates 43 and 44 (having the same physical properties, the same thickness, and the like) or may be different from the first positive C plates 43 and 44, as long as they are the phase difference plates satisfying the relation of "nz>nx≈ny". However, from the viewpoint of still further exhibiting the viewing angle improvement effect, the thickness-direction phase difference Rth of the second positive C plates 45 and 46 (absolute value) is preferably 50 to 130 nm. More preferably, it is 70 to 120 nm, and still more preferably 80 to 115 nm.

The thickness of each of the second positive C plate 45 (and second positive C plate 46) is preferably, for example, 0.1 to 100 μm. Within this range, more excellent mechanical strength and display uniformity can be obtained. More preferably, the thickness thereof is 0.1 to 80 μm, and still more preferably 0.1 to 50 μm. When the positive C plates 45 and 46 each have a layered structure, the total thickness of each plate is preferably set to be within the above range, and the thicknesses of each phase difference film may be the same or may be different from each other.

Third Embodiment

In the present embodiment, features unique to the present embodiment will be mainly described, and a description of contents overlapping the above-described first and second embodiments will be omitted. In the present embodiment, an aspect in which each of the first phase difference layer 41 and the second phase difference layer 42 includes two positive C plates (the above-described (iii)) will be described. That is, the third embodiment is substantially the same as the second embodiment except that the second phase difference layer 42 further newly includes a positive C plate (also referred to as a second positive C plate) 46 in addition to a positive C plate (also referred to as a first positive C plate) 44.

Figure 16:
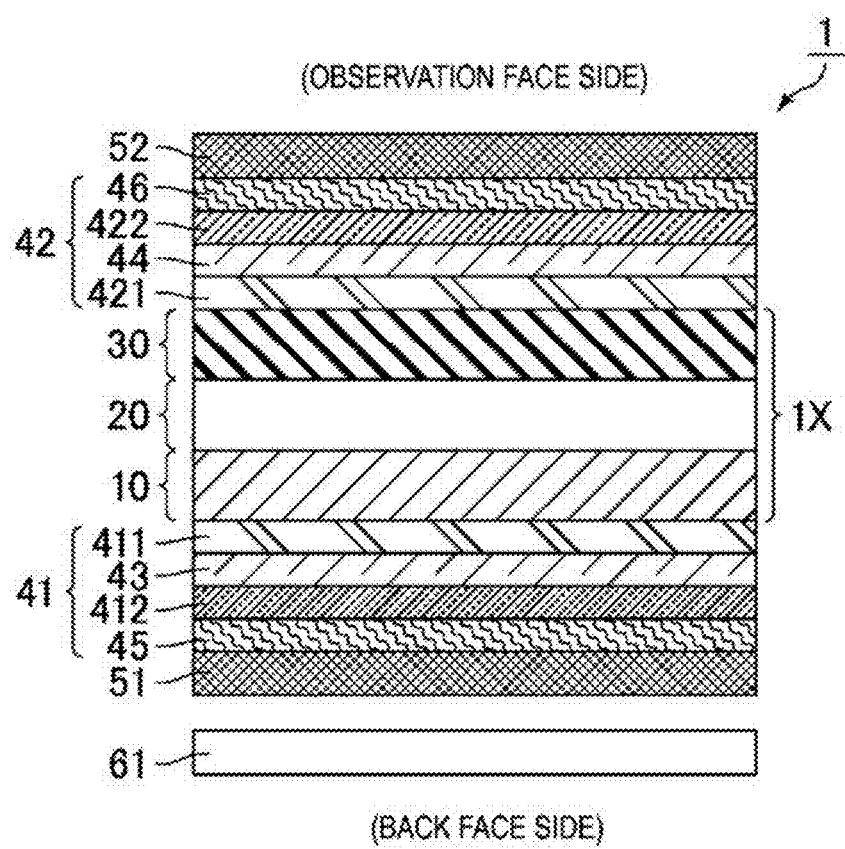
FIG. 16 is a schematic cross-sectional view of the liquid crystal display device 1.

FIG. 16 is a schematic cross-sectional view of a liquid crystal display device 1 according to an example of the present embodiment. As illustrated in FIG. 16, the liquid crystal display device 1 includes a first polarizer 51, the first phase difference layer 41, a first substrate 10, a liquid crystal layer 20, a second substrate 30, the second phase difference layer 42, and a second polarizer 52 in order from a back face side toward an observation face side. The first phase difference layer 41 includes a first positive C plate 43 and a second positive C plate 45 in addition to a λ/4 plate 411 and a λ/2 plate 412. The second phase difference layer 42 includes the first positive C plate 44 and the second positive C plate 46 in addition to a λ/4 plate 421 and a λ/2 plate 422.

In the case where the first phase difference layer 41 includes the first positive C plate 43 and the second positive C plate 45, and the second phase difference layer 42 includes the first positive C plate 44 and the second positive C plate 46, the viewing angle characteristics are more favorable than those of the first embodiment. From the viewpoint of more sufficiently exhibiting such an effect, the first positive C plates 43 and 44 are each preferably located between the λ/4 plate and the λ/2 plate, and the second positive C plates 45 and 46 are each preferably located between the λ/2 plate and the polarizer. In the present embodiment, the first phase difference layer 41 preferably includes the second positive C plate 45, the λ/2 plate 412, the first positive C plate 43, and the λ/4 plate 411 in order from the back face side, and the second phase difference layer 42 preferably includes the λ/4 plate 421, the first positive C plate 44, the λ/2 plate 422, and the second positive C plate 46 in order from the back face side (see FIG. 16).

Fourth Embodiment

In the present embodiment, features unique to the present embodiment will be mainly described, and a description of contents overlapping the above-described first embodiment will be omitted. A liquid crystal display device of the present embodiment is different from the liquid crystal display device of the first embodiment mainly in that a light source is provided on the observation face side relative to a liquid crystal layer 20.

Figure 17:
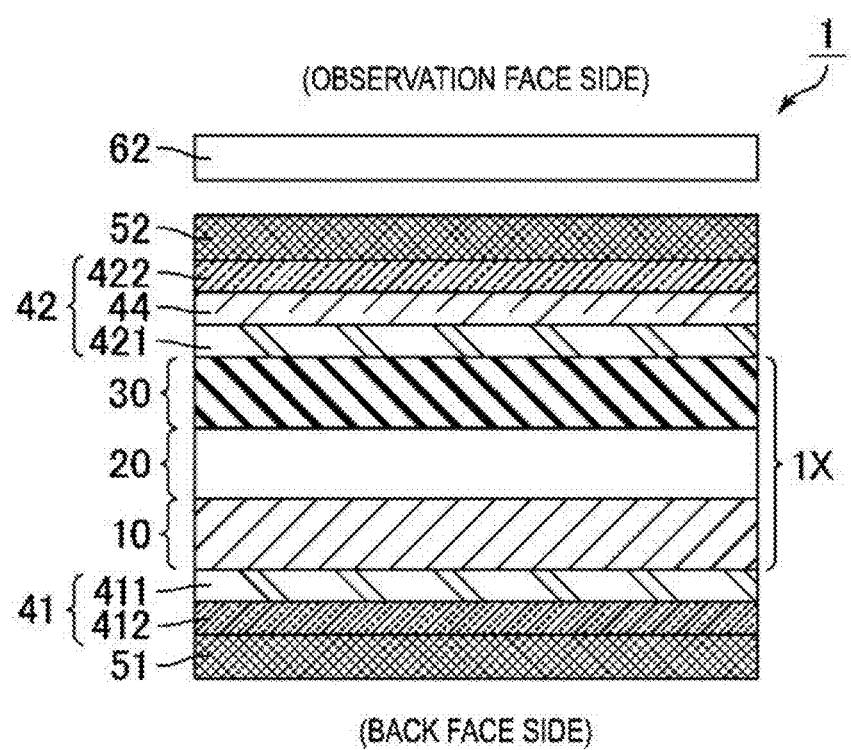
FIG. 17 is a schematic cross-sectional view of the liquid crystal display device 1.

FIG. 17 is a schematic cross-sectional view of a liquid crystal display device 1 according to an example of the present embodiment. The liquid crystal display device 1 according to the present embodiment further includes a light source 62 (also referred to as a front light) on the observation face side relative to the liquid crystal layer 20. More preferably, as illustrated in FIG. 17, the liquid crystal display device 1 includes a first polarizer 51, a first phase difference layer 41, a first substrate 10, the liquid crystal layer 20, a second substrate 30, a second phase difference layer 42, a second polarizer 52, and the light source 62 in order from the back face side toward the observation face side. Also in the present embodiment, a TFT substrate is suitable as the first substrate 10.

The light source 62 (front light) is not particularly limited as long as the light source 62 emits light. Specifically, for example, the light source 62 preferably includes a light source such as a light-emitting diode (LED) and a light guide plate. By having the liquid crystal display device 1 further include the light source 62, bright reflective display can be performed even in an environment where sufficient ambient light is not available.

Although the embodiments of the disclosure have been described above, all the individual matters described can be applied to the disclosure in general.

The disclosure will be described in more detail with reference to Examples and the like below, but the disclosure is not limited to such Examples. In the following description, an absorption-type polarizer is used as polarizers 51 and 52. An application voltage for white display is 5 V, and an application voltage for black display is 0 V (that is, no voltage is applied).

Test Example 1

Figure 18A:
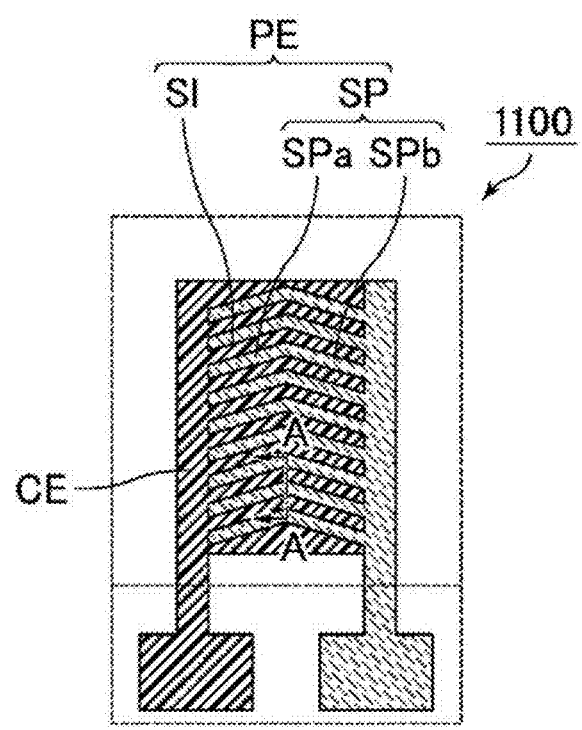
FIG. 18A is a schematic plan view illustrating a structure of a liquid crystal cell 1100 when viewed from the front.
Figure 18B:
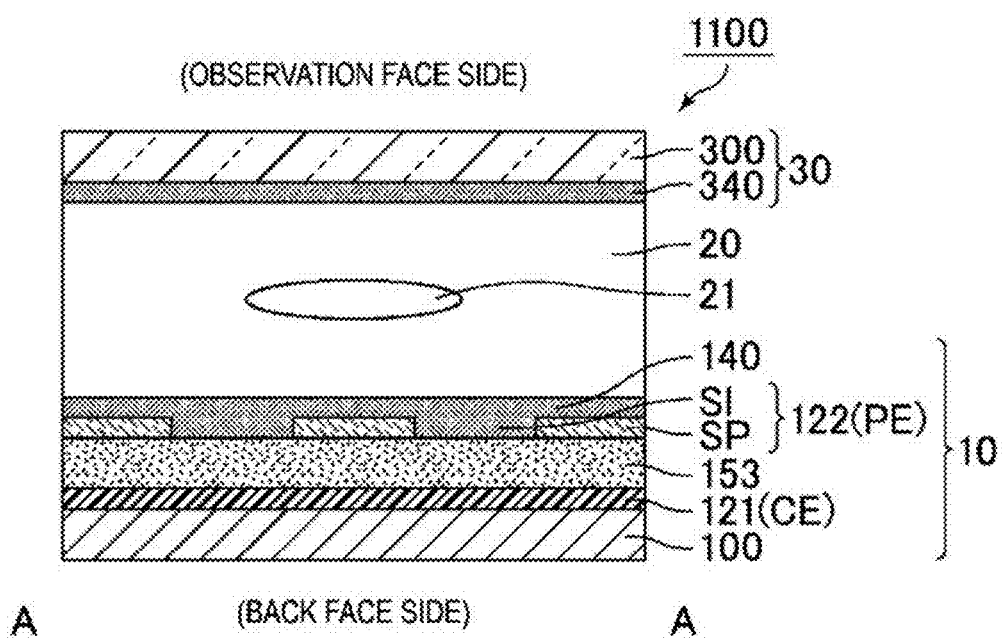
FIG. 18B is a schematic cross-sectional view of a cross section taken along a line A-A' in FIG. 18A (cross-sectional view along the line A-A').

A test cell 1000 was experimentally made as follows. As illustrated in FIG. 18B, a liquid crystal cell 1100 for obtaining the test cell 1000 includes a first substrate 10, a second substrate 30, and a liquid crystal layer 20 provided between these substrates. FIG. 18A is a plan view schematically illustrating a structure of the liquid crystal cell 1100 when viewed from the front. FIG. 18B is a schematic cross-sectional view of a cross section taken along a line A-A' in FIG. 18A (cross-sectional view along the line A-A').

As illustrated in FIG. 18B, the first substrate 10 is provided with a glass substrate 100, and includes a common electrode CE as a first electrode 121, a dielectric layer 153, a pixel electrode PE as a second electrode 122, and a first horizontal alignment film 140 in this order on the glass substrate. The common electrode CE is formed of ITO, and the thickness of the common electrode CE is 100 nm. The dielectric layer 153 is formed of silicon nitride (SiNx), and the thickness of the dielectric layer 153 is 300 nm. The pixel electrode PE is formed of ITO, and the thickness of the pixel electrode PE is 100 nm. The pixel electrode PE includes a plurality of belt-shaped portions SP and a plurality of slits Sl. The width of each belt-shaped portion SP is 3 μm, and the width of each slit Sl (a distance between two belt-shaped portions SP adjacent to each other) is 5 μm. Each belt-shaped portion SP is bent in a dogleg shape. That is, each belt-shaped portion SP includes a first portion SPa extending in a certain direction (first direction) and a second portion SPb extending in a direction (second direction) different from the first direction. A bending angle (an angle formed by each of the first portion SPa and the second portion SPb of the belt-shaped portion SP with respect to the left-right direction in FIG. 18A) is 7°.

As illustrated in FIG. 18B, the second substrate 30 includes a glass substrate 300 and a second horizontal alignment film 340 provided on the glass substrate 300.

The thickness of the liquid crystal layer 20 (cell gap) is defined by plastic beads (not illustrated).

Alignment treatment on the first horizontal alignment film 140 and the second horizontal alignment film 340 was performed by photo-alignment treatment or rubbing treatment.

In the case of using the photo-alignment treatment, a photo-alignment film material of a photo-decomposition type was used. The photo-alignment film material was applied by spin coating, and the thickness of the alignment film was 1000 Å (i.e., 100 nm). Non-polarized UV light emitted from a UV lamp unit was converted into polarized UV light by a wire grid polarizing plate, and the alignment film was irradiated with the polarized UV light, thereby performing the photo-alignment treatment. An extinction ratio by the wire grid polarizing plate was 100:1. The wavelength of the UV light effective for optical alignment was in a range from 220 to 260 nm, and irradiation energy was 300 mJ/cm². The orientation direction of the liquid crystal molecule is a direction substantially orthogonal to the transmission axis direction of the polarized UV light (a 90° direction is particularly preferred).

In the case of using the rubbing treatment, a horizontal alignment film was formed, and the alignment treatment was performed by rubbing the formed horizontal alignment film with a rubbing roller (for example, a roller around which cloth is wound). Thus, a uniaxial orientation direction of the liquid crystal molecule was obtained. As an alignment film material suitable for operating the liquid crystal molecule in a transverse electrical field, a polyimide-based material is suitable. A material which does not generate pretilt by rubbing treatment is suitable, and such material is commercially available. The liquid crystal molecules are aligned in a direction parallel to the rubbing direction.

With respect to the liquid crystal cell 1100 having the above-described structure, the retardation of the liquid crystal layer 20 was first measured using a polarimeter ("AxoScan" manufactured by Axometrics Inc.). Subsequently, the cell thickness was measured using a cell gap inspection device ("RetsQC" manufactured by Otsuka Electronics Co., Ltd.).

Figure 19A:
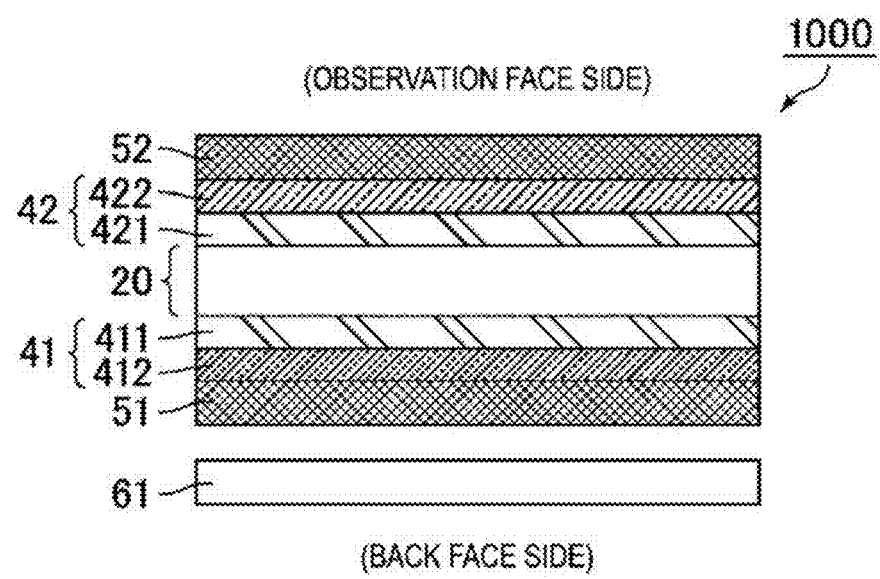
FIG. 19A is a schematic cross-sectional view of a test cell 1000.
Figure 19B:
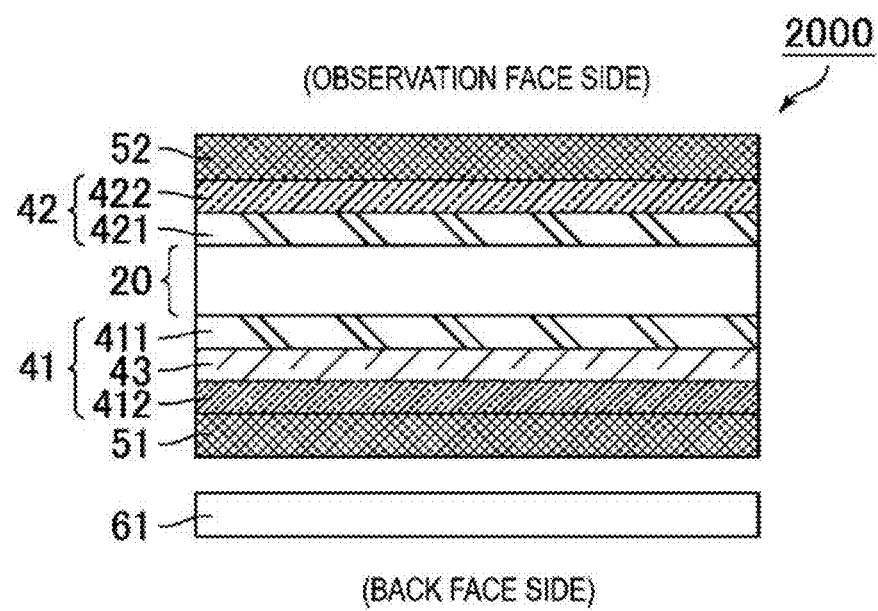
FIG. 19B is a schematic cross-sectional view of a test cell 2000.
Figure 19C:
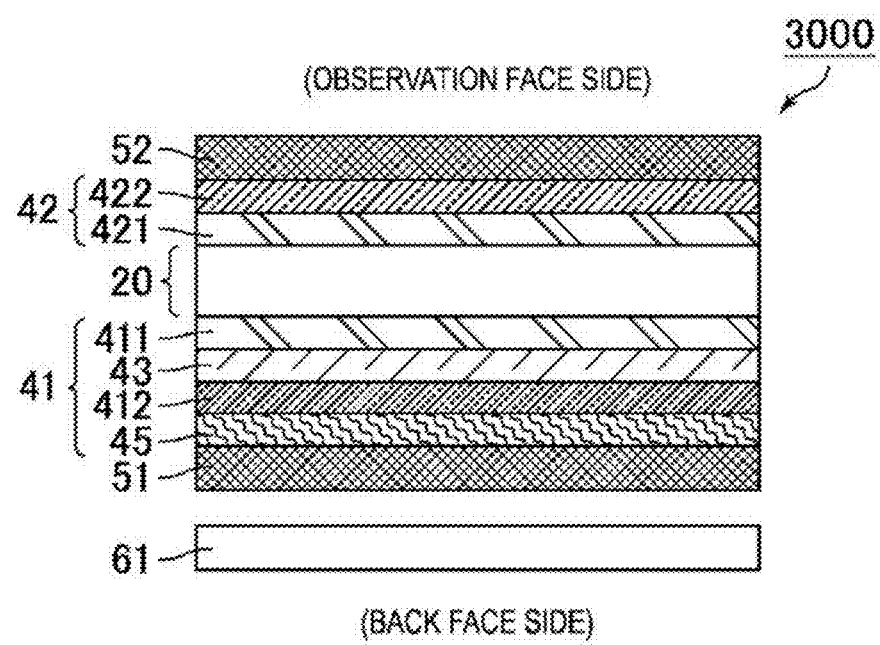
FIG. 19C is a schematic cross-sectional view of a test cell 3000.
Figure 19D:
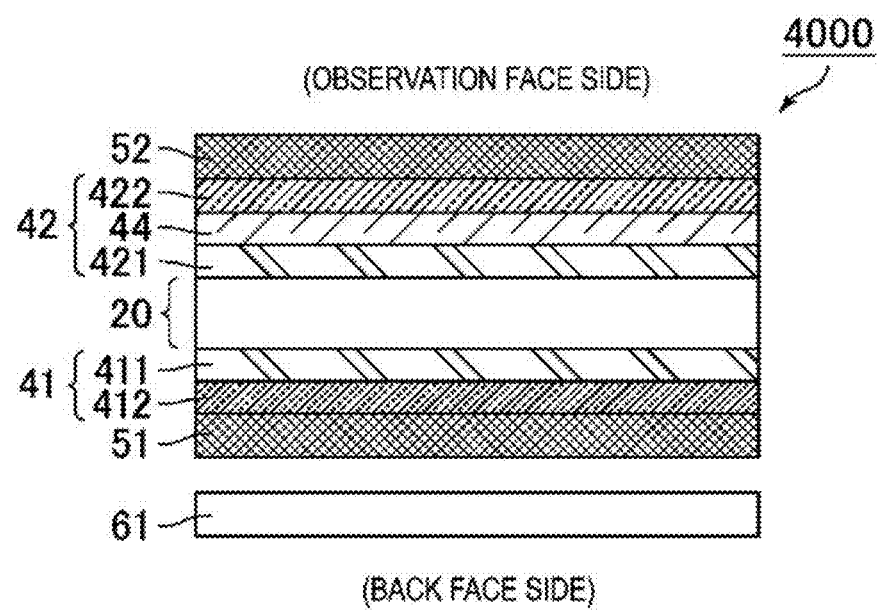
FIG. 19D is a schematic cross-sectional view of a test cell 4000.
Figure 19E:
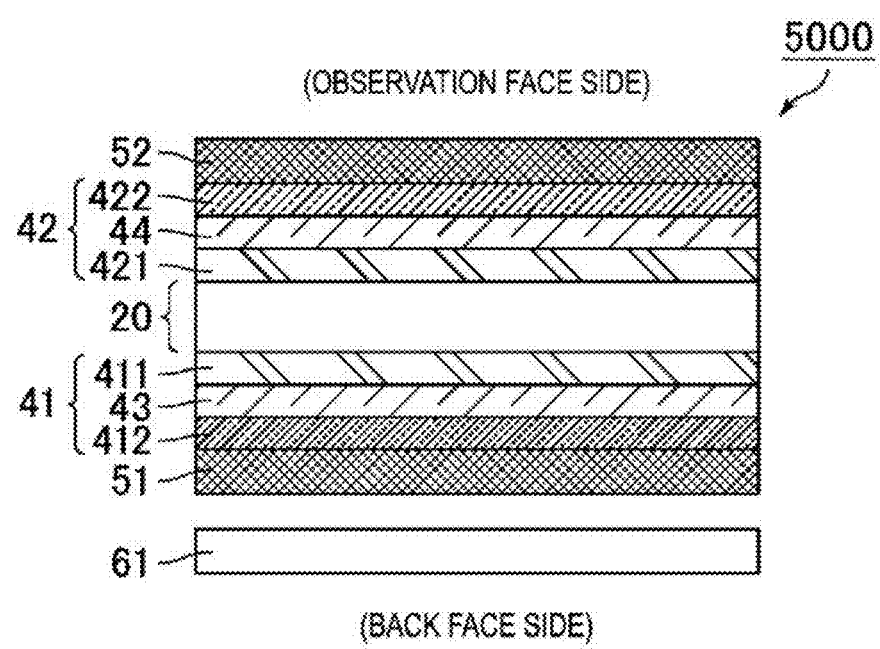
FIG. 19E is a schematic cross-sectional view of a test cell 5000.
Figure 19F:
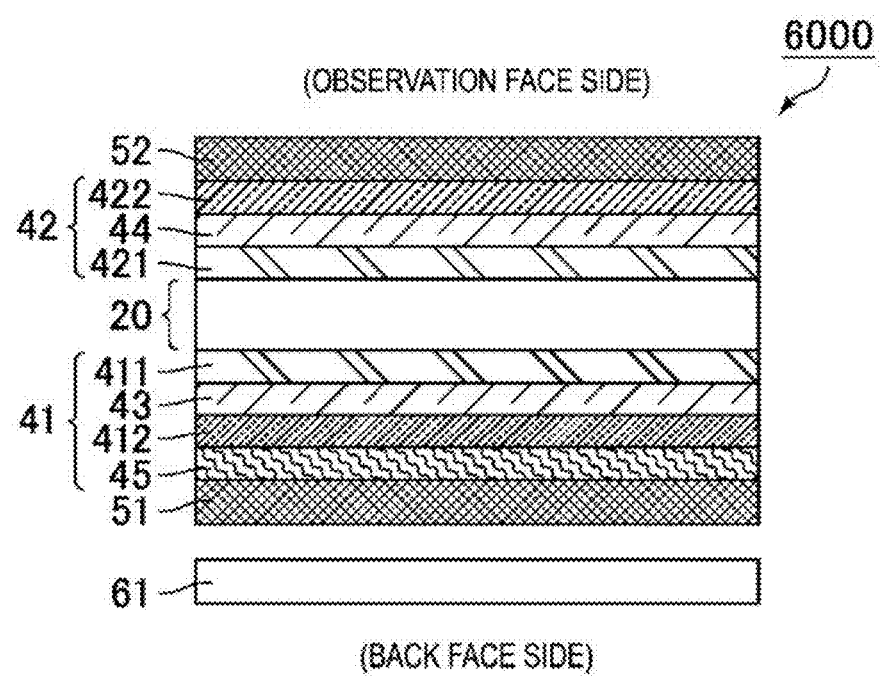
FIG. 19F is a schematic cross-sectional view of a test cell 6000.
Figure 19G:
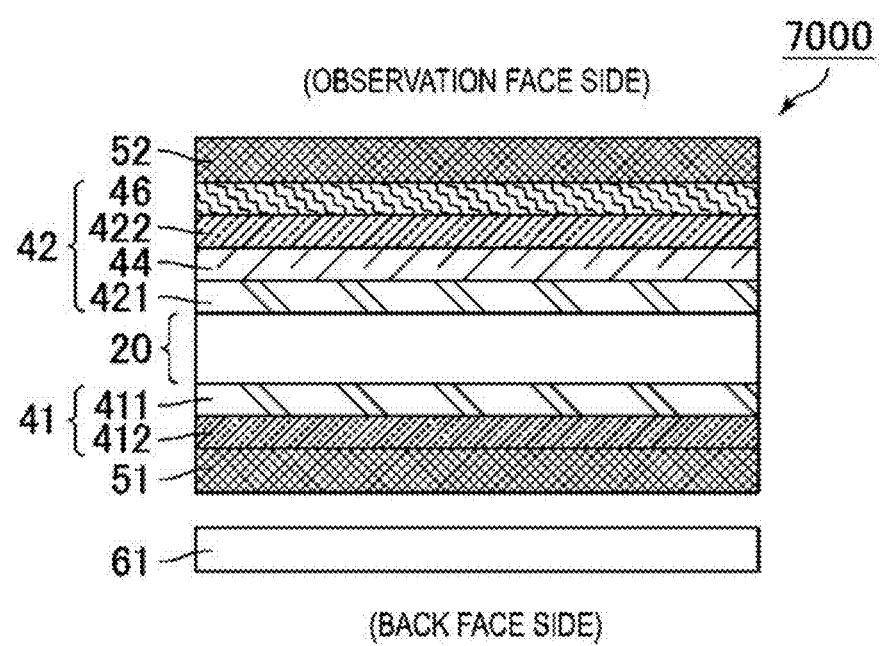
FIG. 19G is a schematic cross-sectional view of a test cell 7000.
Figure 19H:
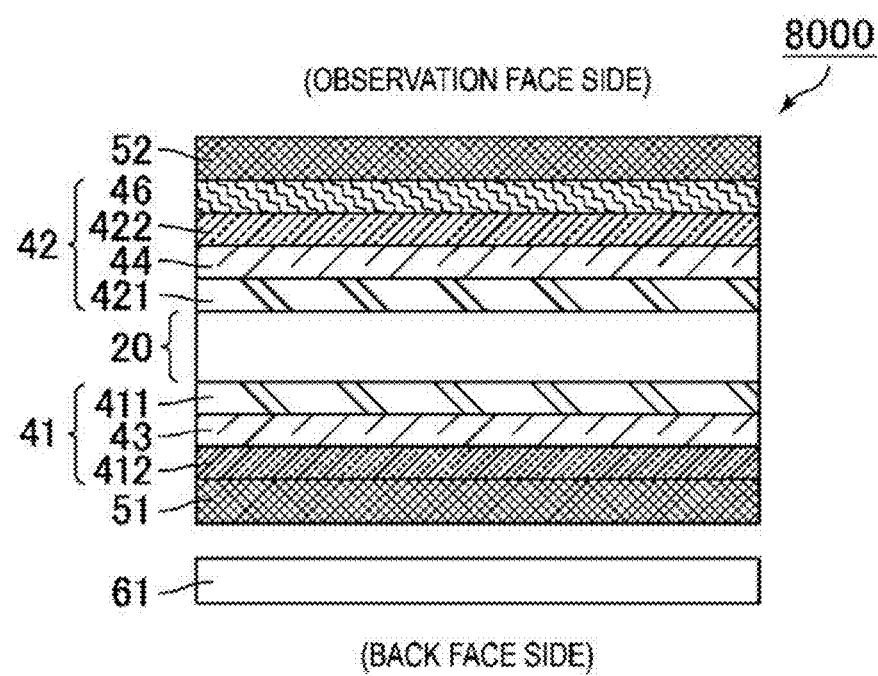
FIG. 19H is a schematic cross-sectional view of a test cell 8000.
Figure 19I:
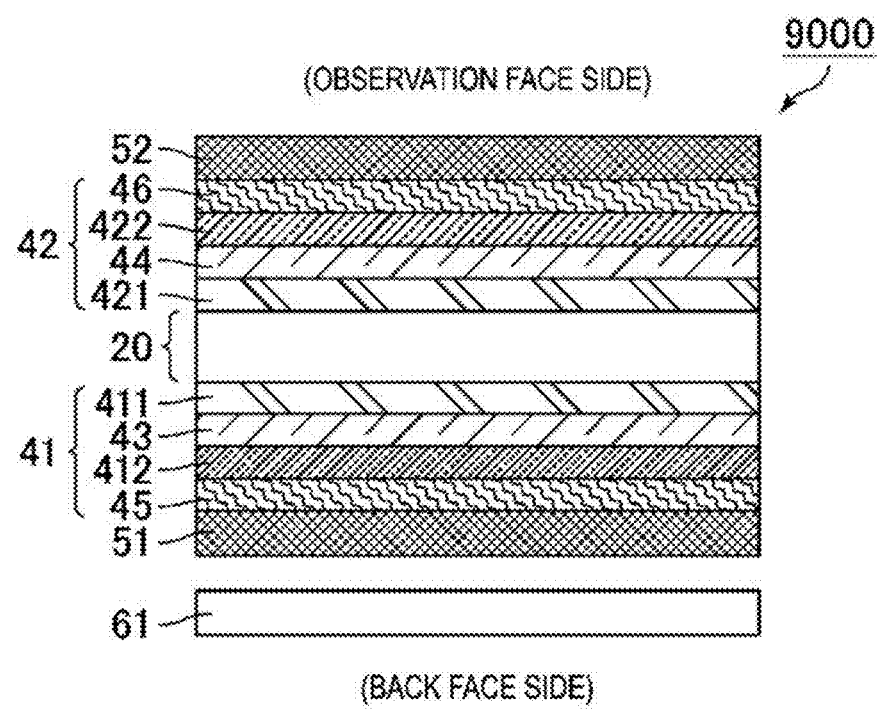
FIG. 19I is a schematic cross-sectional view of a test cell 9000.

Subsequently, as illustrated in FIG. 19A, a λ/4 plate 421, a λ/2 plate 422, and a polarizer 52 were bonded to the second substrate 30 side of the liquid crystal cell 1100 in this order (an adhesive layer is not illustrated). Thereafter, at the time of reflection observation, one drop of matching oil mo for reducing loss due to interface reflection was dropped on the reflective layer 130 having the uneven surface structure (MRS), and the liquid crystal cell 1100 was placed on the reflective layer 130 with the first substrate 10 side being on the lower side and the verification was performed (this corresponds to the test cell 1000 at the time of reflection observation). At the time of transmission observation, a λ/4 plate 411, a λ/2 plate 412, and a polarizer 51 were bonded to the first substrate 10 side of the liquid crystal cell 1100 in this order, and the verification was performed (this corresponds to the test cell 1000 at the time of transmission observation). Thus, the test cell 1000 was prepared. "NPF-CRT1794KDUHC3" manufactured by Nitto Denko Corporation was used as the polarizers 51 and 52, "NZF-UF01A" (retardation: 140 nm) manufactured by Nitto Denko Corporation was used as the λ/4 plates 411 and 421, and "NZF-UF01A" (retardation: 270 nm) manufactured by Nitto Denko Corporation was used as the λ/2 plates 412 and 422.

In this state, a voltage applied between the pixel electrode PE and the common electrode CE was changed to measure the reflectivity. The voltage application to the pixel electrode PE and the common electrode CE was performed using a function generator ("AFG1022" manufactured by TEKTRONIX Inc.) capable of applying a voltage of 0 V to 10 V with a rectangular wave of 30 Hz. The reflectivity was measured using a spectrophotometer ("CM-2600d" manufactured by MINOLTA Co., Ltd.) unless otherwise noted. FIG. 19A is a schematic cross-sectional view of the test cell 1000.

Verification Example 1

In this verification example, the following (a) and (b) were examined using the test cell 1000. The twist angle was 83°, and a negative-type liquid crystal material was used. An optical axis setting (initial setting) and specifications of this verification example are depicted in Table 5 and FIG. 10. FIG. 10 is also a diagram conceptually illustrating the optical axis setting of the test cell 1000. In this verification example, the test cell 1000 including no positive C plate was examined. However, the same tendency can be obtained in a case of including a positive C plate.

TABLE 5

|  |  | Unit | Verification example 1 |
|---|---|---|---|
| Display mode |  | — | TW-FFS |
| Front-side optical film | Absorption axis angle of polarizer 52 | Degrees | −68.3 |
|  | Slow axis angle of λ/2 plate 422 | Degrees | −49.5 |
|  | Slow axis angle of λ/4 plate 421 | Degrees | −24.9 |

TABLE 5-continued

|  |  | Unit | Verification example 1 |
|---|---|---|---|
| Liquid crystal layer | Liquid crystal material | — | Negative type |
|  | Birefringence index (550 nm) of liquid crystal material | — | 0.079224 |
|  | dΔn | nm | 245 |
|  | Director angle of liquid crystal molecule 21A | Degrees | 0 |
|  | Twist angle | Degrees | 83 |
| Back-side optical film | Slow axis angle of λ/4 plate 411 | Degrees | −71.4 (initial) |
|  | Slow axis angle of λ/2 plate 412 | Degrees | 50.4 (initial) |
|  | Absorption axis angle of polarizer 51 | Degrees | 38.0 (initial) |
| Pixel electrode | Width of belt-shaped portion | μm | 3 |
|  | Slit width | μm | 5 |
|  | Bending angle of belt-shaped portion | Degrees | 7 |

Figure 20:
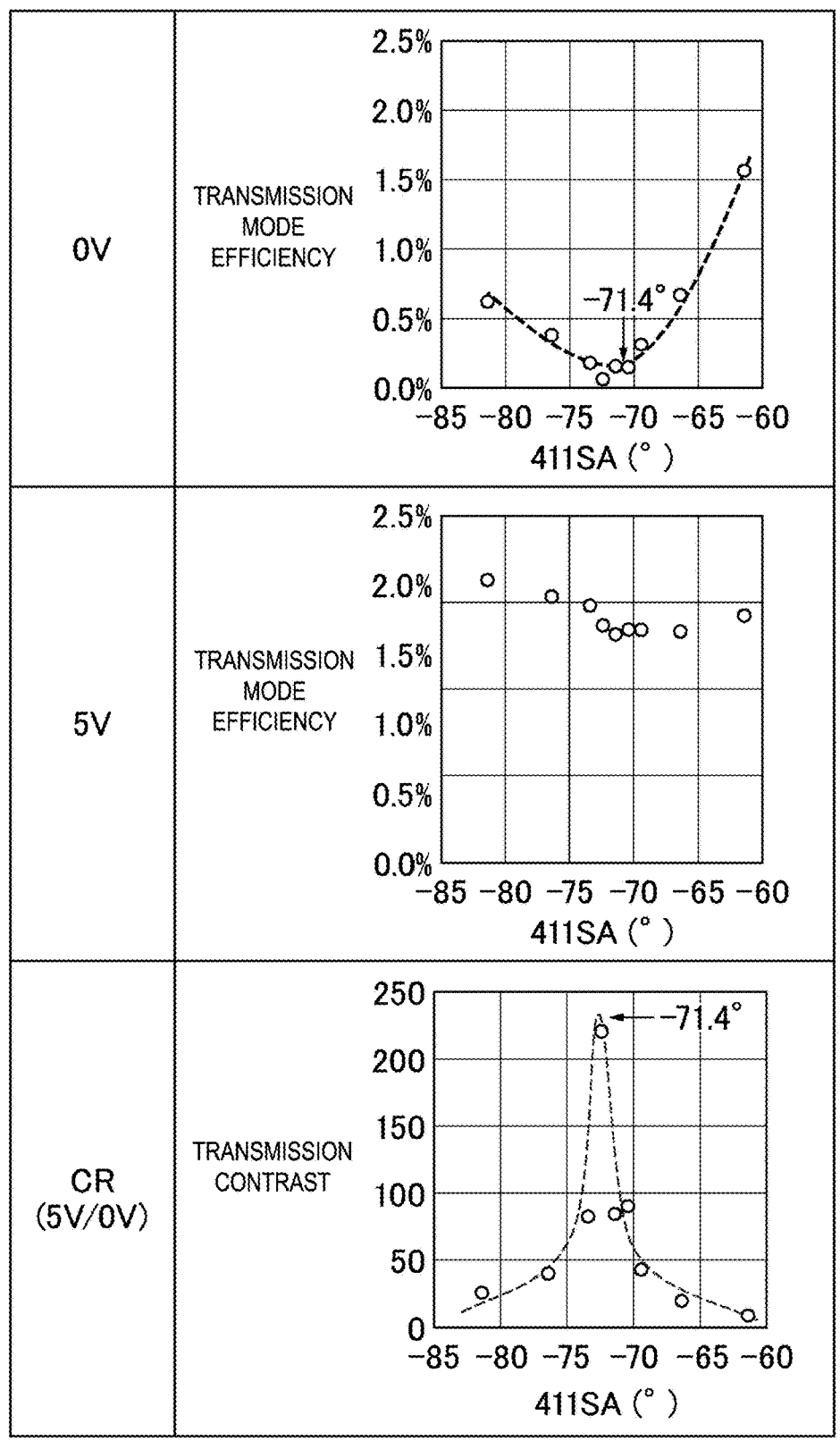
FIG. 20 is a diagram depicting results of Verification Example 1.
Figure 21:
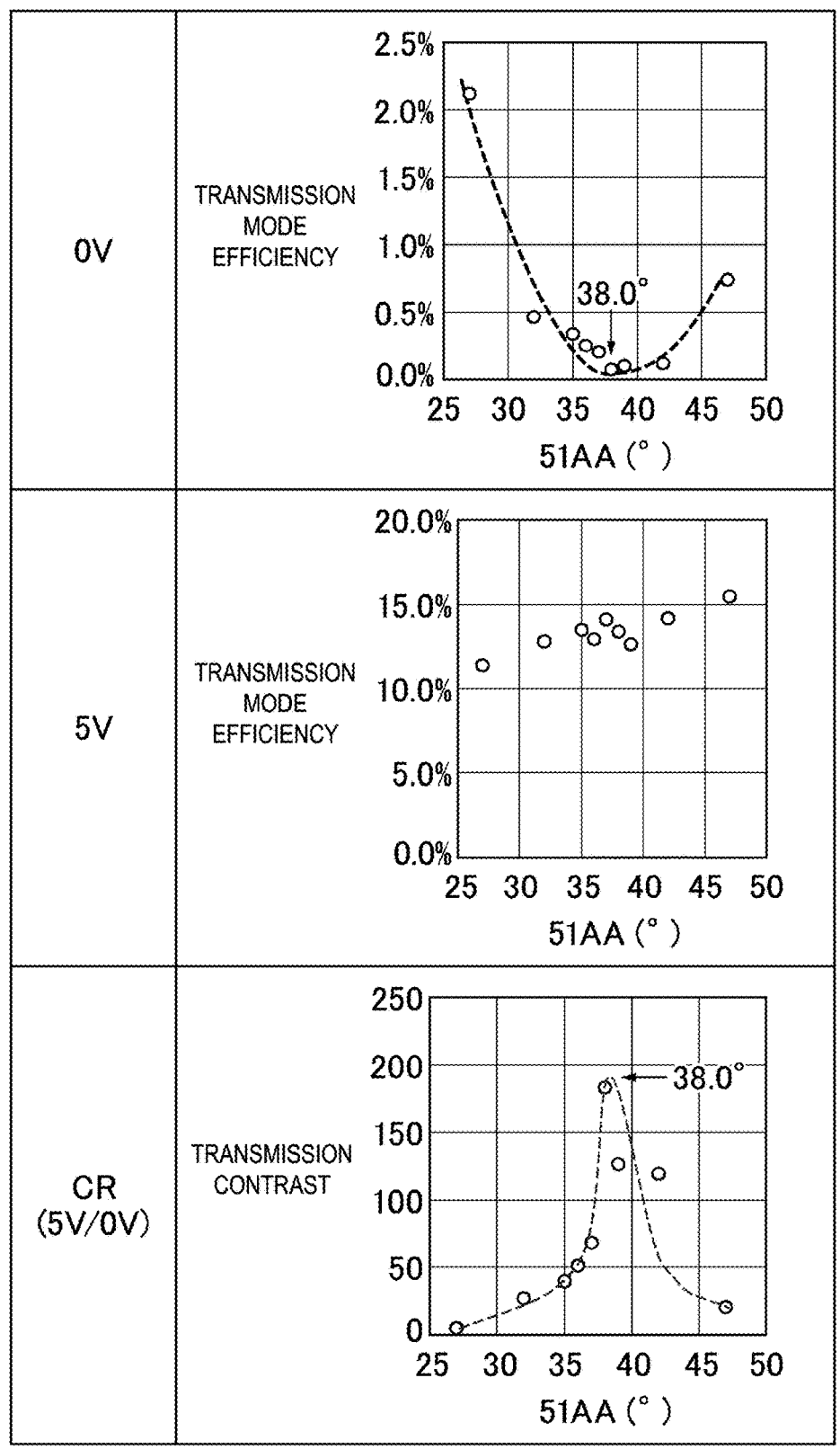
FIG. 21 is a diagram depicting results of Verification Example 1.

(a) Relationship Between Axis Setting of Optical Film, and Transmission Mode Efficiency and Transmission Contrast For the test cell 1000, the relationship between the axis setting of a back-side optical film and each of the transmission mode efficiency and transmission contrast was studied. The results are provided in FIG. 20 and FIG. 21. FIG. 20 and FIG. 21 are diagrams depicting the results of Verification Example 1.

Each graph in FIG. 20 is a graph obtained by measuring the transmission mode efficiency and the transmission contrast while rotating only the first phase difference layer 41 (in other words, the first λ/2 plate 412 and the first λ/4 plate 411). The first phase difference layer 41 was rotated in a range of ±10° from the optimum value (see Table 4) of the axis setting determined in the above-described (II). The axis angle of the polarizer 51 was fixed to the initial setting. An angle formed by a slow axis 412SA of the λ/2 plate 412 and a slow axis 411SA of the λ/4 plate 411 was fixed, and the λ/2 plate 412 and the λ/4 plate 411 were rotated as a set. The horizontal axis represents the angle of the slow axis 411SA direction of the λ/4 plate 411, and the vertical axis represents the transmission mode efficiency or the transmission contrast.

Each graph in FIG. 21 is a graph obtained by measuring the transmission mode efficiency and the transmission contrast while rotating only the first polarizer 51. The polarizer 51 was rotated in a range of ±10° from the optimum value (see Table 4) of the axis setting determined in the above-described (II). The axis angle of the first phase difference layer 41 was fixed to the initial setting. The horizontal axis represents the angle of the polarization axis 51AA direction of the polarizer 51, and the vertical axis represents the transmission mode efficiency or the transmission contrast.

In each of FIG. 20 and FIG. 21, the graph of the measured transmission mode efficiency of black display is depicted in a "0 V" section. The graph of the measured transmission mode efficiency of white display is depicted in a "5 V" section. The transmission mode efficiency of each display was determined by the above Formula (1). The transmission contrast was calculated from the transmission mode efficiency of each display measured in the manner described above. That is, the transmission contrast was determined from Formula (2) given below:

Transmission contrast=transmission mode efficiency of white display/transmission mode efficiency of black display. In each graph of the "0 V" section, an approximation curve is also depicted.

In FIG. 20, when the slow axis 411SA direction of the λ/4 plate 411 was −71.4°, the slow axis 412SA direction of the λ/2 plate 412 was 50.4°. From FIG. 20 and FIG. 21, it was found that the axis settings causing the black display transmission mode efficiency to be minimized and causing the transmission contrast to be maximize were as follows: the slow axis 411SA of the λ/4 plate 411 was −71.4°, the slow axis 412SA of the λ/2 plate 412 was 50.4°, and the polarization axis 51AA direction of the polarizer 51 was 38.0°. The slow axis 411SA of the λ/4 plate 411 and the slow axis 412SA of the λ/2 plate 412 correspond to the optimum values of the axis settings determined in the above-described (II) (see Table 4).

(b) Relationship Between Axis Setting of Optical Film and Chromaticity

Figure 22:
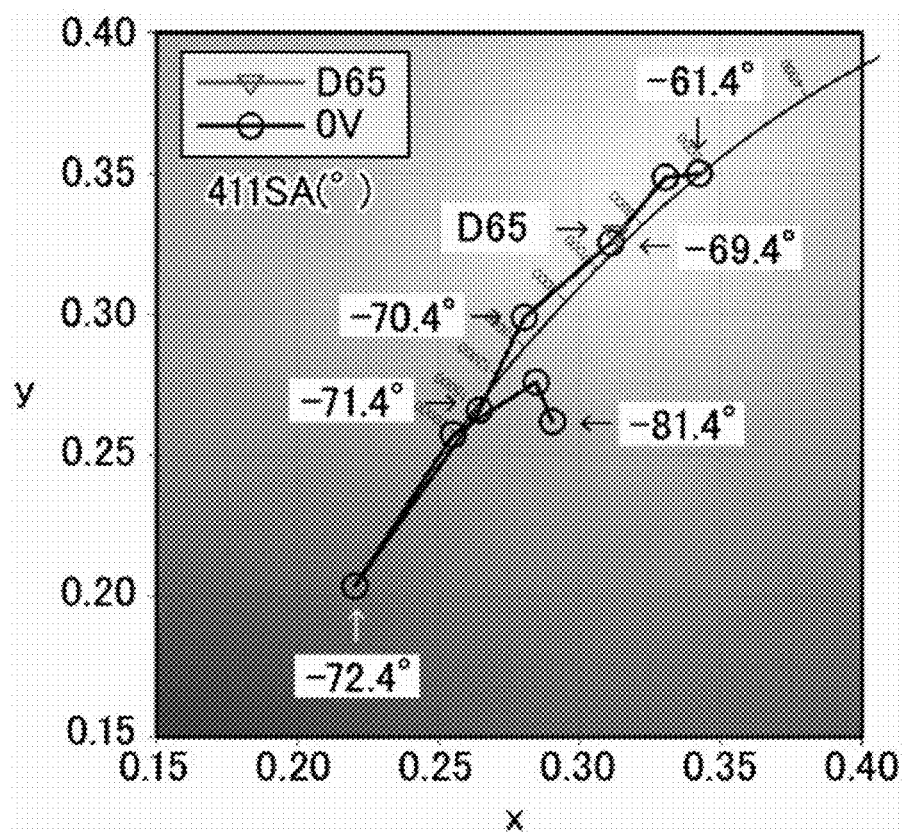
FIG. 22 is a diagram depicting results of Verification Example 1.
Figure 23:
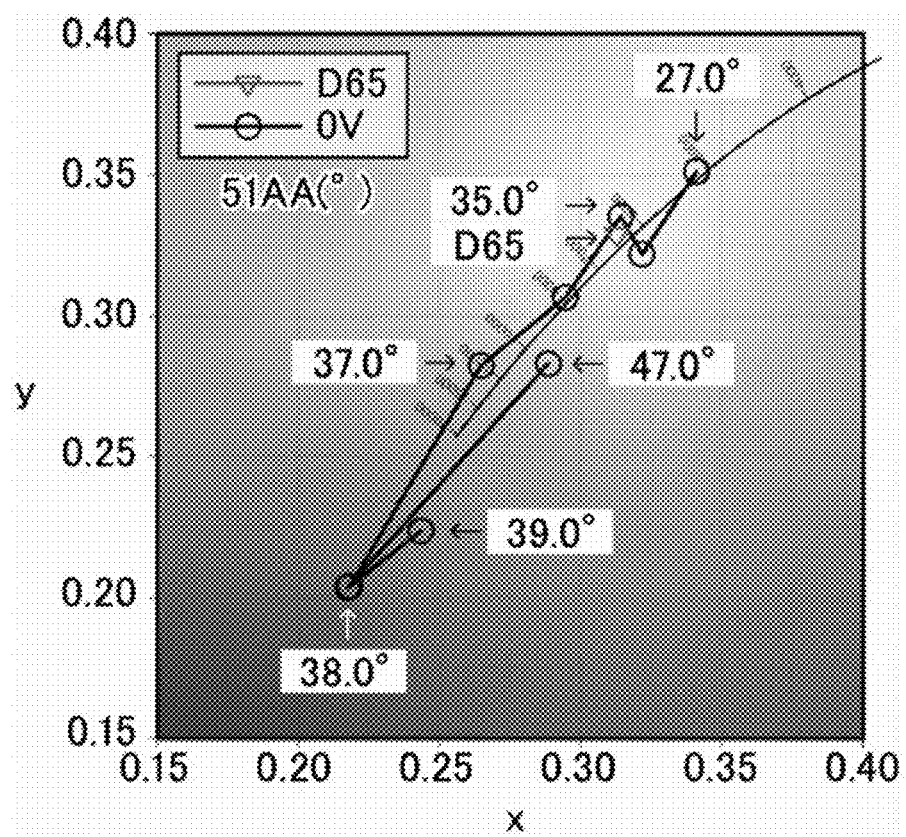
FIG. 23 is a diagram depicting results of Verification Example 1.

With respect to the test cell 1000, the relationship between the axis setting of the back-side optical film and the chromaticity of white display was studied. The chromaticity was evaluated by an xy chromaticity diagram. For reference, the chromaticity of the D65 light source (x=0.3127, y=0.3290) was plotted in each drawing. The results are depicted in FIG. 22 and FIG. 23. FIG. 22 and FIG. 23 are diagrams depicting the results of Verification Example 1.

A graph of FIG. 22 is a graph obtained by measuring the chromaticity while rotating only the first phase difference layer 41 (in other words, the first λ/2 plate 412 and the first λ/4 plate 411). The first phase difference layer 41 was rotated in a range of ±10° from the optimum value (see Table 4) of the axis setting determined in the above-described (II). The axis angle of the polarizer 51 was fixed to the initial setting. An angle formed by the slow axis 412SA of the λ/2 plate 412 and the slow axis 411SA of the λ/4 plate 411 was fixed, and the λ/2 plate 412 and the λ/4 plate 411 were rotated as a set.

A graph of FIG. 23 is a graph obtained by measuring the chromaticity while rotating only the first polarizer 51. The polarizer 51 was rotated in a range of ±10° from the optimum value (see Table 4) of the axis setting determined in the above-described (II). The axis angle of the first phase difference layer 41 was fixed to the initial setting.

From FIG. 22 and FIG. 23, it was found that the optimum axis setting of the back-side optical film was as follows: the slow axis 411SA of the λ/4 plate 411 was −71.4°, the slow axis 412SA of the λ/2 plate 412 was 50.4°, and the polarization axis 51AA direction of the polarizer 51 was 38.0°. With this axis setting, it is considered that chromaticity substantially equivalent to that of the D65 light source may be obtained by tinge adjustment (yellow shift) of the light source (backlight 61 in the present verification example), color adjustment of the color filter, or the like.

Test Example 2

A test cell 2000 was prepared in the same manner as the preparation method of the test cell 1000 except that the step of bonding the optical film to the first substrate 10 side of the liquid crystal cell 1100 was changed to a step of bonding the λ/4 plate 411, the positive C plate 43, the λ/2 plate 412, and the polarizer 51 to the first substrate 10 side of the liquid crystal cell 1100 in this order during the preparation of the test cell 1000.

Test Example 3

A test cell 3000 was prepared in the same manner as the preparation method of the test cell 1000 except that the step of bonding the optical film to the first substrate 10 side of the liquid crystal cell 1100 was changed to a step of bonding the λ/4 plate 411, the first positive C plate 43, the λ/2 plate 412, the second positive C plate 45, and the polarizer 51 to the first substrate 10 side of the liquid crystal cell 1100 in this order during the preparation of the test cell 1000.

Test Example 4

A test cell 4000 was prepared in the same manner as the preparation method of the test cell 1000 except that the step of bonding the optical film to the second substrate 30 side of the liquid crystal cell 1100 was changed to a step of bonding the λ/4 plate 421, the positive C plate 44, the λ/2 plate 422, and the polarizer 52 to the second substrate 30 side of the liquid crystal cell 1100 in this order during the preparation of the test cell 1000.

Test Example 5

A test cell 5000 was prepared in the same manner as the preparation method of the test cell 1000 except that the step of bonding the optical film to the liquid crystal cell 1100 was changed to a step of bonding the λ/4 plate 411, the positive C plate 43, the λ/2 plate 412, and the polarizer 51 to the first substrate 10 side of the liquid crystal cell 1100 in this order, and bonding the λ/4 plate 421, the positive C plate 44, the λ/2 plate 422, and the polarizer 52 to the second substrate 30 side of the liquid crystal cell 1100 in this order during the preparation of the test cell 1000.

Test Example 6

A test cell 6000 was prepared in the same manner as the preparation method of the test cell 1000 except that the step of bonding the optical film to the liquid crystal cell 1100 was changed to a step of bonding the λ/4 plate 411, the first positive C plate 43, the λ/2 plate 412, the second positive C plate 45, and the polarizer 51 to the first substrate 10 side of the liquid crystal cell 1100 in this order, and bonding the λ/4 plate 421, the positive C plate 44, the λ/2 plate 422, and the polarizer 52 to the second substrate 30 side of the liquid crystal cell 1100 in this order during the preparation of the test cell 1000.

Test Example 7

A test cell 7000 was prepared in the same manner as the preparation method of the test cell 1000 except that the step of bonding the optical film to the second substrate 30 side of the liquid crystal cell 1100 was changed to a step of bonding the λ/4 plate 421, the first positive C plate 44, the λ/2 plate 422, the second positive C plate 46, and the polarizer 52 in this order during the preparation of the test cell 1000.

Test Example 8

A test cell 8000 was prepared in the same manner as the preparation method of the test cell 1000 except that the step of bonding the optical film to the liquid crystal cell 1100 was changed to a step of bonding the λ/4 plate 411, the positive C plate 43, the λ/2 plate 412, and the polarizer 51 to the first substrate 10 side of the liquid crystal cell 1100 in this order, and bonding the λ/4 plate 421, the first positive C plate 44, the λ/2 plate 422, the second positive C plate 46, and the polarizer 52 to the second substrate 30 side of the liquid crystal cell 1100 in this order during the preparation of the test cell 1000.

Test Example 9

A test cell 9000 was prepared in the same manner as the preparation method of the test cell 1000 except that the step of bonding the optical film to the liquid crystal cell 1100 was changed to a step of bonding the λ/4 plate 421, the first positive C plate 44, the λ/2 plate 422, the second positive C plate 45, and the polarizer 52 in this order, and bonding the λ/4 plate 421, the positive C plate 44, the λ/2 plate 422, the second positive C plate 46, and the polarizer 52 to the second substrate 30 side of the liquid crystal cell 1100 in this order during the preparation of the test cell 1000.

In Test Examples 2 to 9, as the positive C plates 43 and 44 disposed between the λ/4 plate and the λ/2 plate, a film having Rth of 200 nm was used, and as the positive C plates 45 and 46 disposed between the λ/2 plate and the polarizer, a film having Rth of 115 nm was used. The layer structures of the test cells obtained in Test Examples 2 to 9 are illustrated in FIG. 19B to FIG. 19I, respectively. FIG. 19B to FIG. 19I are schematic cross-sectional views illustrating the layer structures of the test cells obtained in Test Examples 2 to 9, respectively.

Verification Example 2

Figure 24:
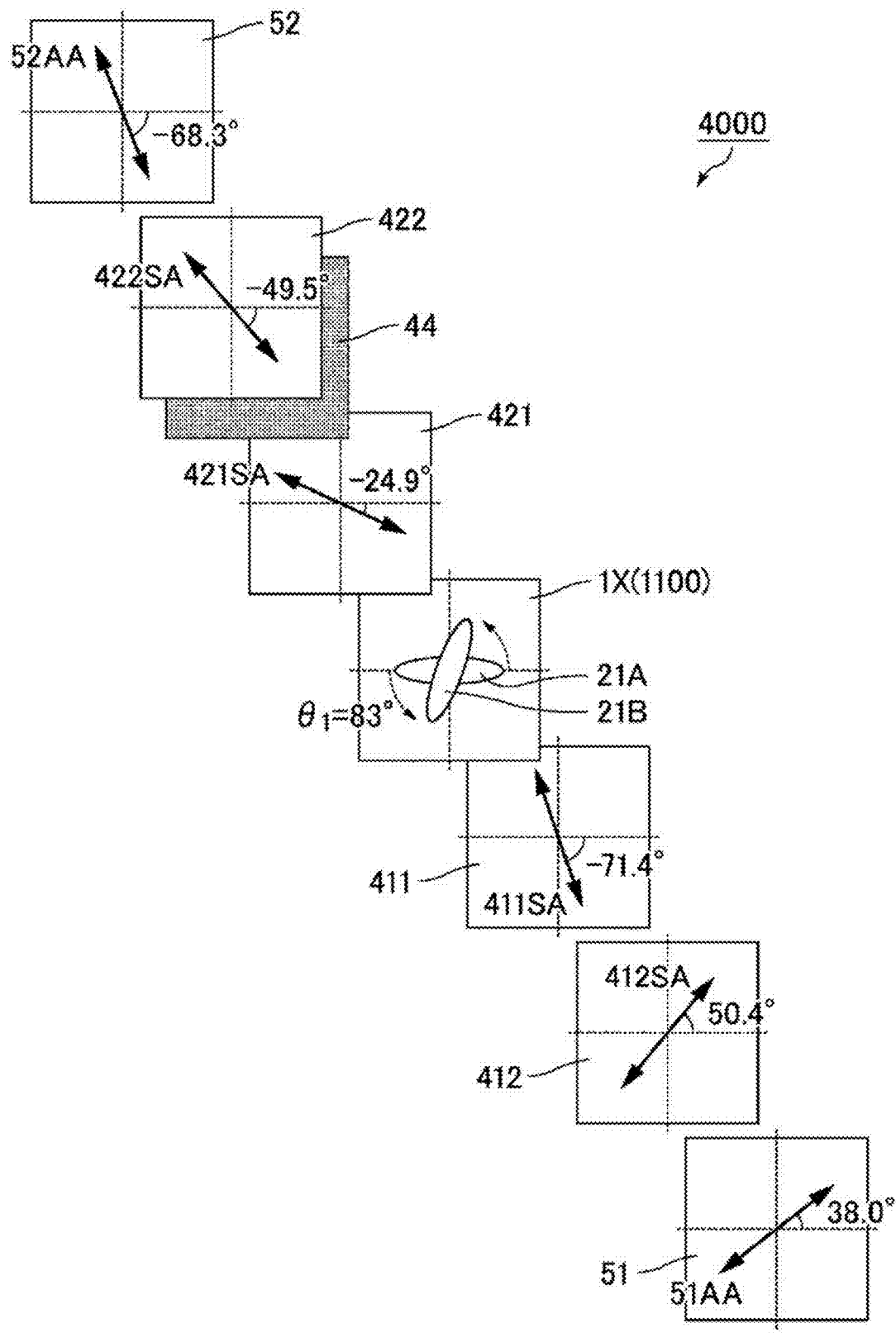
FIG. 24 is a diagram conceptually illustrating an optical axis setting.
Figure 25:
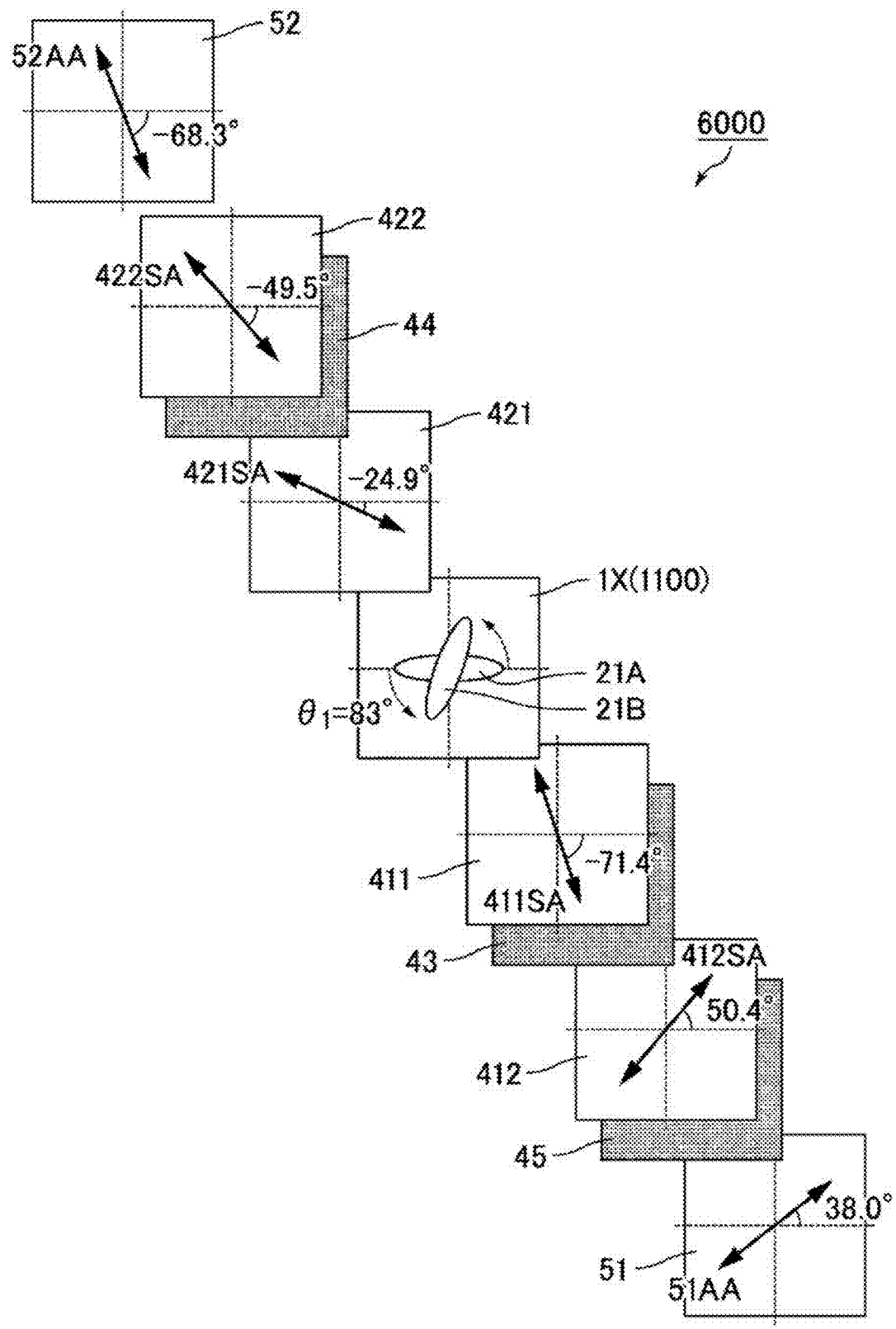
FIG. 25 is a diagram conceptually illustrating an optical axis setting.
Figure 26:
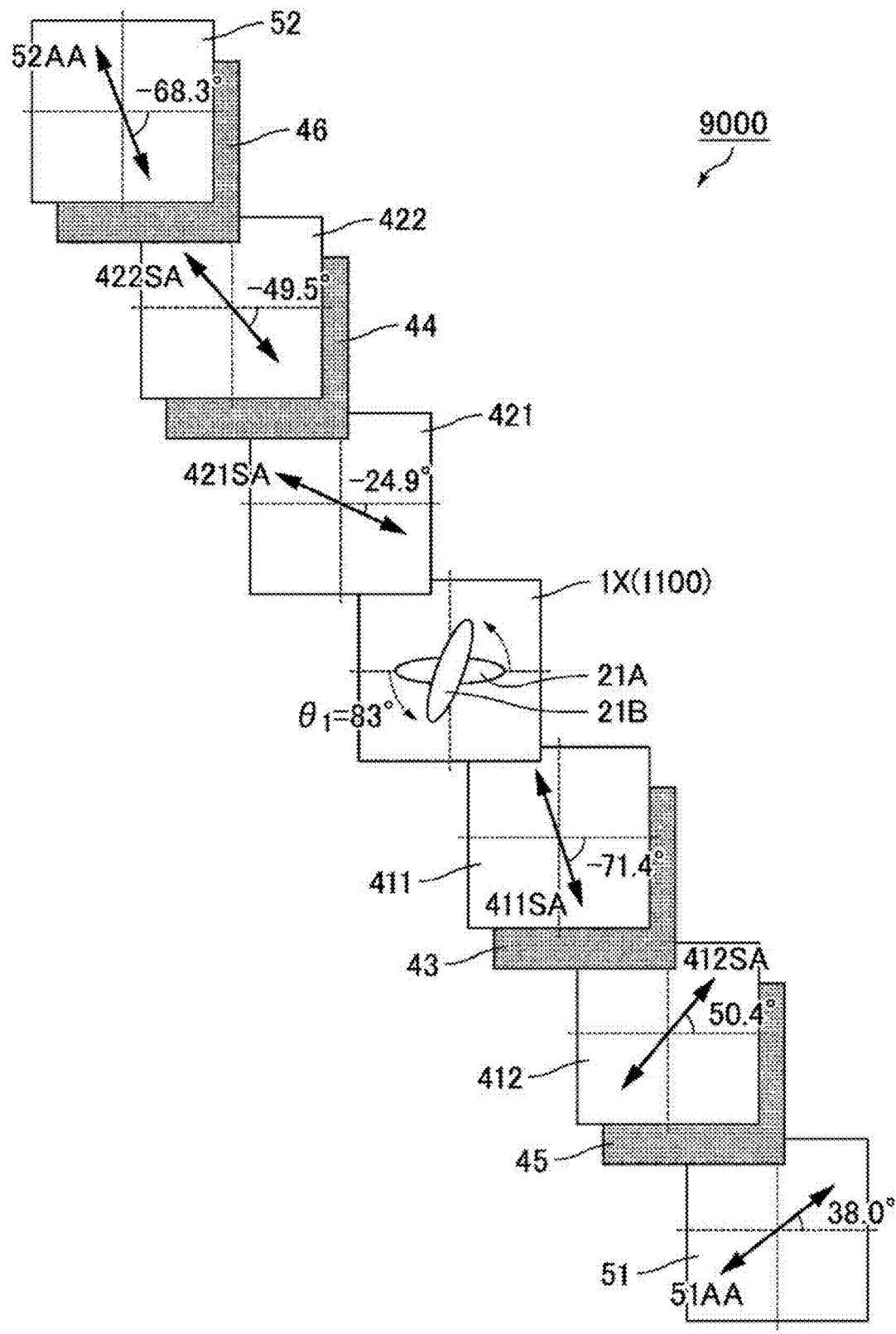
FIG. 26 is a diagram conceptually illustrating an optical axis setting.

In this verification example, the following (c) to (f) were studied using the test cells 1000 to 9000. The twist angle was 83°, and a negative-type liquid crystal material was used. Optical axis settings (initial settings) and specifications of the present verification example are depicted in Table 5 and FIG. 24 to FIG. 26. FIG. 24 is a diagram conceptually depicting an optical axis setting in an example using the test cell 4000, and this setting corresponds to the most preferable optical axis setting in the first embodiment. FIG. 25 is a diagram conceptually depicting an optical axis setting in an example using the test cell 6000, and this setting corresponds to the most preferable optical axis setting in the second embodiment. FIG. 26 is a diagram conceptually depicting an optical axis setting in an example using the test cell 9000, and this setting corresponds to the most preferable optical axis setting in the third embodiment.

(c) Front Contrast and Viewing Angle Characteristics of White Display in Reflection Mode Front contrast (also referred to as front CR) and viewing angle characteristics of white display were measured for each of the test cells 1000, 4000, and 9000. Thereafter, evaluation was made in accordance with the following criteria. The results are depicted in Table 6.

Front Contrast

The ratio of the reflectance at 5 V to the reflectance at 0 V (5 V/0 V) in the reflection mode was determined. The results are depicted in Table 6. Based on the determined numerical values, evaluation was made in accordance with the following criteria.

Very good: the above ratio is 30° or more.

Poor: the above ratio is less than 30°.

Viewing Angle Characteristics

In white display in the reflection mode, the viewing angle characteristics were evaluated in accordance with the following criteria for a total of eight directions including four vertical and horizontal directions and four oblique directions after measuring the reflectivity (absolute value) while changing the azimuth angle in a range of 0° to 345° by a step of 15° and changing the polar angle in a range of 0° to 60° by a step of 10°. Taking the three o'clock direction on the clock as 0°, the azimuthal directions were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. The results are depicted in Table 6.

Very good: the reflectivity difference (maximum reflectivity−minimum reflectivity) at a polar angle of 60° is less than 2%.

Good: the reflectivity difference is 2% or more and less than 5%.

Poor: the reflectivity difference is 5% or more.

TABLE 6

|  |  |  | Verification example 2-1 | Verification example 2-4 | Verification example 2-9 |
|---|---|---|---|---|---|
| Test cell No. |  |  | 1000 | 4000 | 9000 |
| Reflection (white display) | Front CR |  | 24.4 | 39.0 | 41.5 |
|  |  |  | Poor | Very good | Very good |
|  | Viewing angle characteristics | Up, down, left, right | Good | Very good | Very good |
|  |  | Oblique | Poor | Good | Very good |

As can be understood from Table 6, in the reflective display, the front contrast is higher in Example 2-4 using the test cell 4000 than in Example 2-1 using the test cell 1000, and the front contrast is even higher in Example 2-9. It is also understood that the viewing angle characteristics are better in Examples 2-4 and 2-9 than in Example 2-1.

(d) Contrast (CR) Characteristics of White Display in Transmission Mode

Contrast characteristics of white display were measured for each of the test cells 1000 to 9000. Specifically, in white display in the transmission mode, the brightness (absolute value) was measured with the azimuth angle in a range of 0° to 359° and with the polar angle in a range of 0° to 88°, and then the contrast characteristics were evaluated in accordance with the following criteria for a total of eight directions including four vertical and horizontal directions and four oblique directions. The following criteria indicate, as compared to the azimuth angle symmetry of the transmission contrast in Example 2-1 using test cell 1000, how the azimuth angle symmetry of the transmission contrast was in the corresponding example. Taking the three o'clock direction on the clock as 0°, the azimuthal directions were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. For the measurement, "EZContrast" manufactured by ELDIM was used. The results are depicted in Table 7 to Table 9. In Tables 7 to 9, values of the front contrast are also depicted.

Excellent: best.

Very good: good.

Poor: equivalent or poor.

TABLE 7

|  |  |  | Verification example 2-1 | Verification example 2-4 | Verification example 2-7 |
|---|---|---|---|---|---|
| Test cell No. |  |  | 1000 | 4000 | 7000 |
| Transmission (white display) | CR character-istics | Up, down, left, right | Poor | Very good | Very good |
|  |  | Oblique | Poor | Very good | Poor |
|  |  | Front CR | 28 | 79 | 84 |

TABLE 8

|  |  |  | Verification example 2-2 | Verification example 2-5 | Verification example 2-8 |
|---|---|---|---|---|---|
| Test cell No. |  |  | 2000 | 5000 | 8000 |
| Transmission (white display) | CR character-istics | Up, down, left, right | Very good | Very good | Very good |
|  |  | Oblique | Poor | Poor | Poor |
|  |  | Front CR | 62 | 67 | 43 |

TABLE 9

|  |  |  | Verification example 2-3 | Verification example 2-6 | Verification example 2-9 |
|---|---|---|---|---|---|
| Test cell No. |  |  | 3000 | 6000 | 9000 |
| Transmission (white display) | CR character-istics | Up, down, left, right | Poor | Excellent | Very good |
|  |  | Oblique | Poor | Excellent | Very good |
|  |  | Front CR | 70 | 130 | 42 |

From Table 7 to Table 9, it is understood that, in the transmissive display, the contrast characteristics are favorable in Example 2-2, Example 2-4, Example 2-5, Example 2-6, Example 2-7, Example 2-8, and Example 2-9 as compared to Example 2-1 using the test cell 1000. Among them, Examples 2-4, 2-6, and 2-9 are more favorable, and Example 2-6 is most favorable.

(e) Change in White Brightness in Transmission Mode

For each of the test cells 1000 to 9000, changes in brightness in the vertical and horizontal directions and in the oblique direction were evaluated. Specifically, in white display in the transmission mode, a difference in brightness at a polar angle of 60° (maximum brightness–minimum brightness) was evaluated in accordance with the following criteria. The results are depicted in Table 10 to Table 12.

Very good: the difference in brightness at a polar angle of 60° is less than 100 cd/m².
Good: the difference in brightness is 100 cd/m² or more and less than 200 cd/m².
Poor: the difference in brightness is 200 cd/m² or more.

TABLE 10

|  |  |  | Verification example 2-1 | Verification example 2-4 | Verification example 2-7 |
|---|---|---|---|---|---|
| Test cell No. |  |  | 1000 | 4000 | 7000 |
| White brightness change | Up, down, left, right |  | Poor | Very good | Very good |
|  | Oblique |  | Poor | Good | Poor |

TABLE 11

|  |  |  | Verification example 2-2 | Verification example 2-5 | Verification example 2-8 |
|---|---|---|---|---|---|
| Test cell No. |  |  | 2000 | 5000 | 8000 |
| White brightness change | Up, down, left, right |  | Very good | Poor | Good |
|  | Oblique |  | Poor | Very good | Very good |

TABLE 12

|  |  |  | Verification example 2-3 | Verification example 2-6 | Verification example 2-9 |
|---|---|---|---|---|---|
| Test cell No. |  |  | 3000 | 6000 | 9000 |
| White brightness change | Up, down, left, right |  | Good | Very good | Very good |
|  | Oblique |  | Good | Very good | Very good |

From Table 10 to Table 12, it is understood that, in the transmissive display, the brightness change is small and favorable in Example 2-2, Example 2-3, Example 2-4, Example 2-5, Example 2-6, Example 2-7, Example 2-8, and Example 2-9 as compared to Example 2-1 using the test cell 1000. Among them, Examples 2-4, 2-6, and 2-9 are more favorable, and Examples 2-6 and 2-9 are most favorable. In Example 2-6 and Example 2-9, the brightness change in the vertical and horizontal directions and the brightness change in the oblique direction were symmetrical.

(f) Change in Black Brightness in Transmission Mode

For each of the test cells 1000 to 9000, changes in brightness in the vertical and horizontal directions and in the oblique direction were evaluated. Specifically, in black display in the transmission mode, the difference in brightness between the front (polar angle 0°) and the polar angle 60° at each azimuth angle (polar angle 60°−front (polar angle 0°)) was defined as black floating in an oblique view, and the evaluation was made in accordance with the following criteria. The results are depicted in Table 13 to table 15.

Very good: the difference in brightness between the front (polar angle 0°) and the polar angle 60° is less than 50 cd/m².
Good: the difference in brightness is 50 cd/m² or more and less than 110 cd/m².
Poor: the difference in brightness is 110 cd/m² or more.

TABLE 13

|  |  | Verification example 2-1 | Verification example 2-4 | Verification example 2-7 |
|---|---|---|---|---|
| Test cell No. |  | 1000 | 4000 | 7000 |
| Black brightness change | Up, down, left, right | Poor | Very good | Good |
|  | Oblique | Poor | Good | Poor |

TABLE 14

|  |  | Verification example 2-2 | Verification example 2-5 | Verification example 2-8 |
|---|---|---|---|---|
| Test cell No. |  | 2000 | 5000 | 8000 |
| Black brightness change | Up, down, left, right | Very good | Poor | Good |
|  | Oblique | Poor | Good | Good |

TABLE 15

|  |  | Verification example 2-3 | Verification example 2-6 | Verification example 2-9 |
|---|---|---|---|---|
| Test cell No. |  | 3000 | 6000 | 9000 |
| Black brightness change | Up, down, left, right | Poor | Very good | Very good |
|  | Oblique | Poor | Very good | Very good |

From Table 13 to Table 15, it is understood that, in the transmissive display, the black floating is small and favorable in Example 2-2, Example 2-4, Example 2-5, Example 2-6, Example 2-7, Example 2-8, and Example 2-9 as compared to Example 2-1 using the test cell 1000. Among them, Examples 2-4, 2-6, and 2-9 are more favorable, and Examples 2-6 and 2-9 are most favorable. In Example 2-6 and Example 2-9, the black floating in the oblique view in the vertical and horizontal directions and in the oblique direction was small and most favorable.

Verification Example 3

In this verification example, the viewing angle characteristics and the like were examined in more detail using each of the test cells 1000, 4000, 6000, and 9000. Specifically, the following studies (g) to (p) were conducted. The twist angle was 83°, and a negative-type liquid crystal material was used. Optical axis settings (initial settings) and specifications of the present verification example are depicted in Table 5 and FIG. 24 to FIG. 26. In the following (g) to (k), in the case where the test cell 6000 was used (Example 3-6), results equivalent to those of Example 3-4 using the test cell 4000 were obtained, and therefore the results of Example 3-4 are omitted.

(g) Viewing Angle Characteristics of White Display in Reflection Mode

Figure 27A:
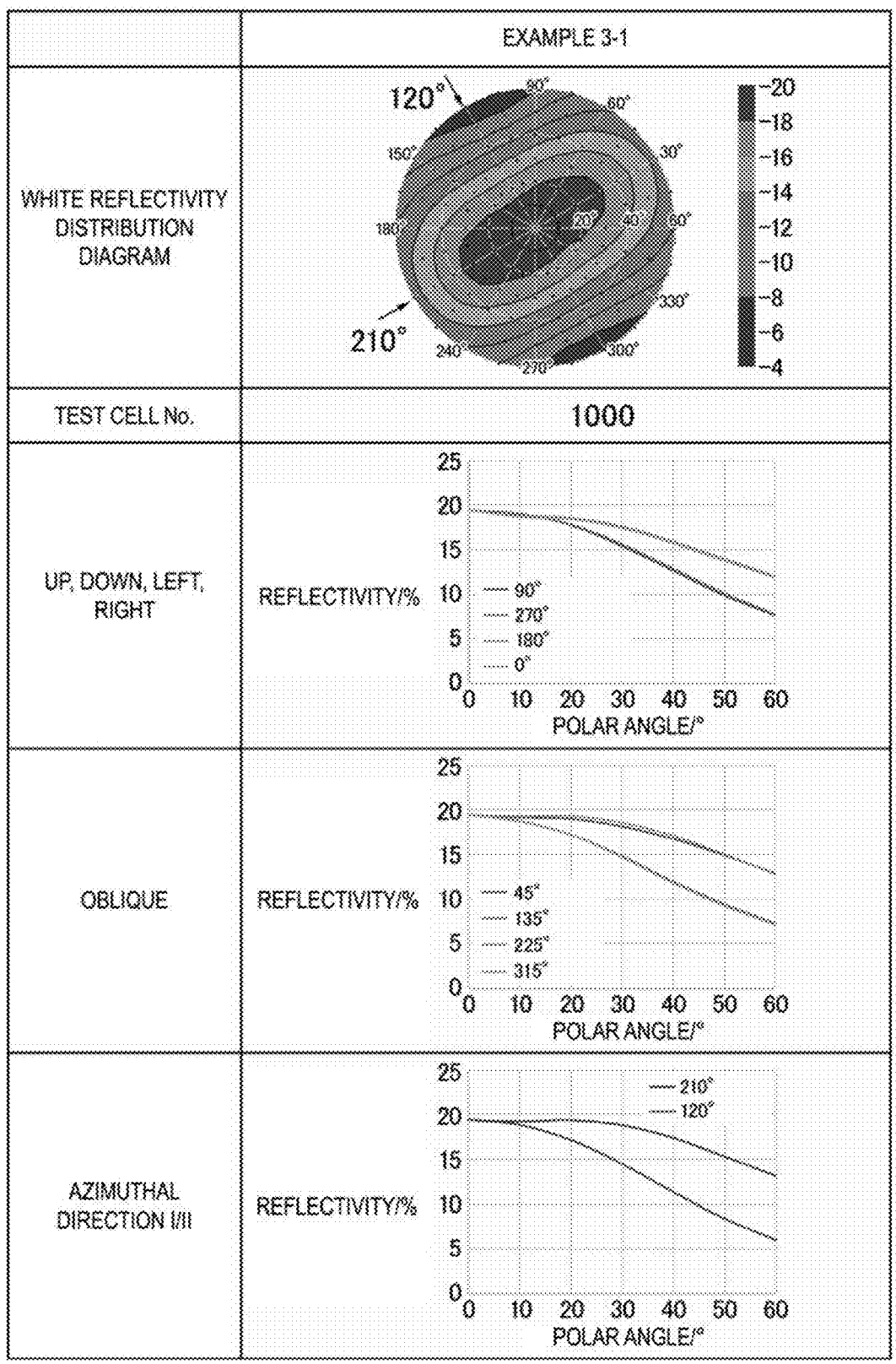
FIG. 27A is a diagram depicting results of Verification Example 3.
Figure 27B:
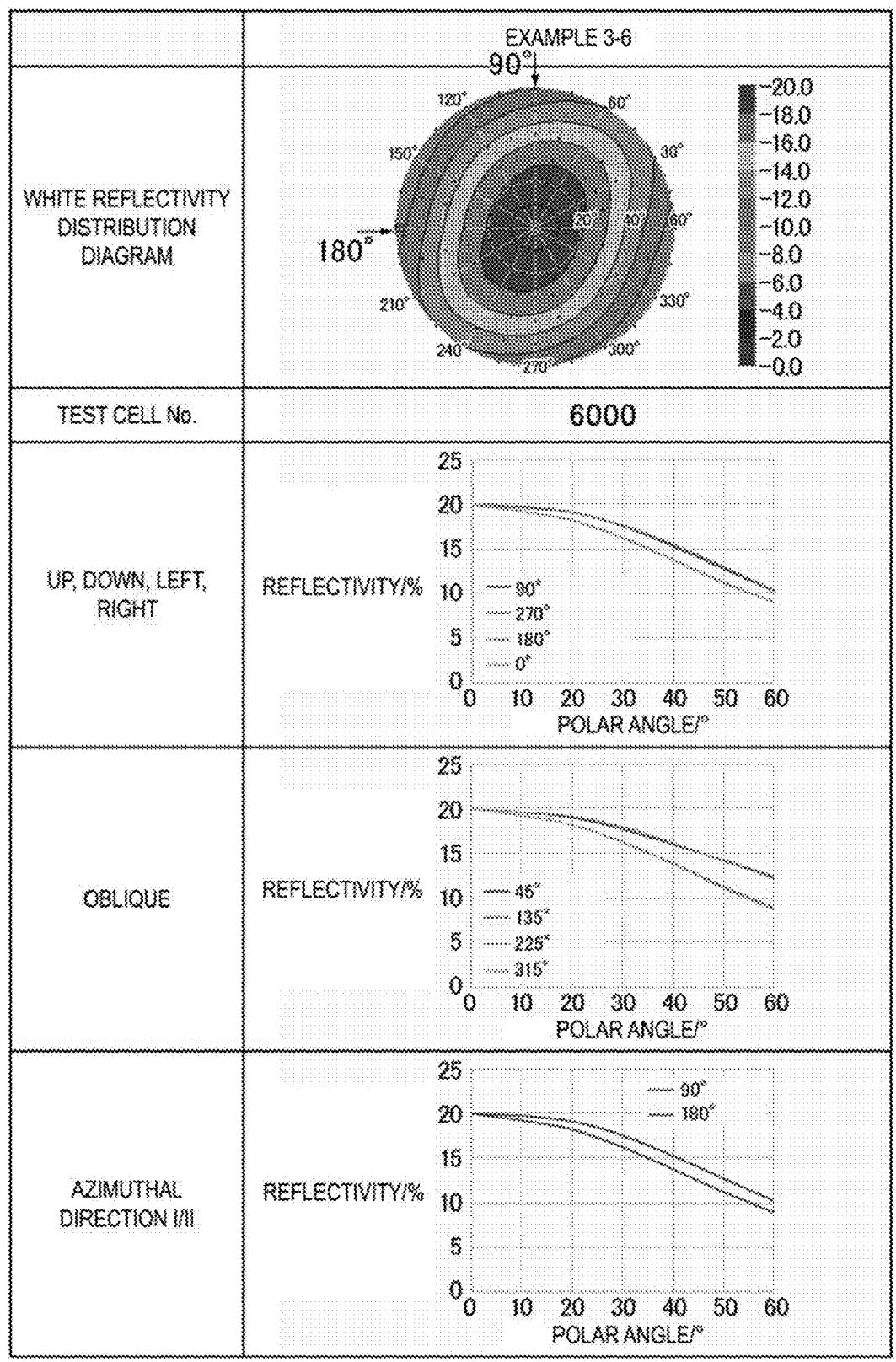
FIG. 27B is a diagram depicting results of Verification Example 3.
Figure 27C:
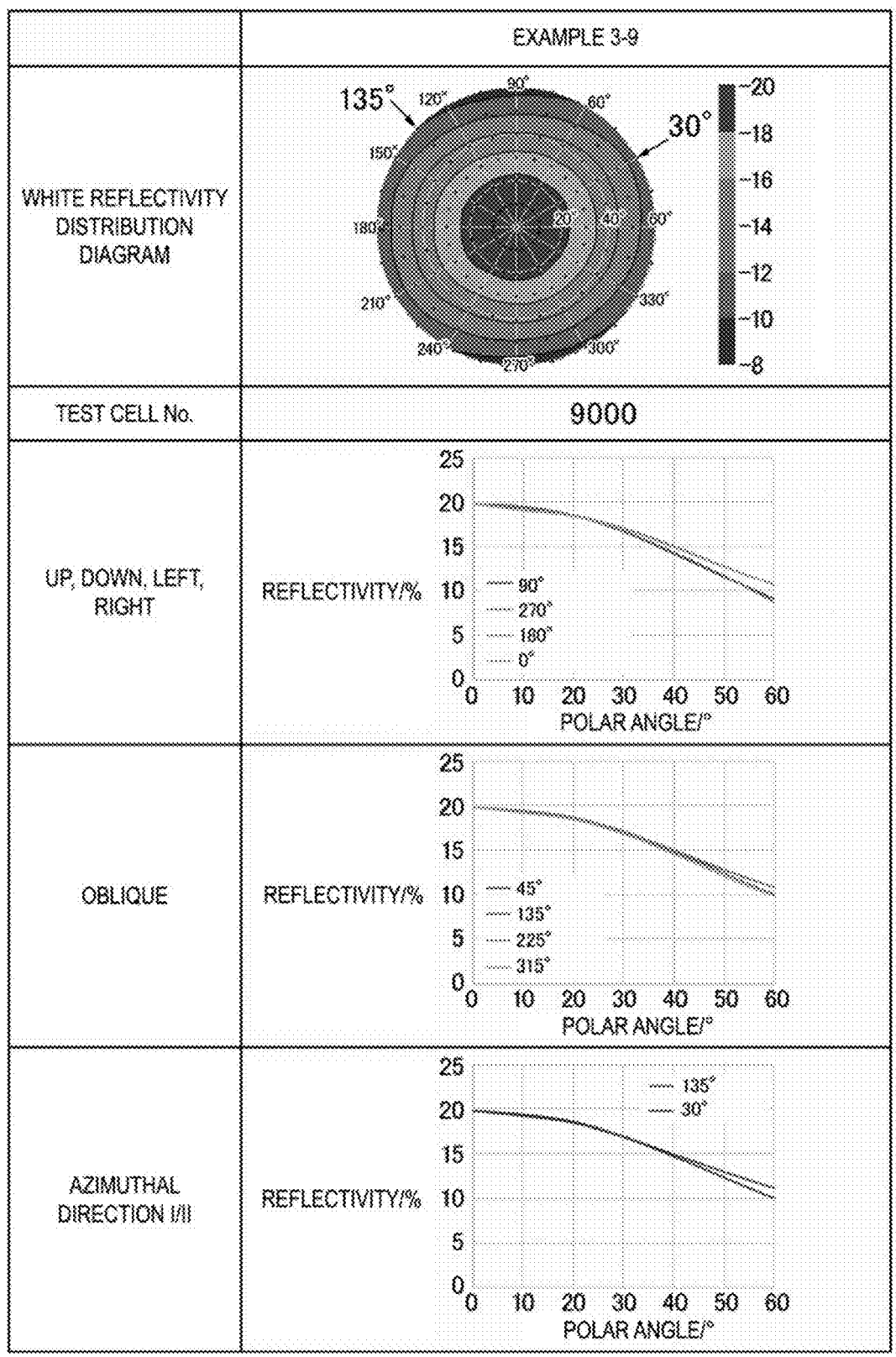
FIG. 27C is a diagram depicting results of Verification Example 3.

For each test cell, the distribution of the reflectivity of white display in the reflection mode was measured using "Display Measuring System" (model number: DMS 803) manufactured by Instrument Systems GmbH. Taking the three o'clock direction on the clock as 0°, the azimuthal directions of the reflectivity characteristics graph were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. The reflectivity characteristics of an azimuthal direction where the reflectivity distribution was widest (also referred to as azimuthal direction I) and the reflectivity characteristics of an azimuthal direction where the reflectivity distribution was narrowest (also referred to as azimuthal direction II) were each plotted in a graph. The results are depicted in FIG. 27A to FIG. 27C. FIG. 27A to FIG. 27C are diagrams depicting the results of Verification Example 3.

When the white reflectivity distribution diagrams in the respective drawings are compared with each other, it is understood that in Example 3-9, since the distribution diagram is closest to a circle, the viewing angle characteristics in the white display are most favorable. In Example 3-1, the azimuthal direction I is 210° and the azimuthal direction II is 120°. In Example 3-4, the azimuthal direction I is 90° and the azimuthal direction II is 180°. In Example 3-9, the azimuthal direction I is 135° and the azimuthal direction II is 30°.

From each white reflectivity graph, it is understood that there is no difference in reflectivity between the upward direction and the downward direction and there is also no difference in reflectivity between the leftward direction and the rightward direction in Examples 3-4 and 3-9. In contrast, there is a difference in reflectivity between the upward direction and the downward direction and there is also a difference in reflectivity between the leftward direction and the rightward direction in Example 3-1. It is understood that the difference in reflectivity in the oblique direction is small in Example 3-4 as compared to Example 3-1, and there is no difference in reflectivity in the oblique direction in Example 3-9. It is also understood that the difference in reflectivity between the azimuthal direction where the distribution is widest and the azimuthal direction where the distribution is narrowest is small in Examples 3-4 and 3-9 as compared to Example 3-1.

Thus, it was found that the viewing angle characteristics of white display were most favorable in Example 3-9 and favorable in Example 3-4 (and Example 3-6), but were poor in Example 3-1.

(h) Viewing Angle Characteristics of Black Display in Reflection Mode

Figure 28A:
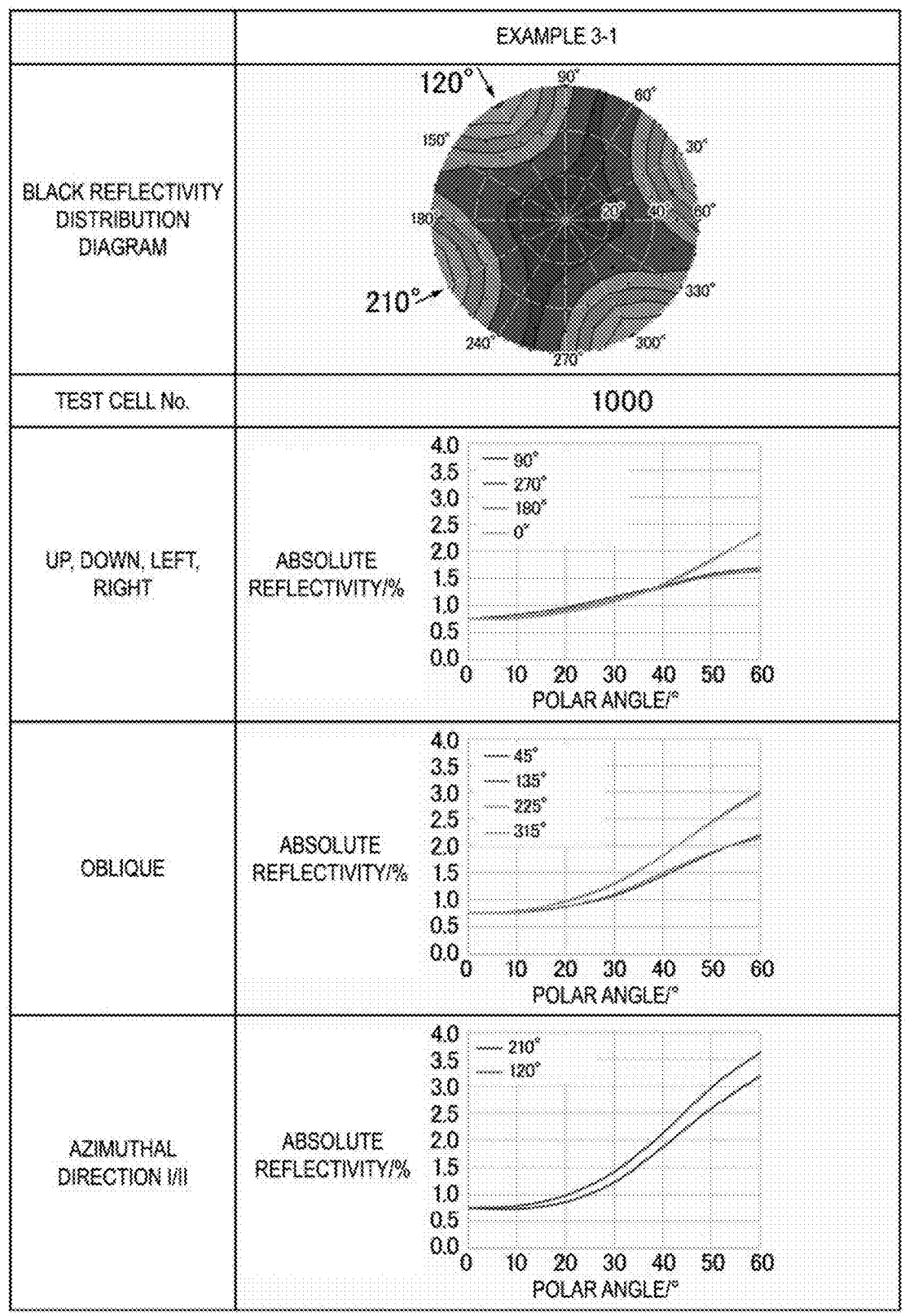
FIG. 28A is a diagram depicting results of Verification Example 3.
Figure 28B:
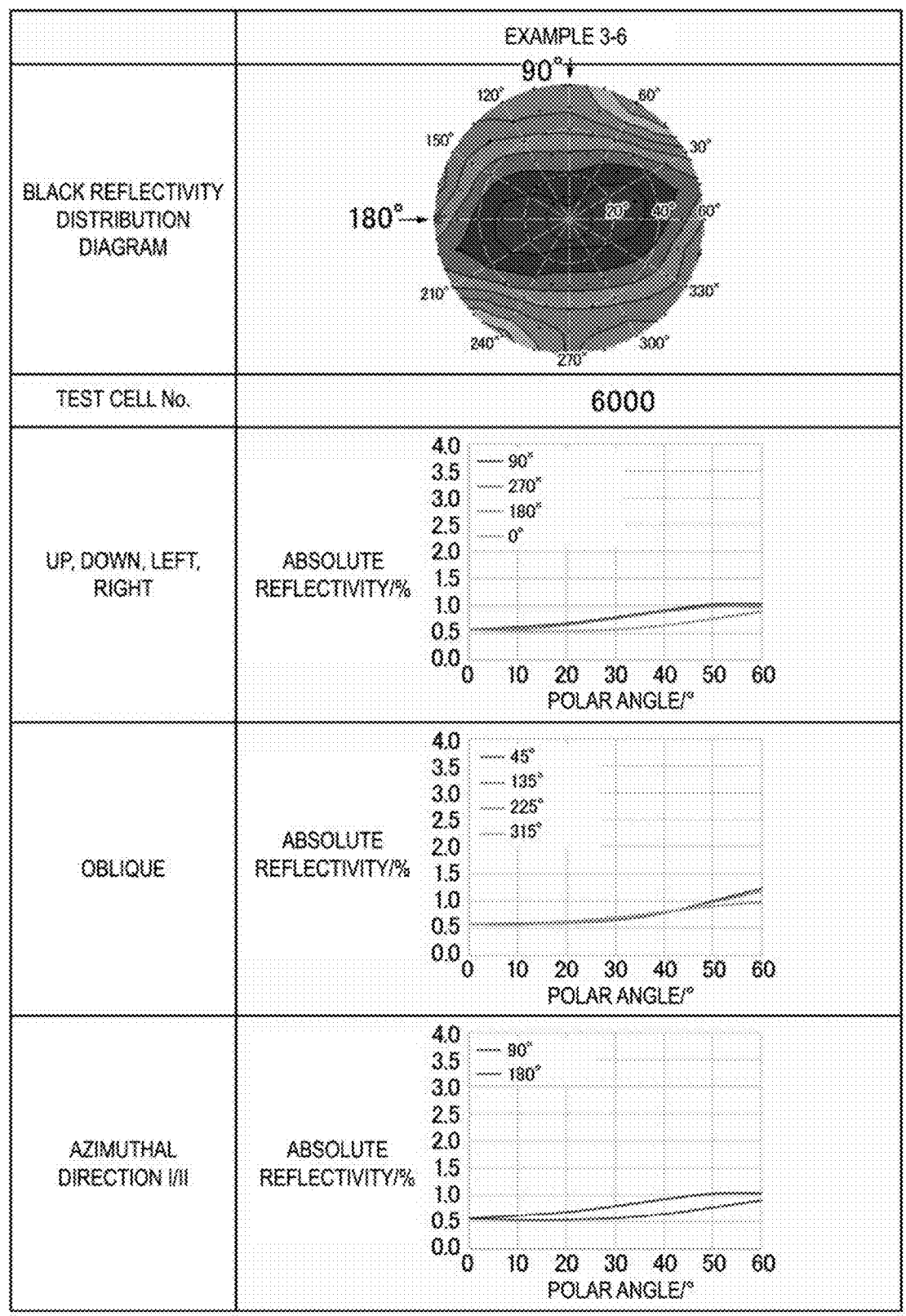
FIG. 28B is a diagram depicting results of Verification Example 3.
Figure 28C:
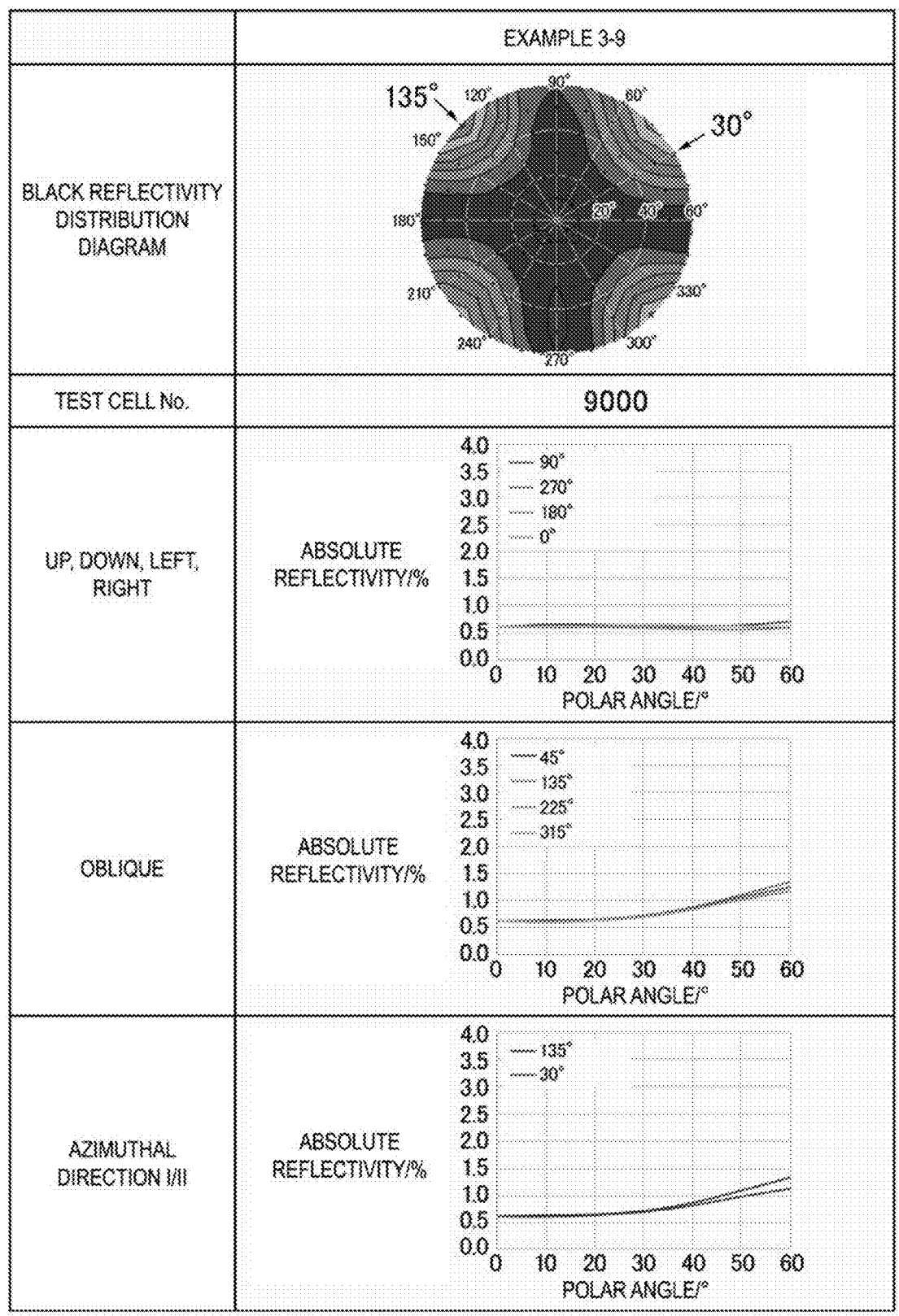
FIG. 28C is a diagram depicting results of Verification Example 3.

For each test cell, the distribution of the reflectivity of black display was measured using "Display Measuring System" (model number: DMS 803) manufactured by Instrument Systems GmbH. Taking the three o'clock direction on the clock as 0°, the azimuthal directions of the reflectivity characteristics graph were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. The reflectivity characteristics of the azimuthal direction I where the reflectivity distribution was widest and the reflectivity characteristics of the azimuthal direction II where the reflectivity distribution was narrowest were each plotted in a graph. The results are depicted in FIG. 28A to FIG. 28C. FIG. 28A to FIG. 28C are diagrams depicting the results of Verification Example 3.

From the black reflectivity distribution diagram in each drawing, the azimuthal direction I is 210° and the azimuthal direction II is 120° in Example 3-1, the azimuthal direction I is 90° and the azimuthal direction II is 180° in Example 3-4, and the azimuthal direction I is 135° and the azimuthal direction II is 30° in Example 3-9. The shape of the reflectivity distribution can secure vertical and horizontal symmetry by changing the initial alignment direction of the liquid crystal molecules.

From each graph of black reflectivity, it is understood that there is no difference in reflectivity between the upward direction and the downward direction and there is also no difference in reflectivity between the leftward direction and the rightward direction in any of Examples 3-1, 3-4, and 3-9. On the other hand, it is understood that the difference in reflectivity in the oblique direction is large in Example 3-1, whereas the difference is small in Examples 3-4 and 3-9. It is understood that the difference in reflectivity between the azimuthal direction I and the azimuthal direction II is small in Example 3-9 as compared to Example 3-1.

Thus, it was found that the viewing angle characteristics of black display were most favorable in Example 3-9 and favorable in Example 3-4 (and Example 3-6), but were poor in Example 3-1.

(i) Contrast Characteristics in Reflection Mode

Figure 29A:
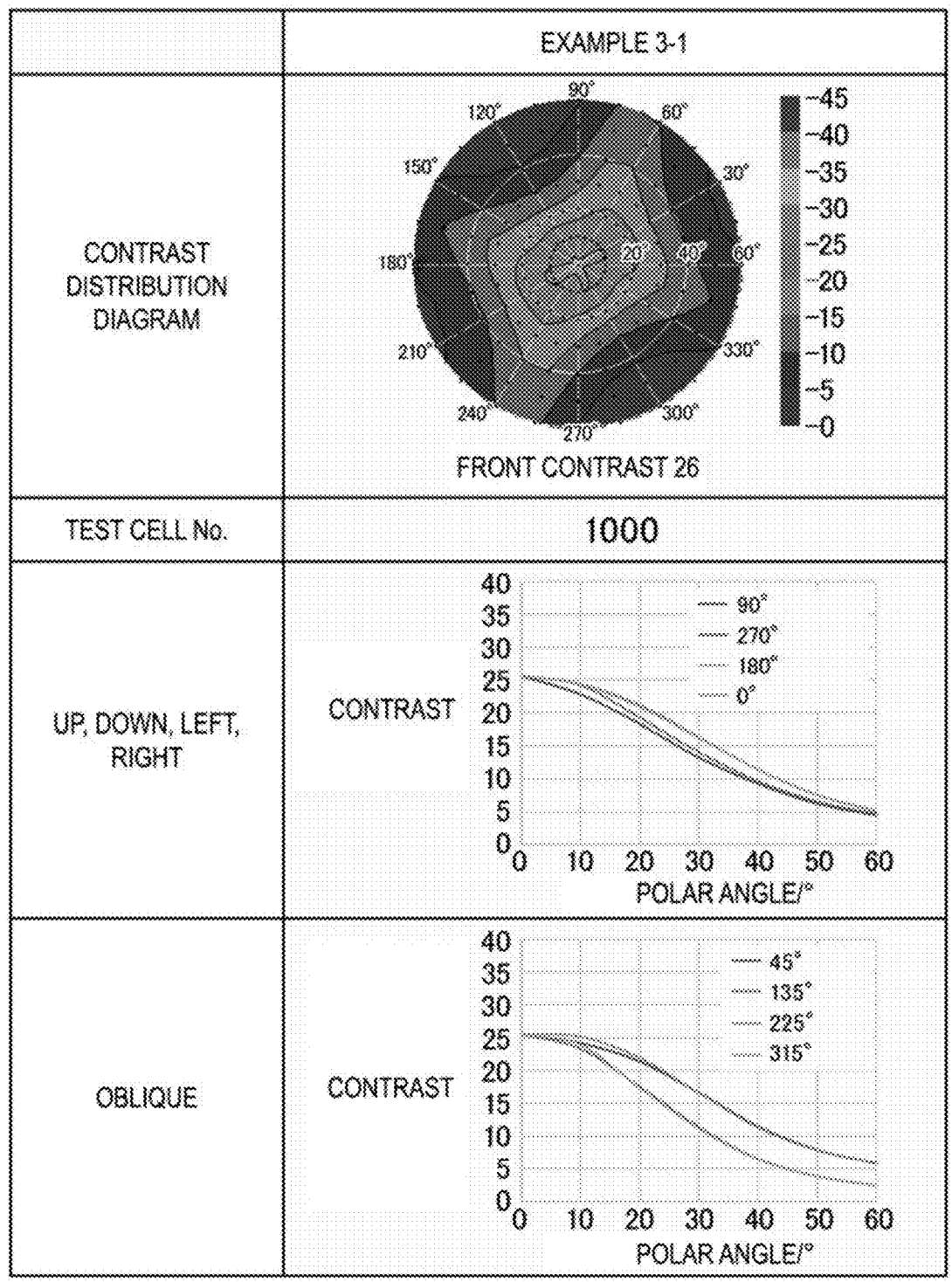
FIG. 29A is a diagram depicting results of Verification Example 3.
Figure 29B:
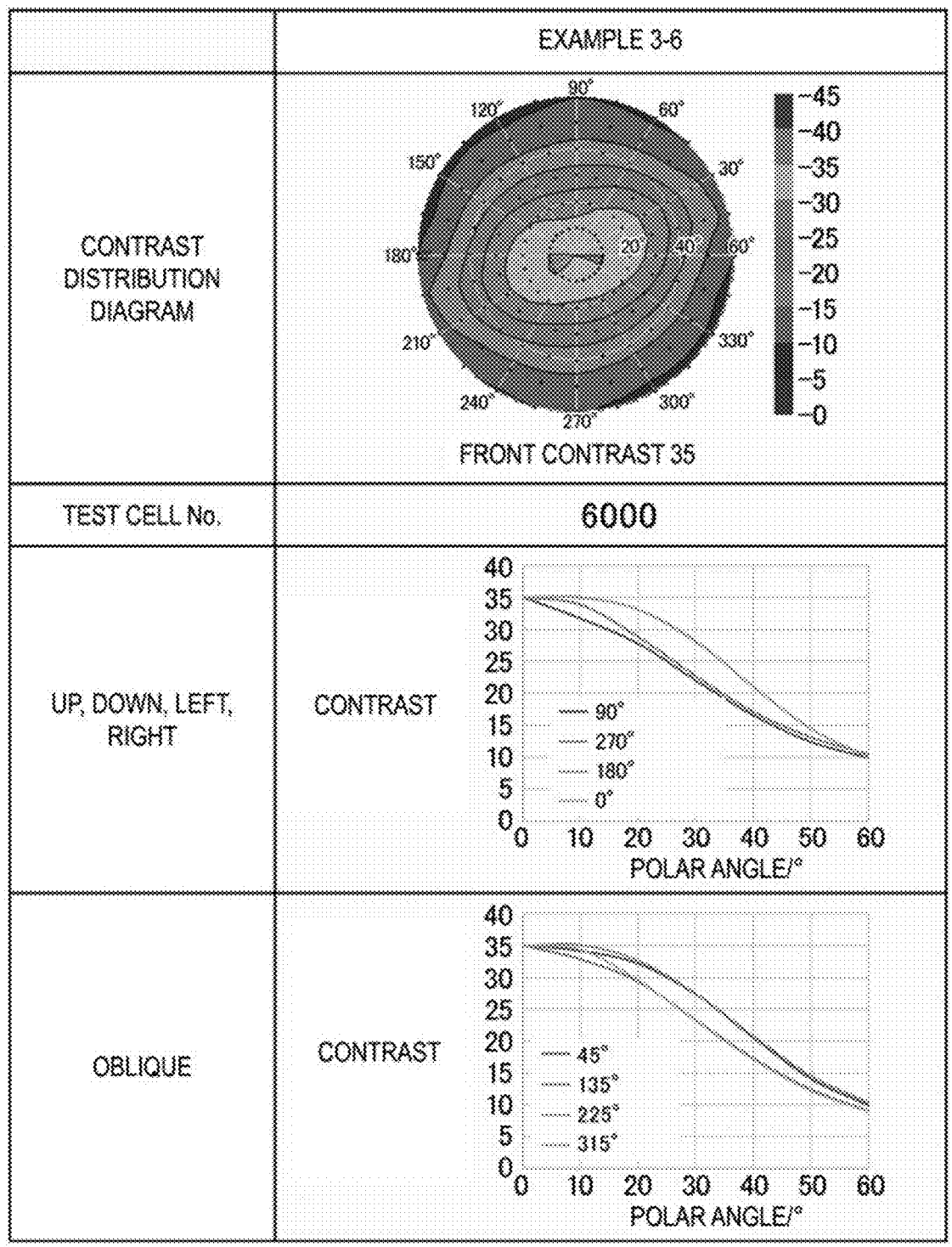
FIG. 29B is a diagram depicting results of Verification Example 3.
Figure 29C:
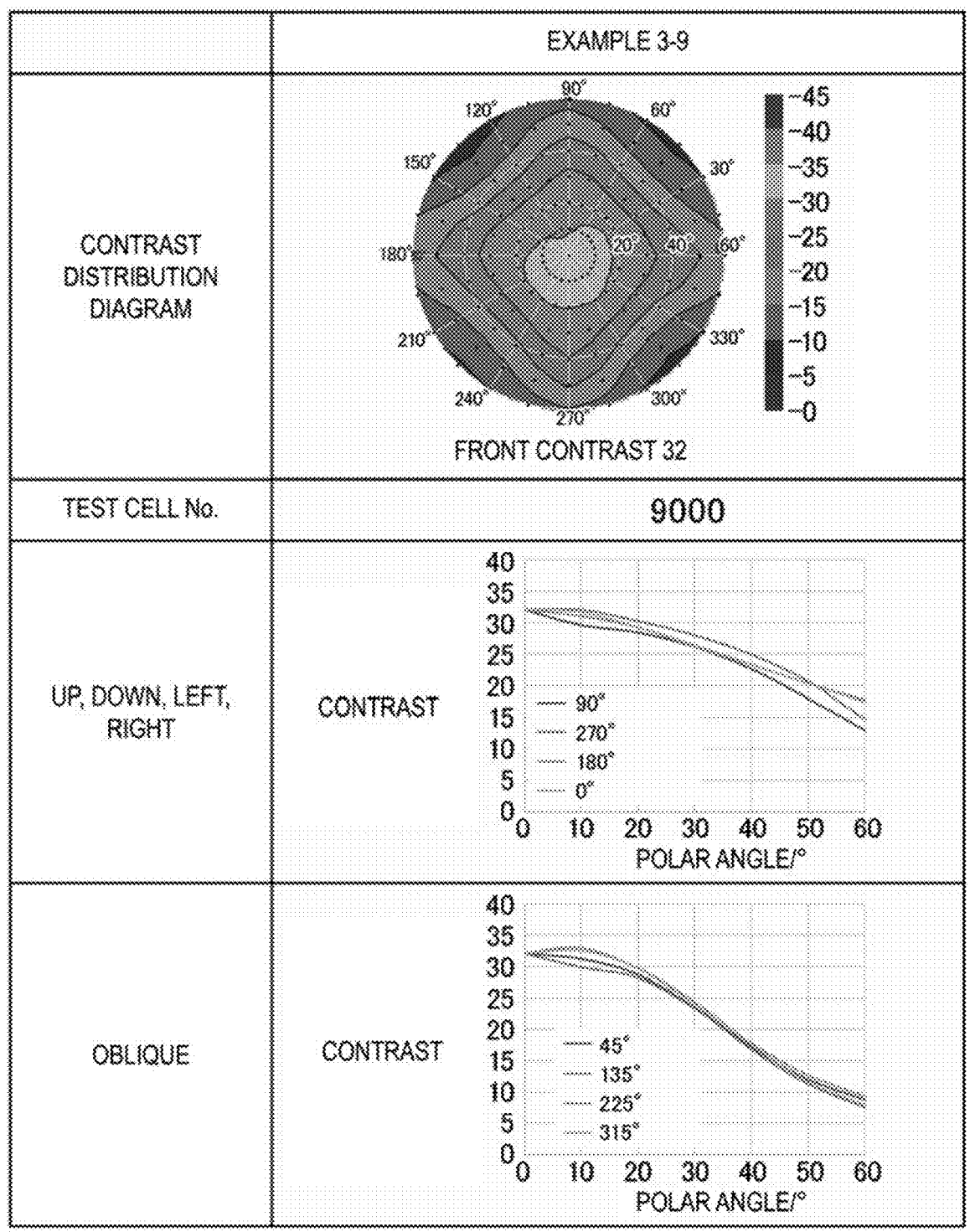
FIG. 29C is a diagram depicting results of Verification Example 3.

For each test cell, the distribution of contrast in the reflection mode was obtained from the viewing angle characteristics of white display and the viewing angle characteristics of black display. Specifically, the reflectivity ratio (reflectivity of white display/reflectivity of black display) was obtained at each azimuth angle and a polar angle. Taking the three o'clock direction on the clock as 0°, the azimuthal directions were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. The results are depicted in FIG. 29A to FIG. 29C. FIG. 29A to FIG. 29C are diagrams depicting the results of Verification Example 3.

From FIG. 29A to FIG. 29C, it was found that the contrast characteristics in the reflection mode were most favorable in Example 3-9 and favorable in Example 3-4 (and Example 3-6), but were poor in Example 3-1. The shape of the contrast distribution can secure vertical and horizontal symmetry by changing the initial alignment direction of the liquid crystal molecules.

Figure 30A:
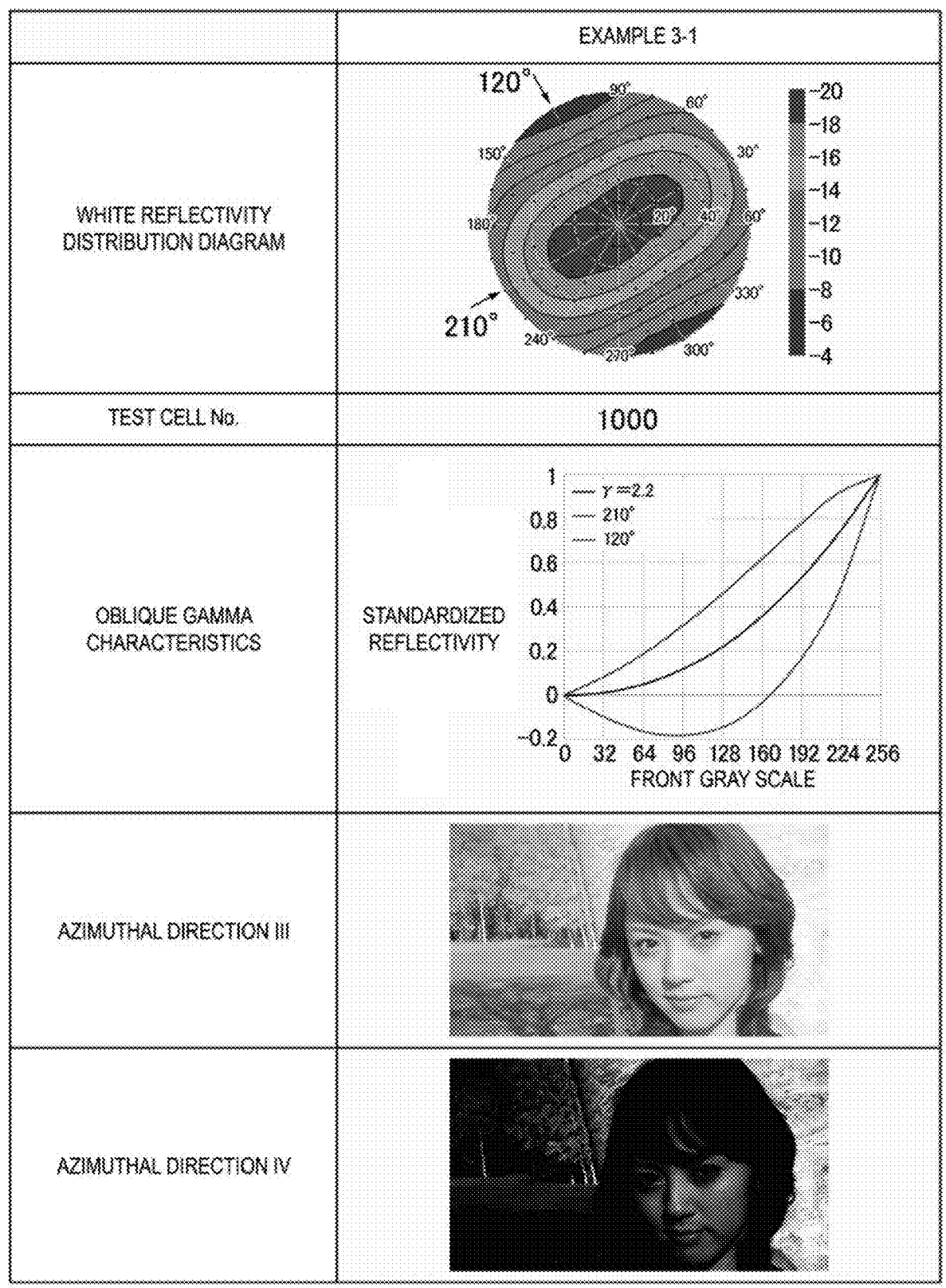
FIG. 30A is a diagram depicting results of Verification Example 3.
Figure 30B:
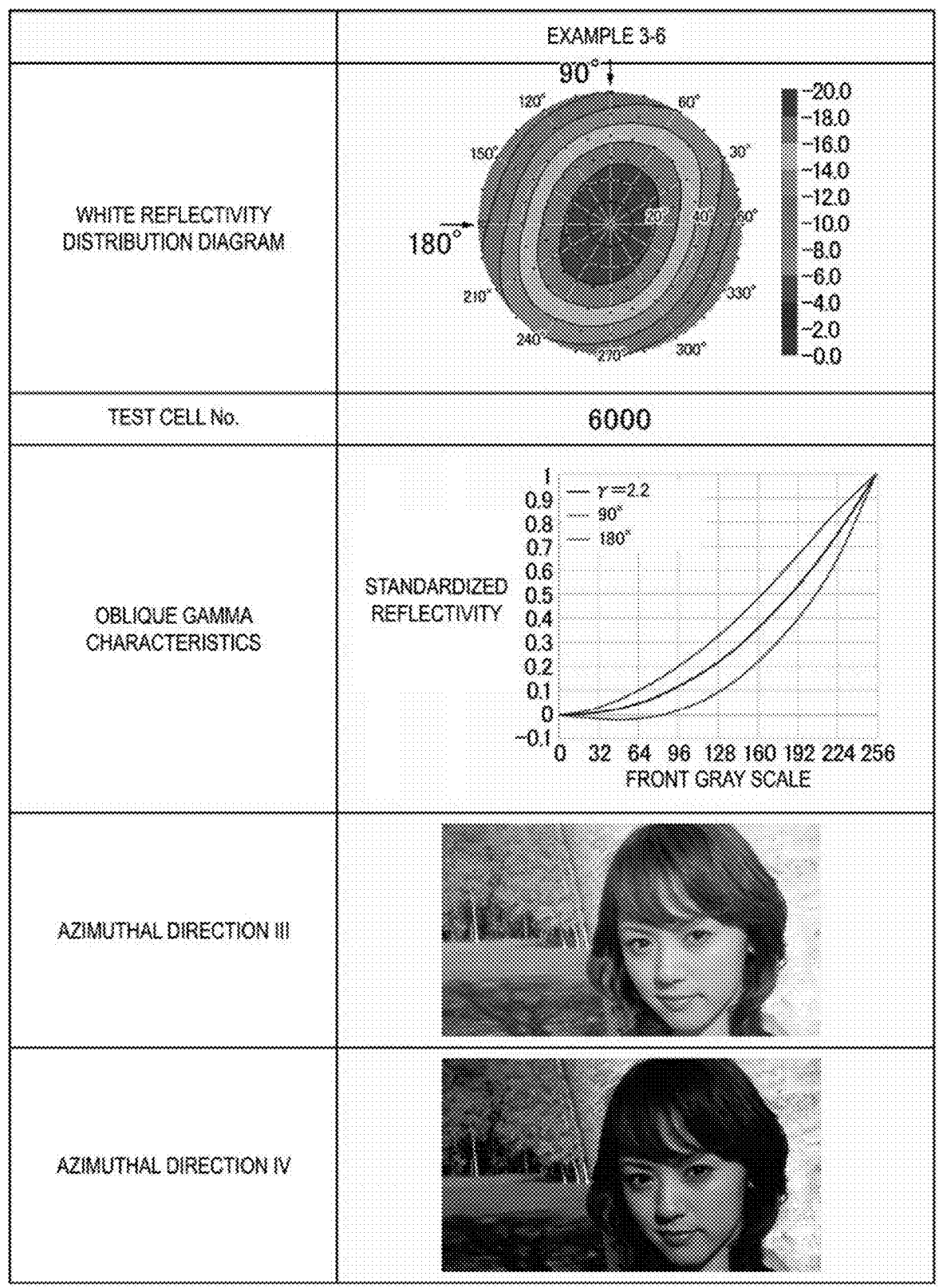
FIG. 30B is a diagram depicting results of Verification Example 3.
Figure 30C:
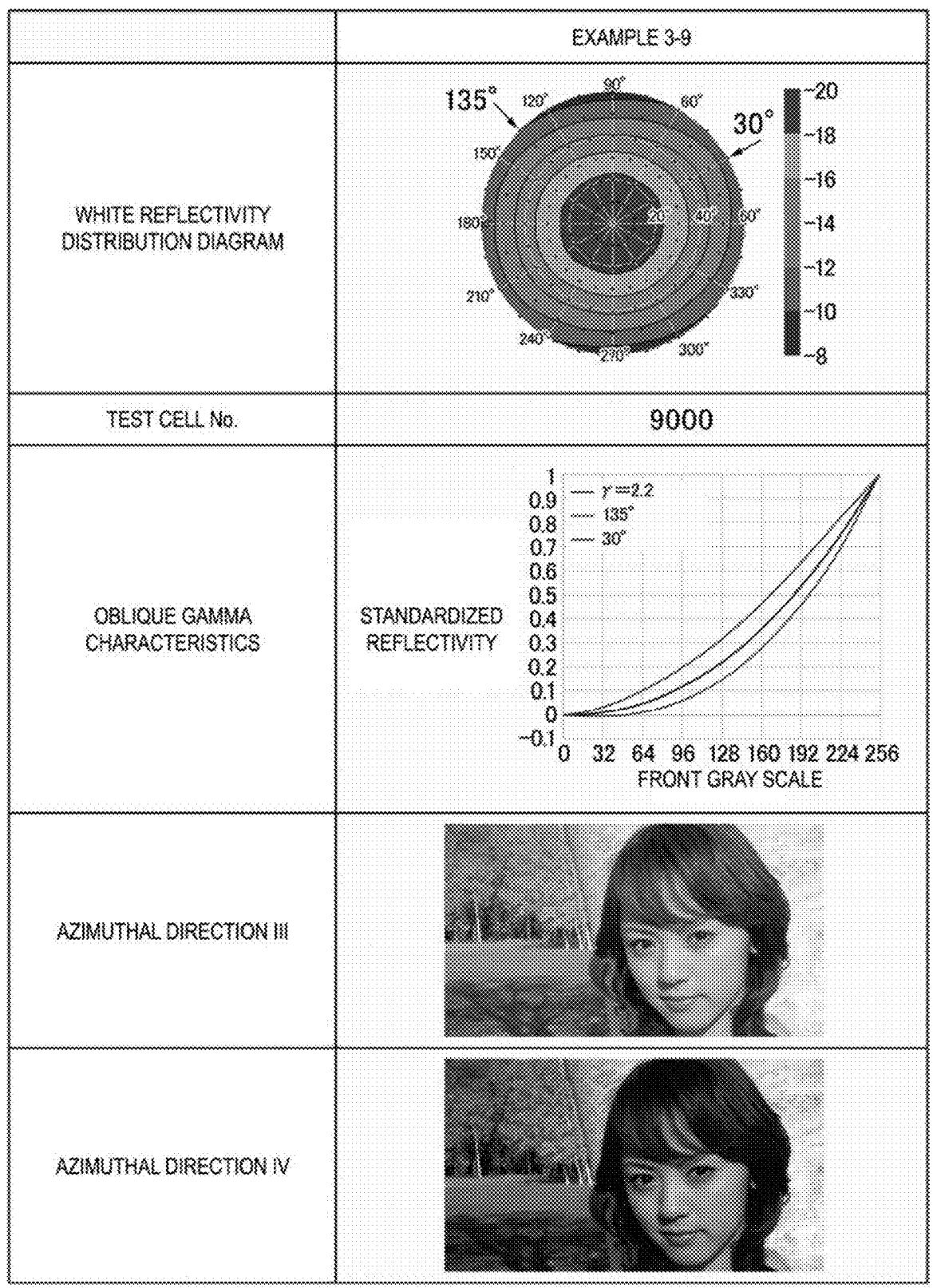
FIG. 30C is a diagram depicting results of Verification Example 3.

(j) Viewing Angle Characteristics (Oblique γ Characteristics) in Reflection Mode For each test cell, a distribution diagram of reflective brightness from a gray scale 255 level of white display to a gray scale 0 level of black display was measured every 32 levels using "Display Measuring System" (model number: DMS 803) manufactured by Instrument Systems GmbH. As a typical example, a distribution diagram of reflective brightness at a gray scale 255 level of white display is depicted. A γ curve was calculated from the results of predetermined gray scales (255, 224, 192, 160, 128, 96, 64, 32, 0). From the obtained distribution diagram, an azimuthal direction (also referred to as an azimuthal direction III) where the gray scale is higher than that of the front (γ=2.2) and an azimuthal direction (also referred to as an azimuthal direction IV) where the gray scale is lower than that of the front (γ=2.2) or unique characteristics are exhibited were obtained, and then the γ curve was analyzed at a polar angle of 50° in these azimuthal directions. In the graph of the oblique γ characteristics, the horizontal axis represents the gray scale (0 to 255 level) in the front view, and the vertical axis represents the standardized reflectivity. The front was corrected to γ=2.2. The results are depicted in FIG. 30A to FIG. 30C. FIG. 30A to FIG. 30C are diagrams depicting the results of Verification Example 3.

From the white brightness distribution diagram in each drawing, the azimuthal direction III is 210° and the azimuthal direction IV is 120° in Example 3-1, the azimuthal direction III is 90° and the azimuthal direction IV is 180° in Example 3-4, and the azimuthal direction III is 135° and the azimuthal direction IV is 30° in Example 3-9. Each angle represents an angle of the azimuth direction when the three o'clock direction on the clock is taken as 0°.

(k) Viewing Angle Characteristics (Image Simulation) in Reflection

Figure 31:
FIG. 31 is an original image viewed from the front.
Figure 32A:
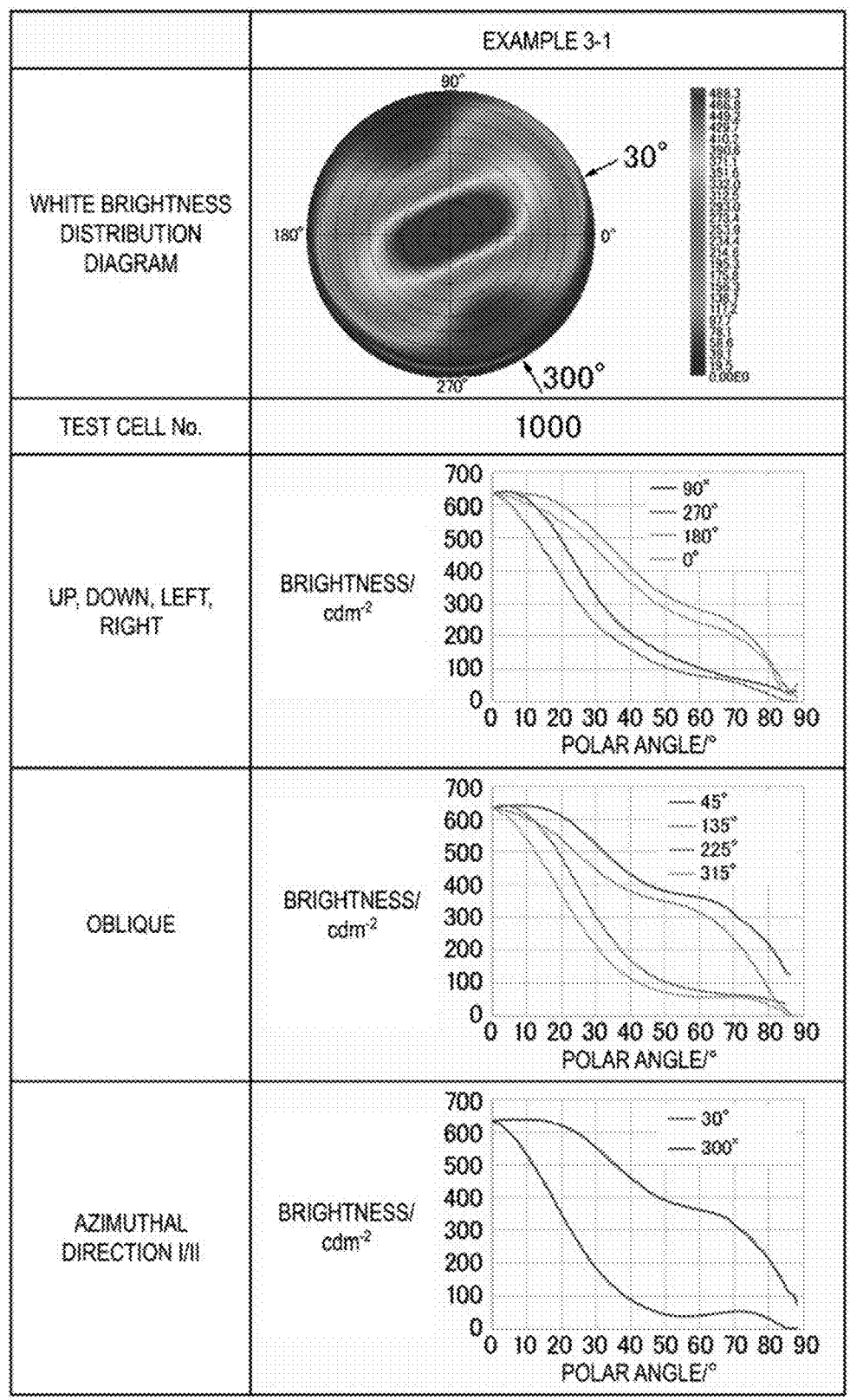
FIG. 32A is a diagram depicting results of Verification Example 3.
Figure 32B:
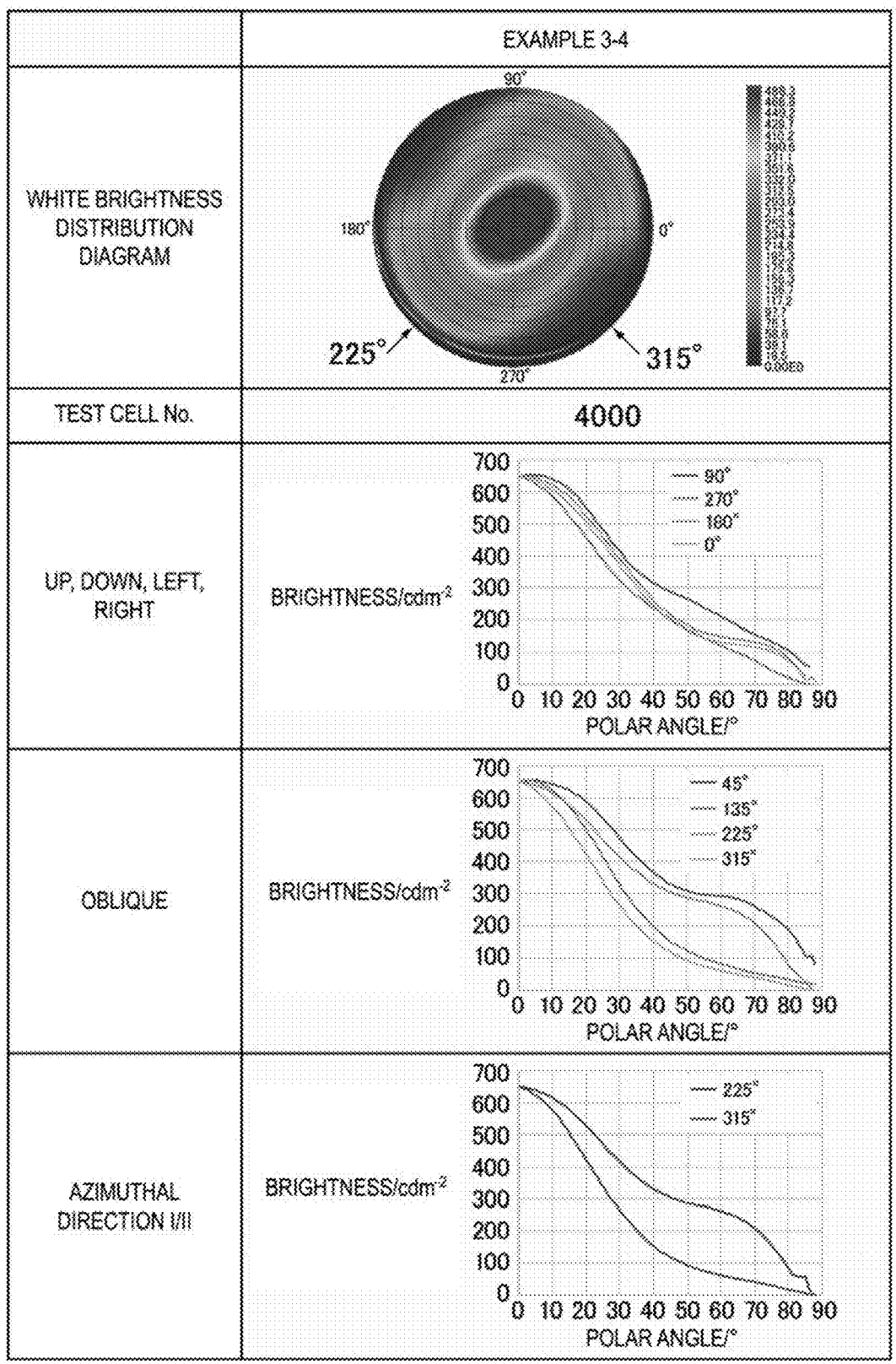
FIG. 32B is a diagram depicting results of Verification Example 3.
Figure 32C:
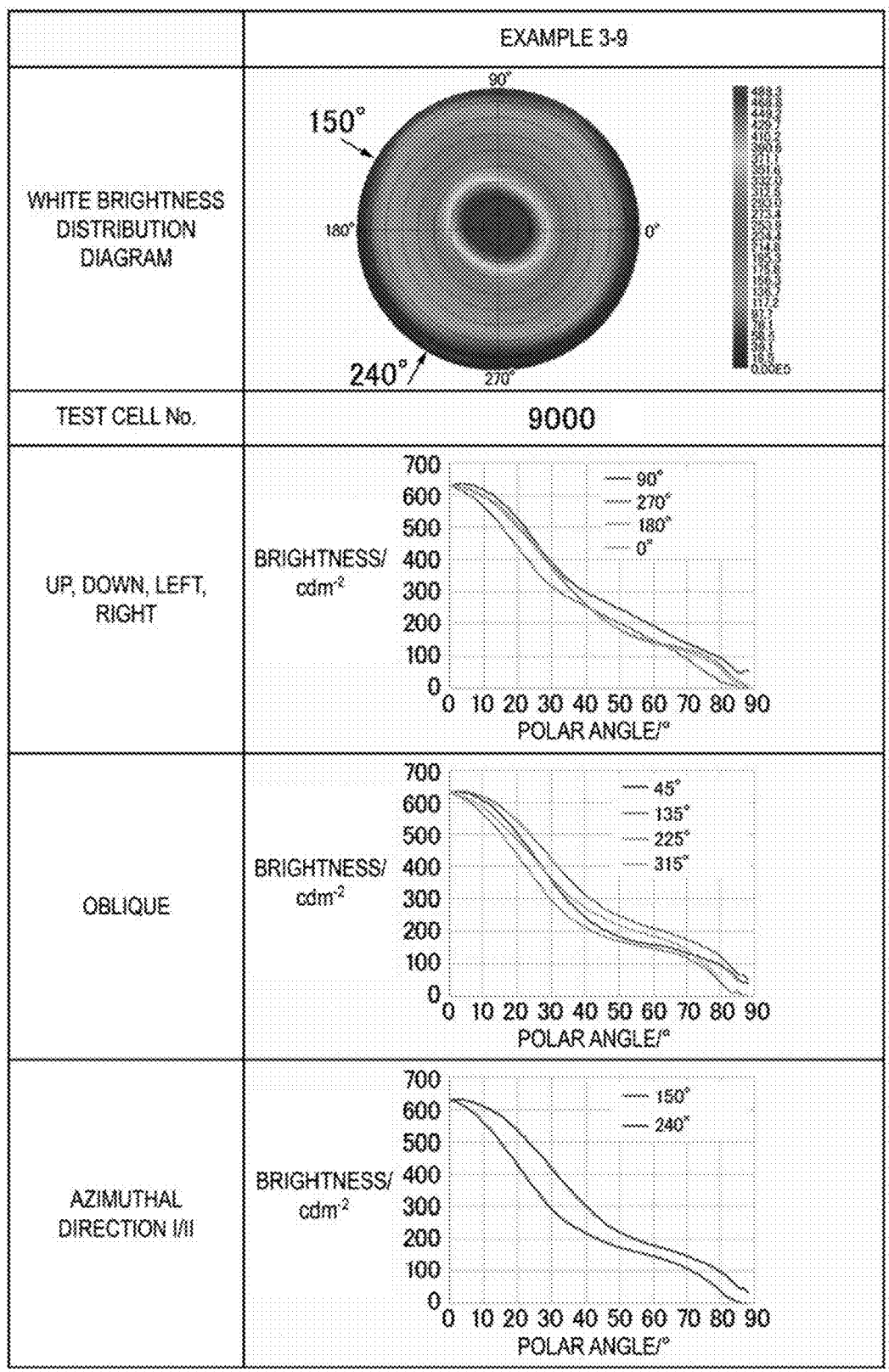
FIG. 32C is a diagram depicting results of Verification Example 3.
Figure 32D:
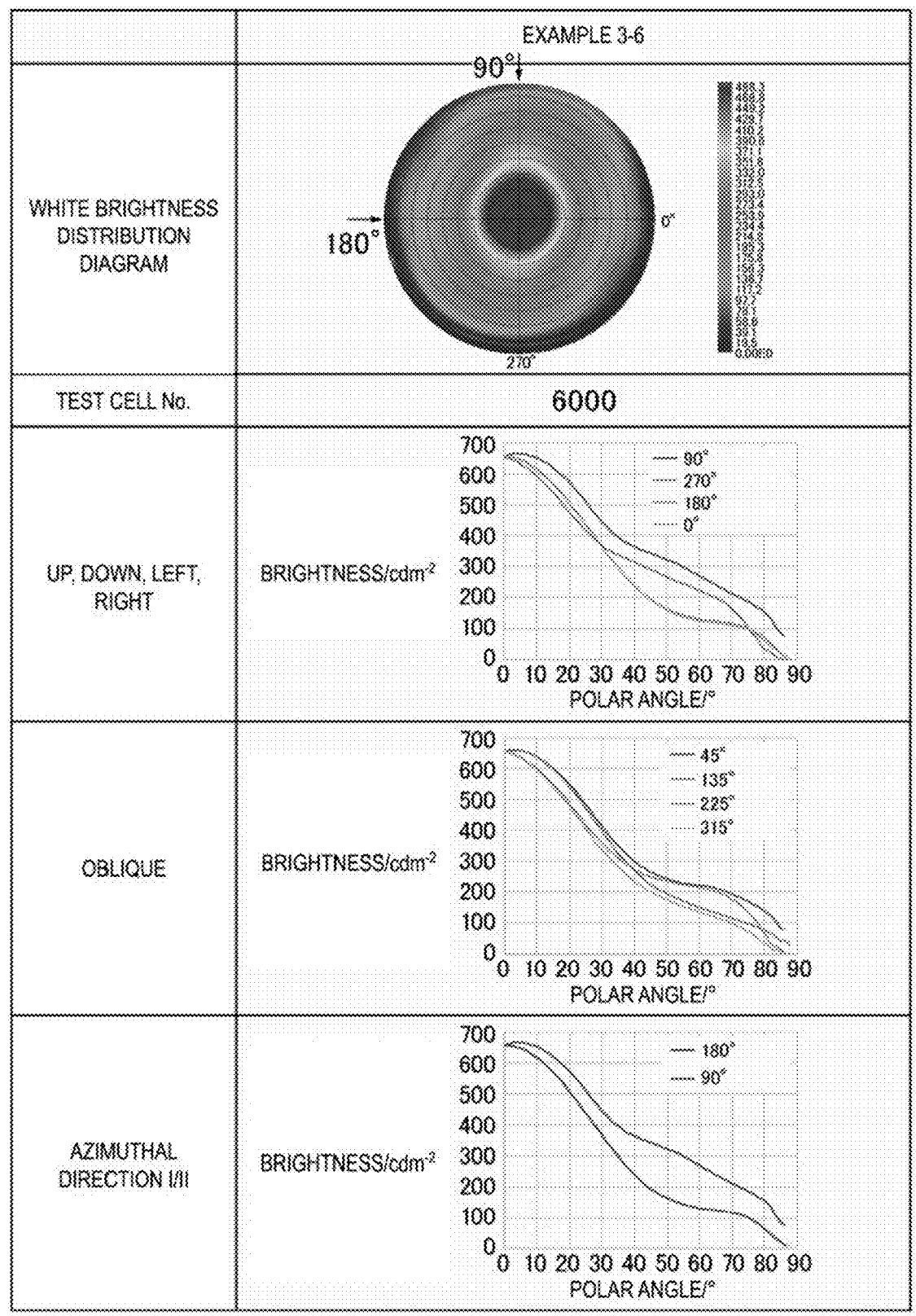
FIG. 32D is a diagram depicting results of Verification Example 3.
Figure 33A:
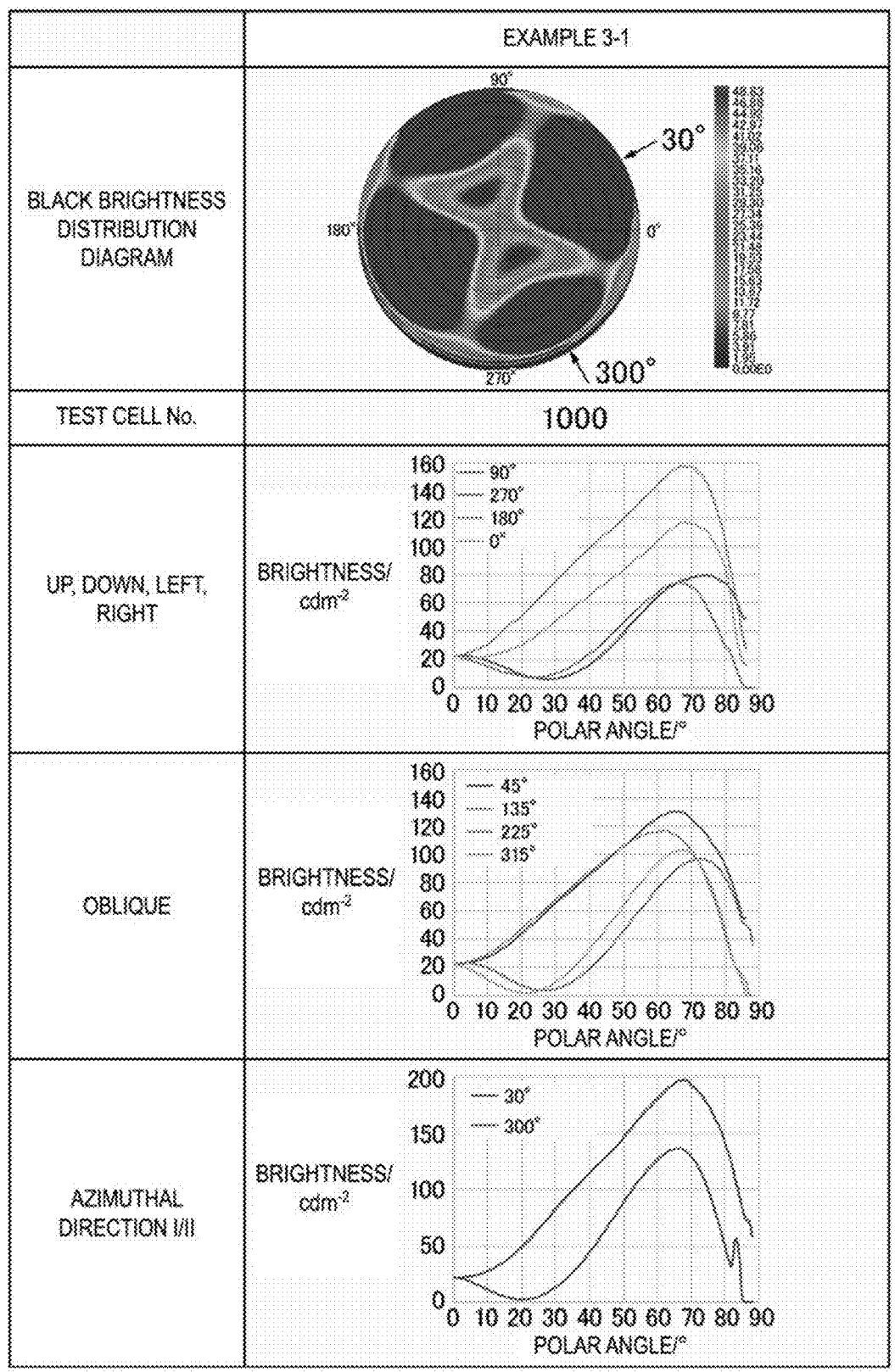
FIG. 33A is a diagram depicting results of Verification Example 3.
Figure 33B:
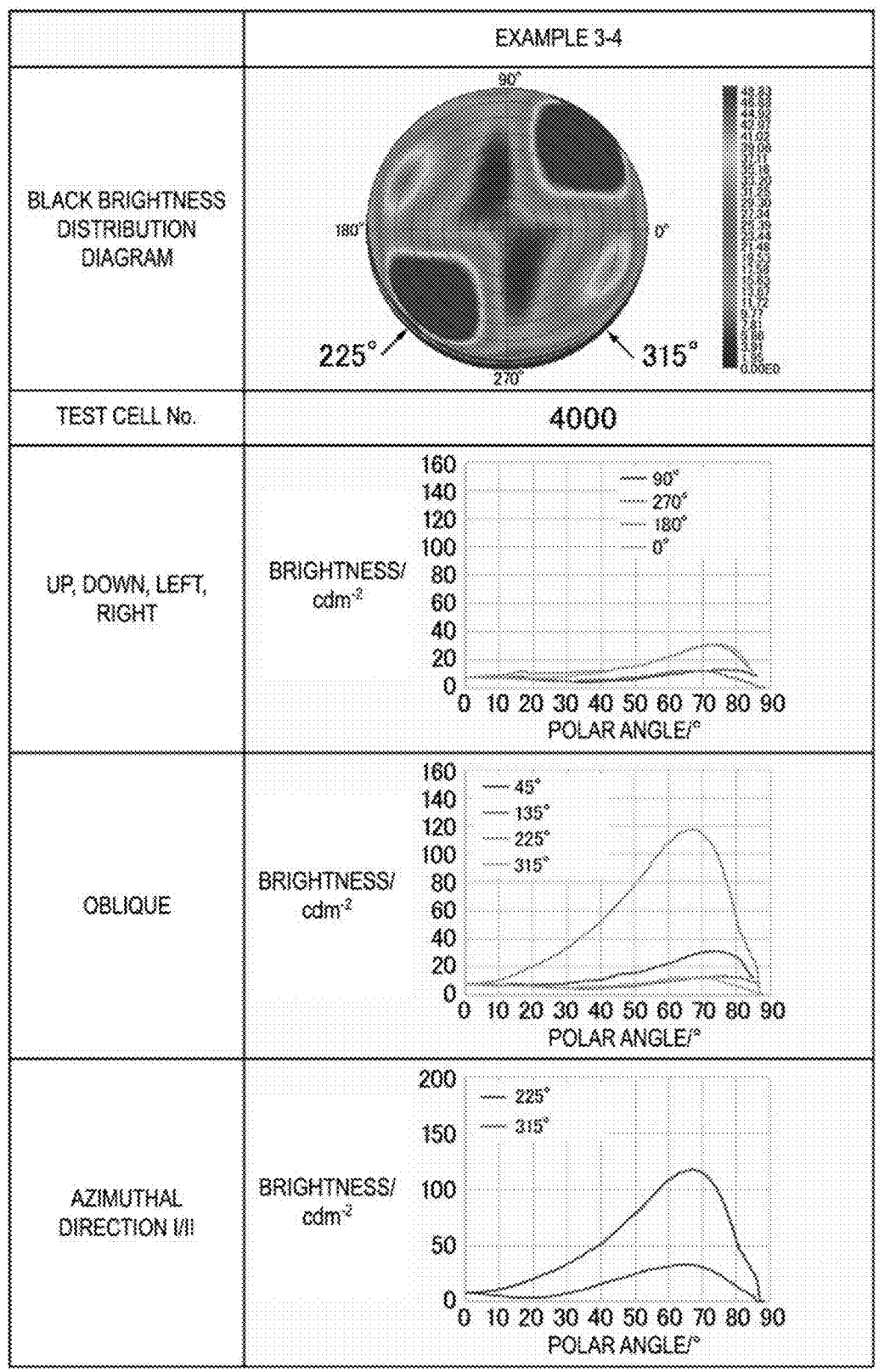
FIG. 33B is a diagram depicting results of Verification Example 3.
Figure 33C:
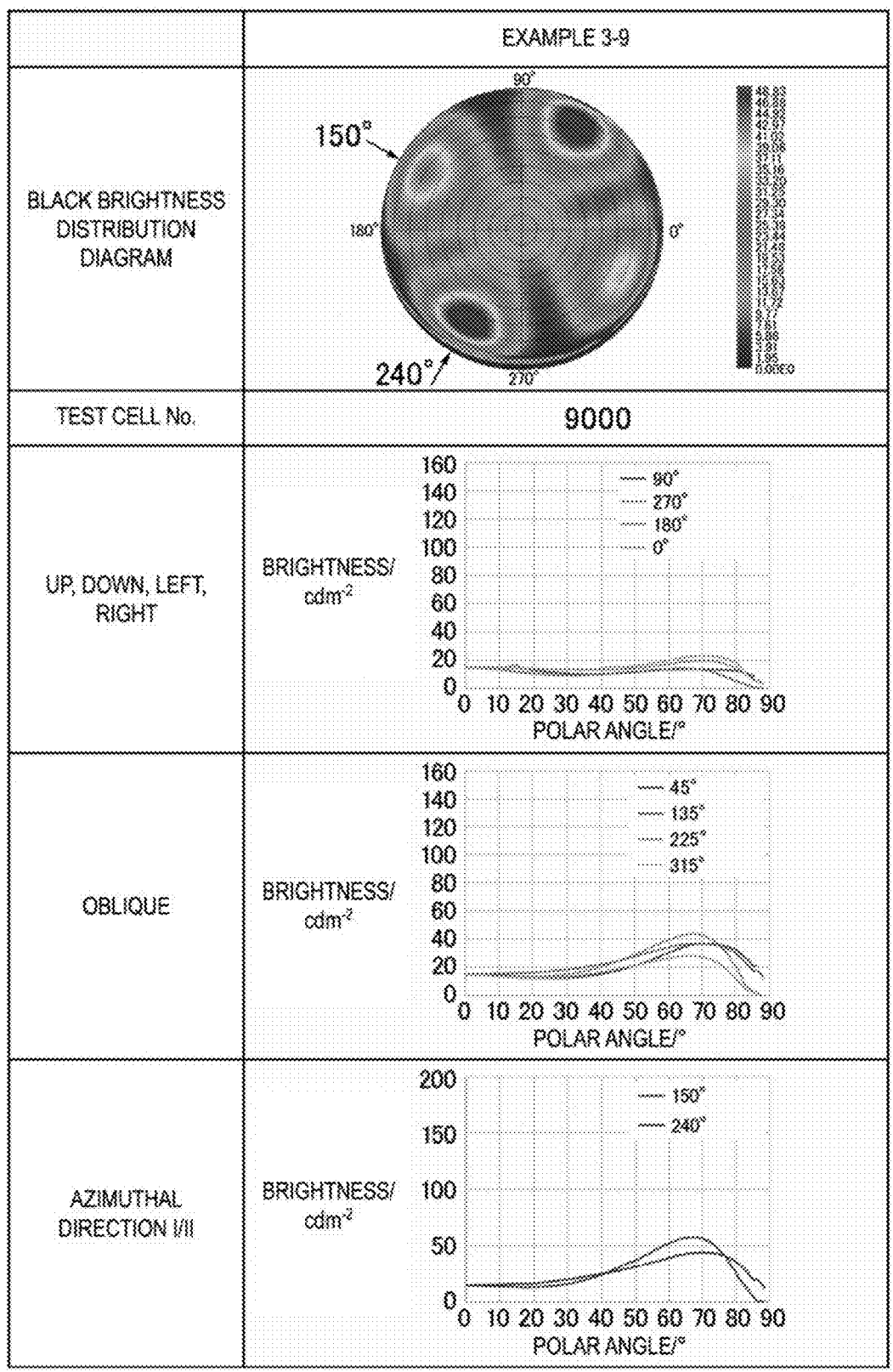
FIG. 33C is a diagram depicting results of Verification Example 3.
Figure 33D:
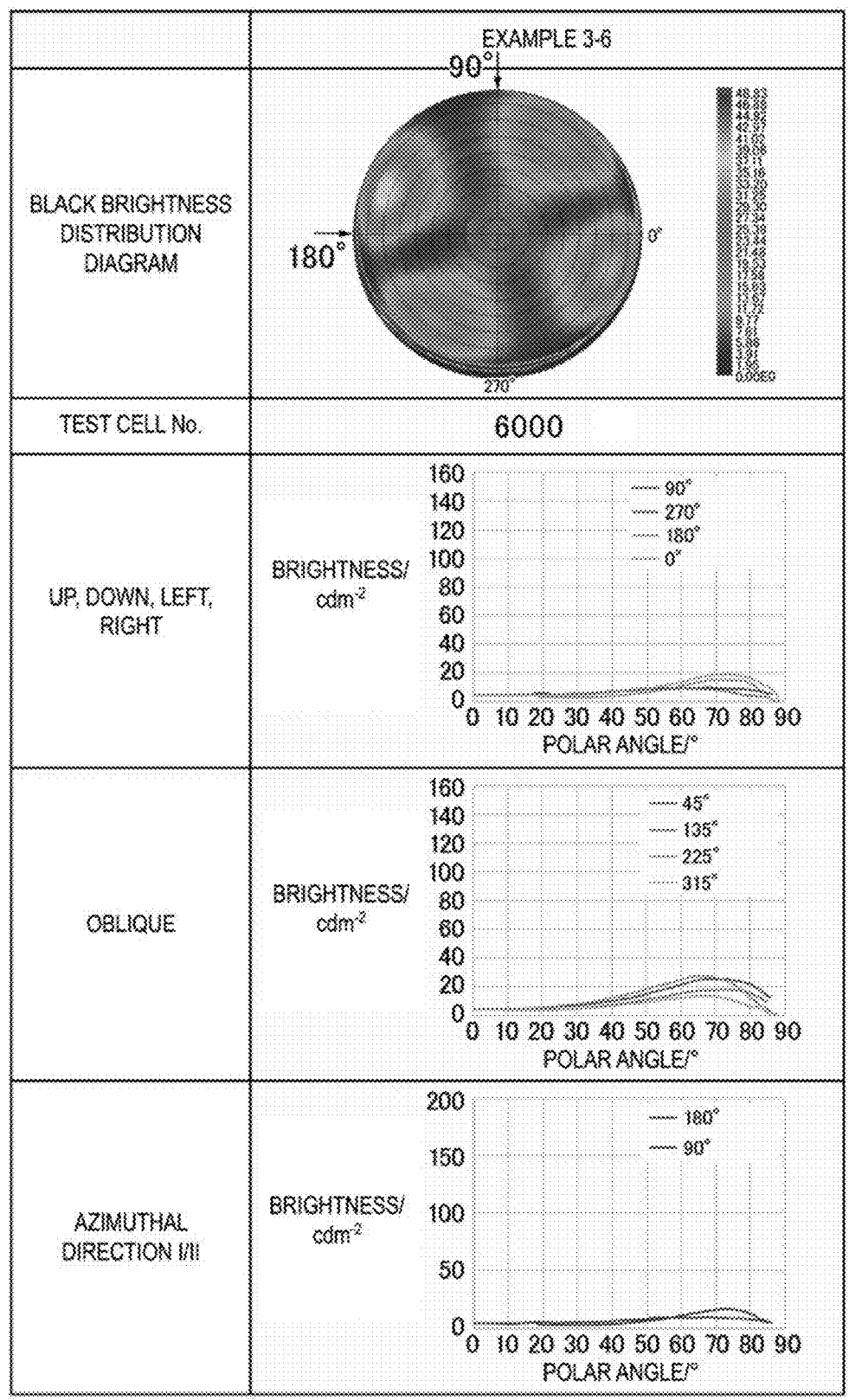
FIG. 33D is a diagram depicting results of Verification Example 3.
Figure 34A:
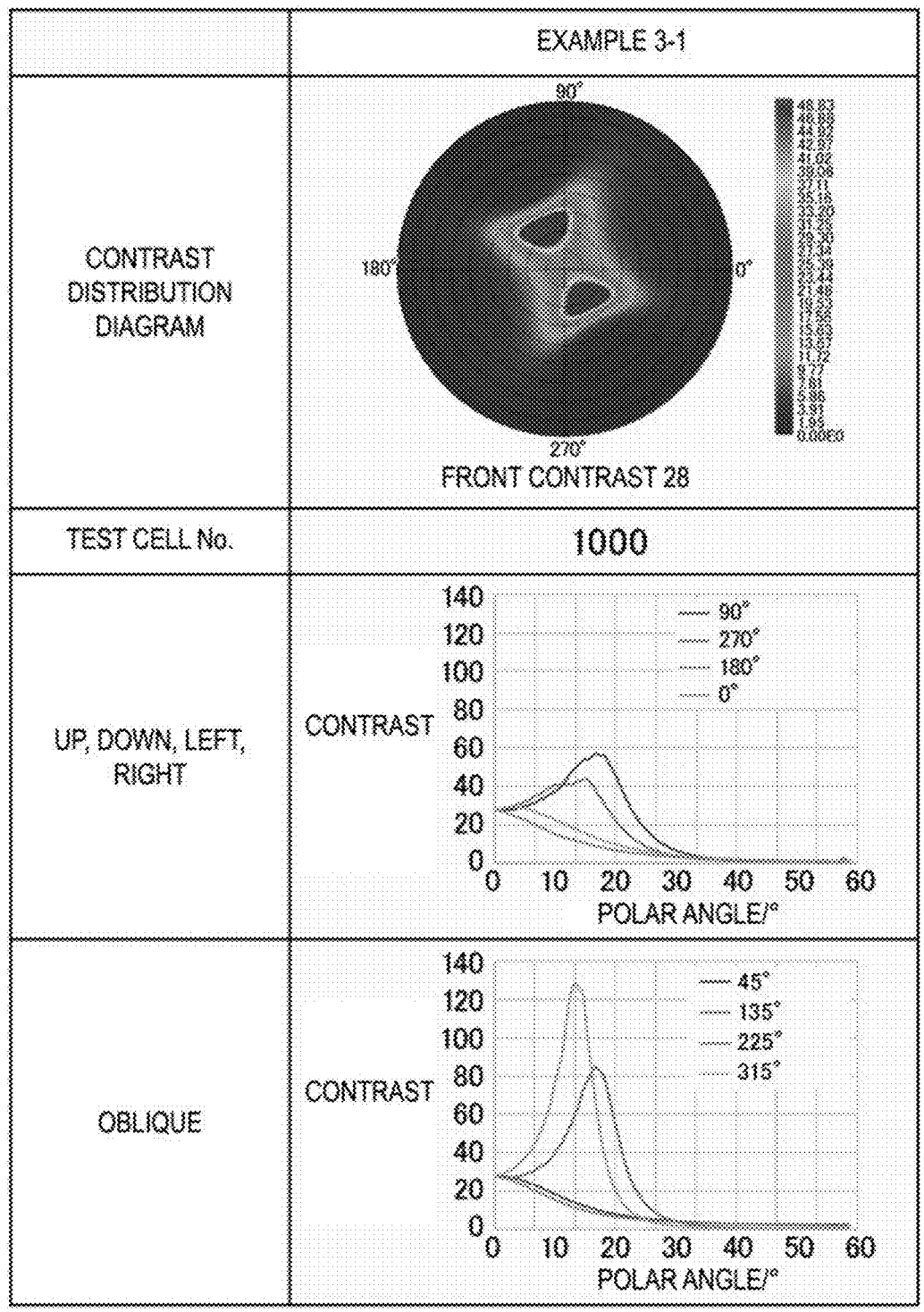
FIG. 34A is a diagram depicting results of Verification Example 3.
Figure 34B:
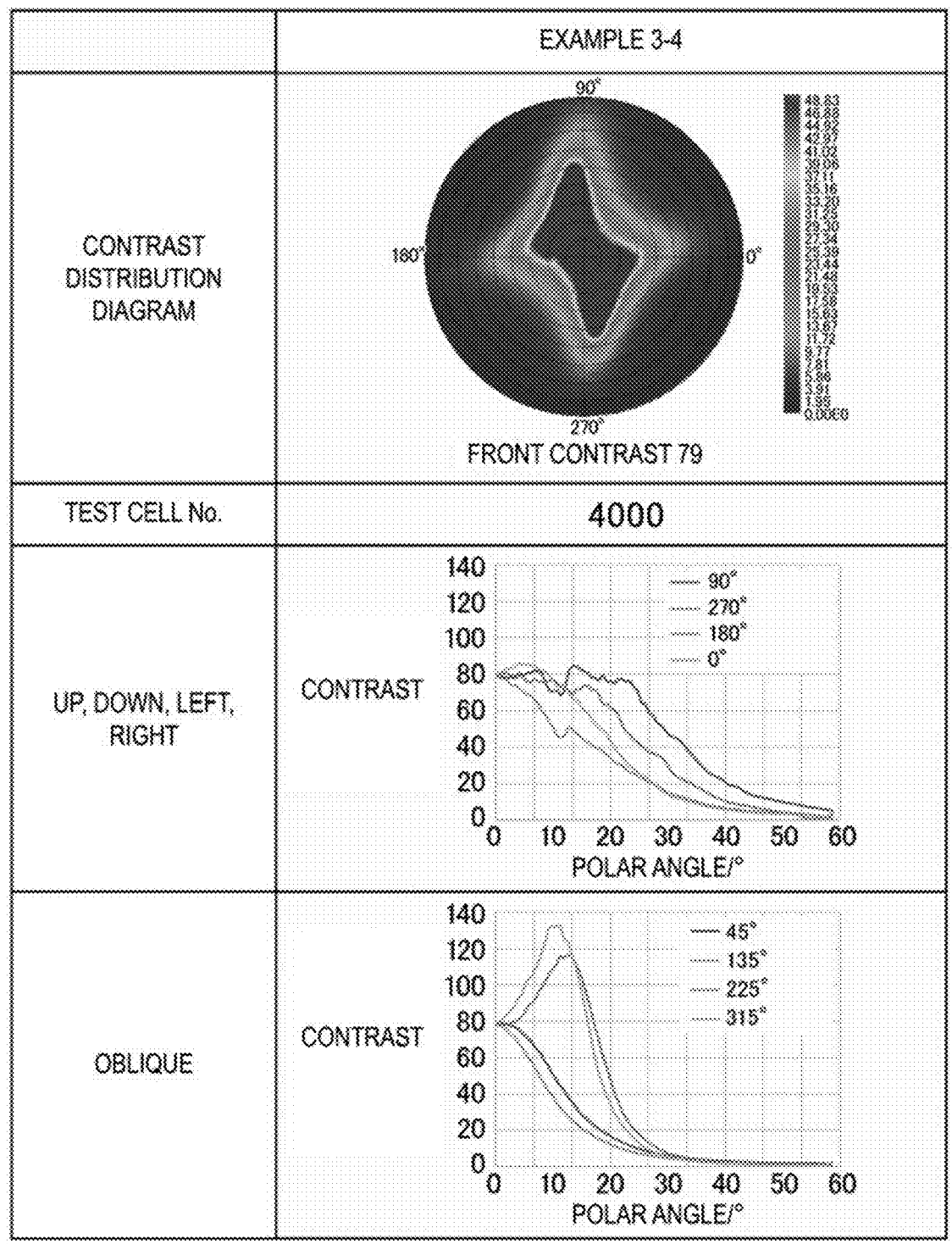
FIG. 34B is a diagram depicting results of Verification Example 3.
Figure 34C:
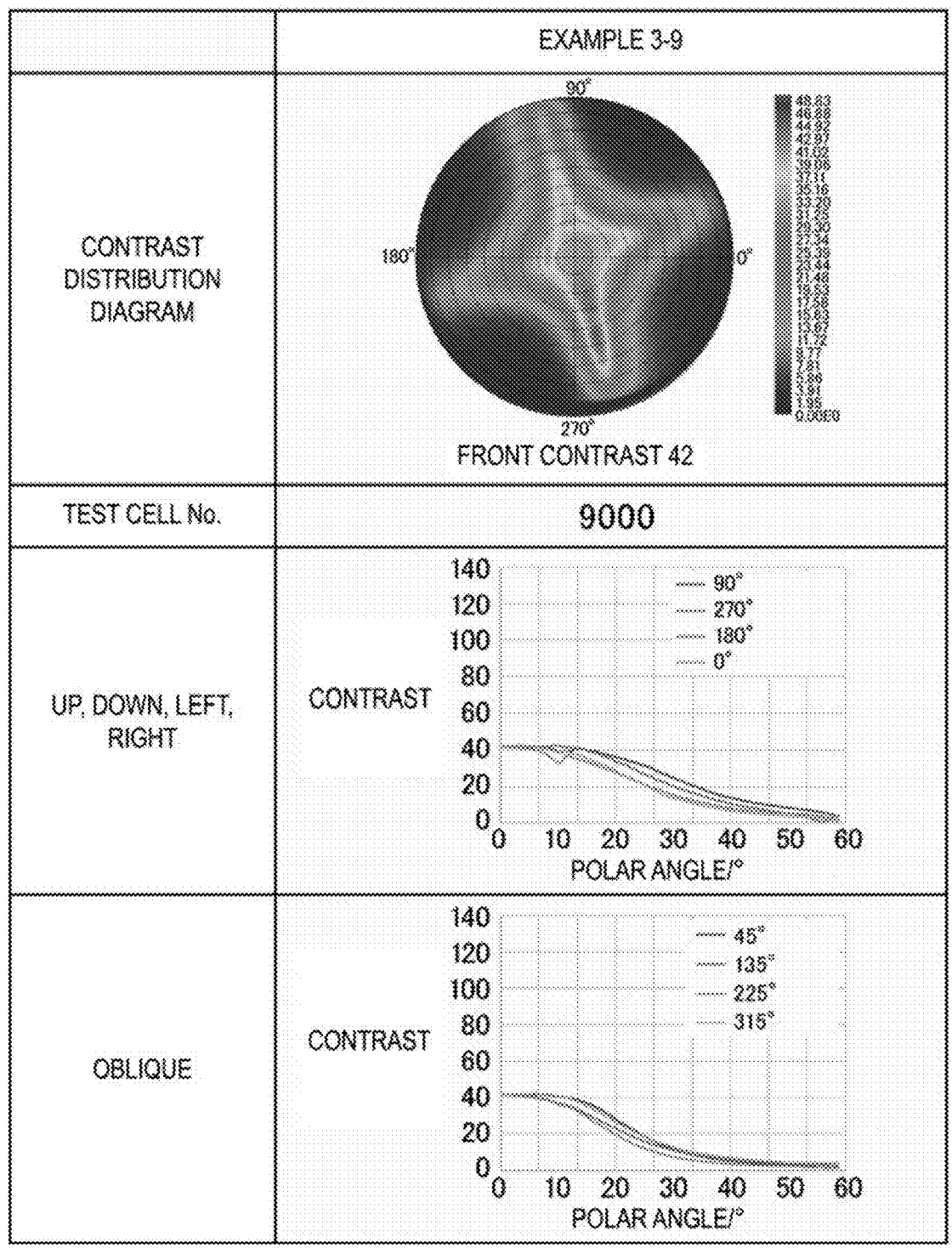
FIG. 34C is a diagram depicting results of Verification Example 3.
Figure 34D:
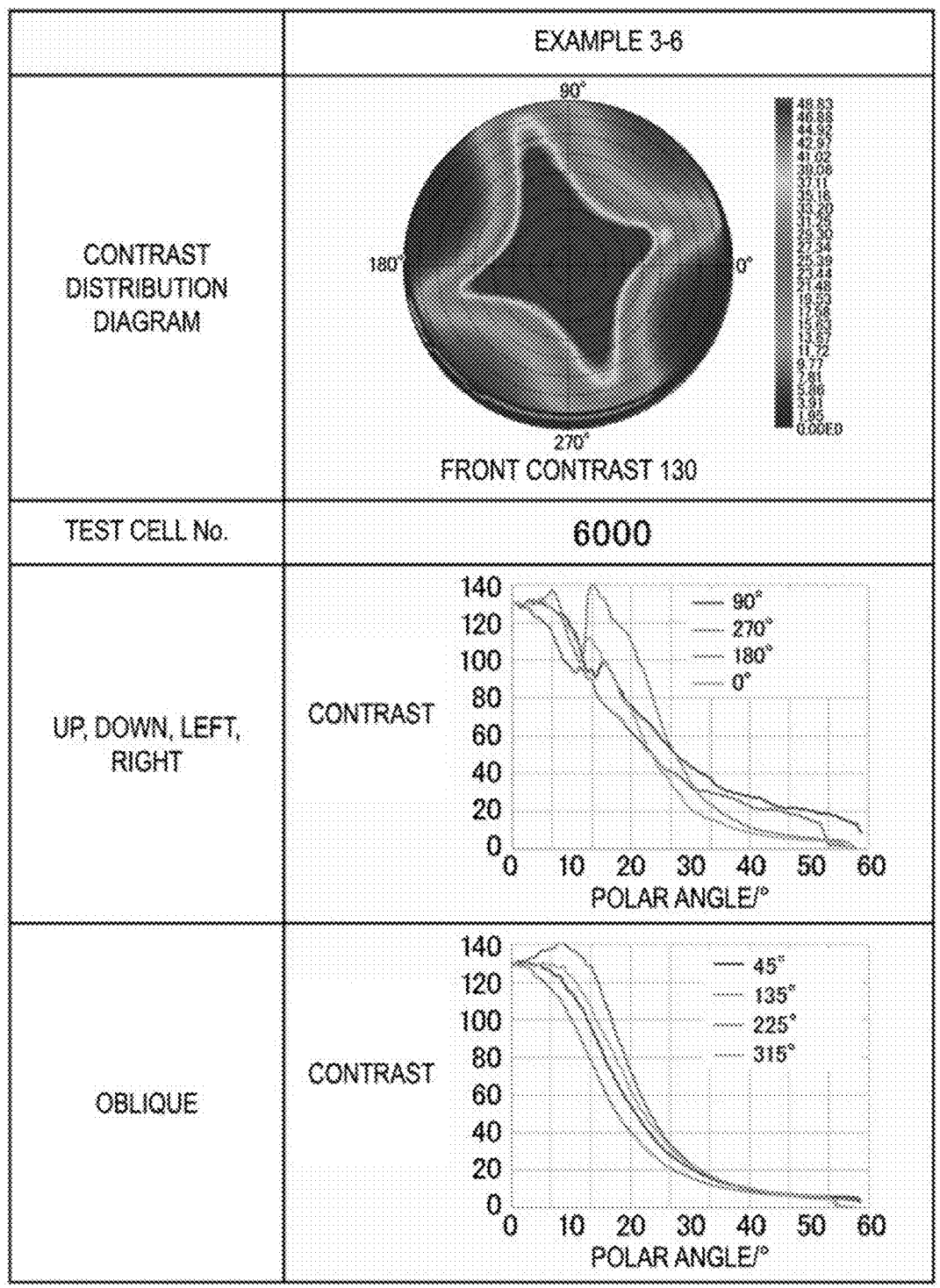
FIG. 34D is a diagram depicting results of Verification Example 3.
Figure 35A:
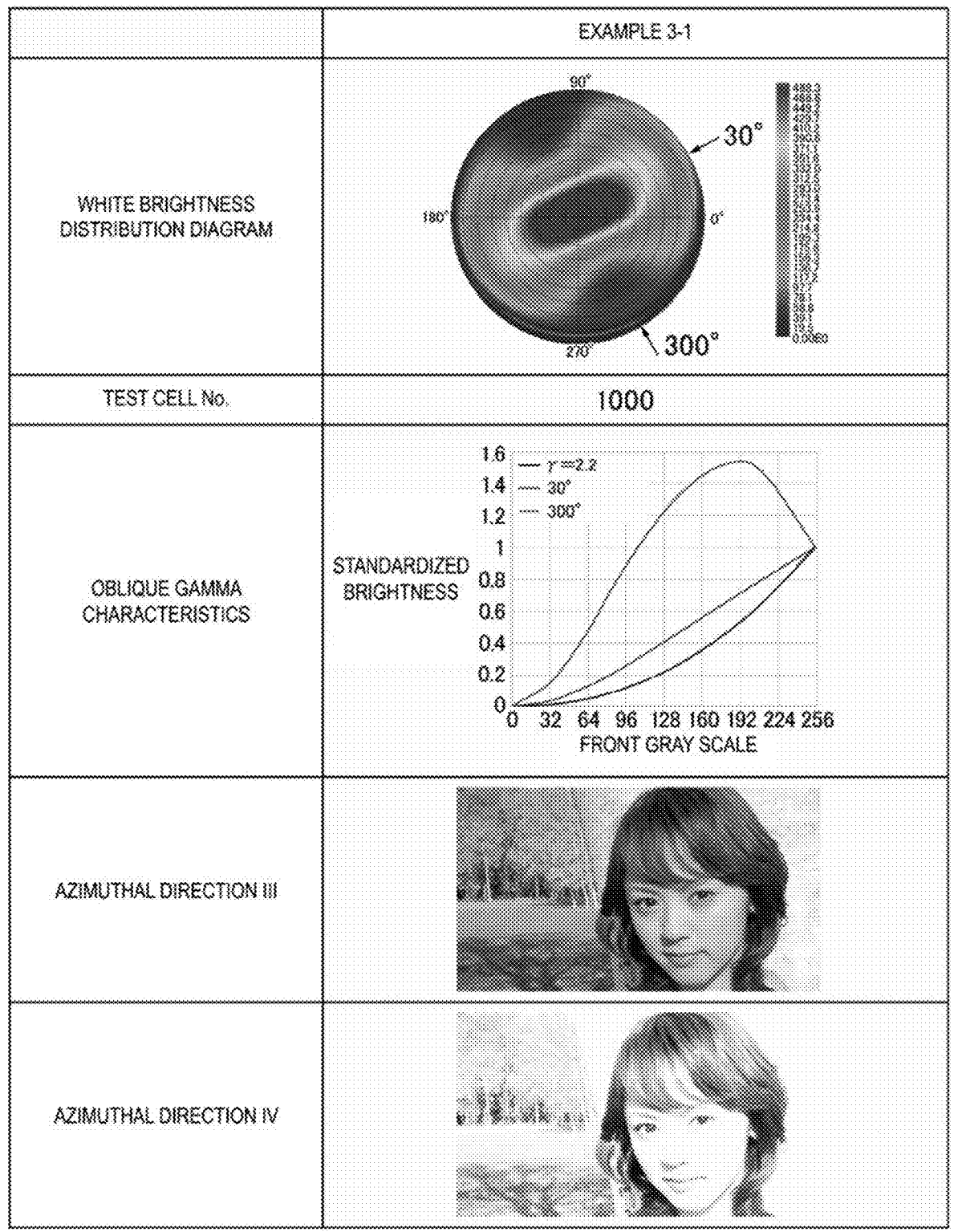
FIG. 35A is a diagram depicting results of Verification Example 3.
Figure 35B:
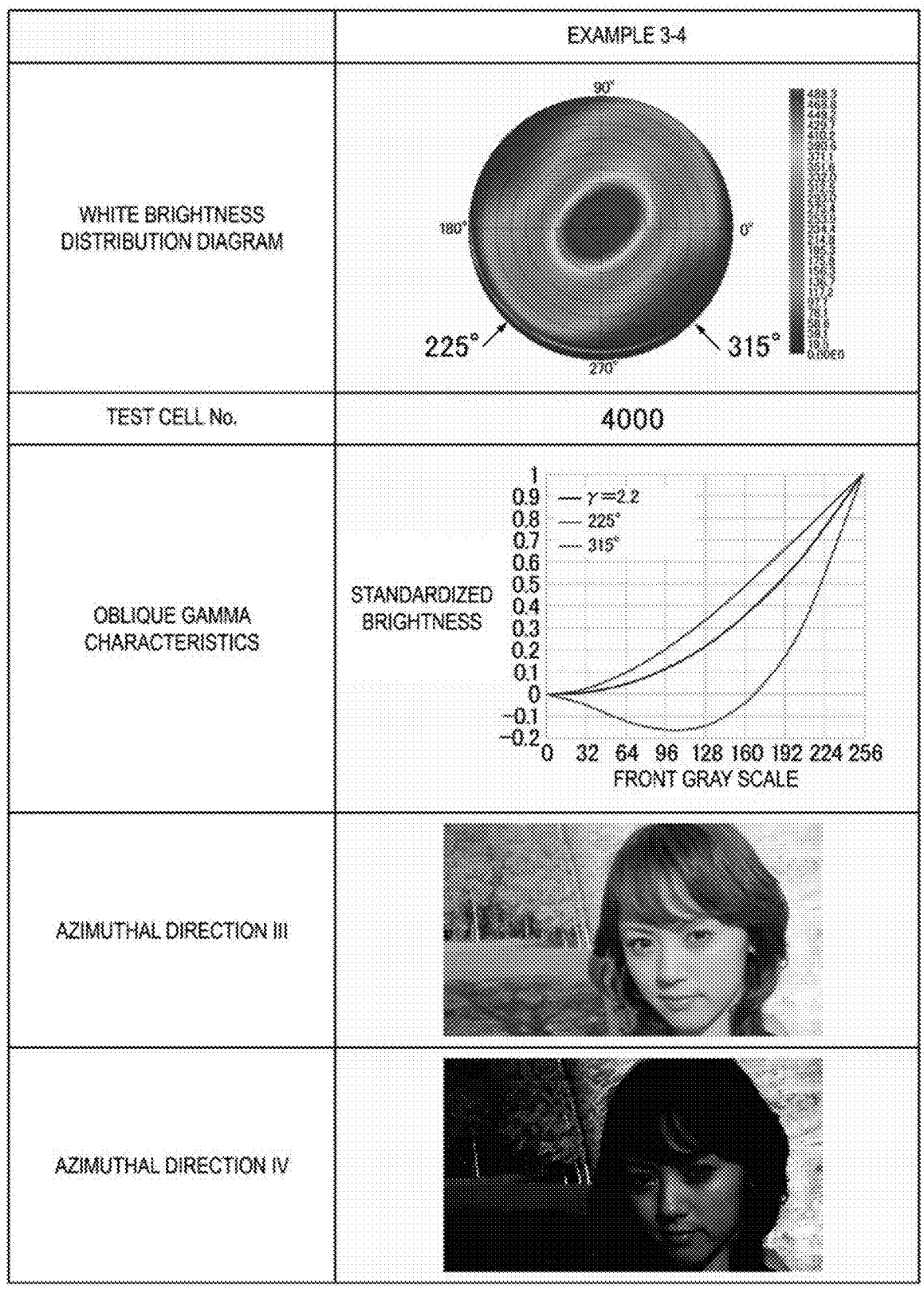
FIG. 35B is a diagram depicting results of Verification Example 3.
Figure 35C:
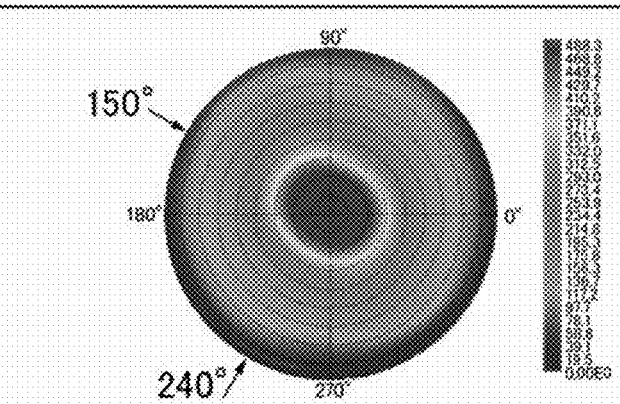
FIG. 35C is a diagram depicting results of Verification Example 3.
Figure 35C:
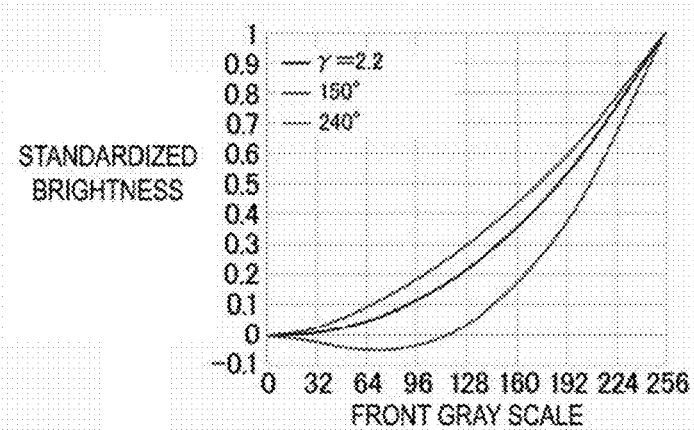
Figure 35C:
Figure 35C:
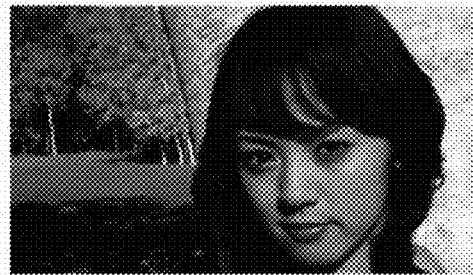
Figure 35D:
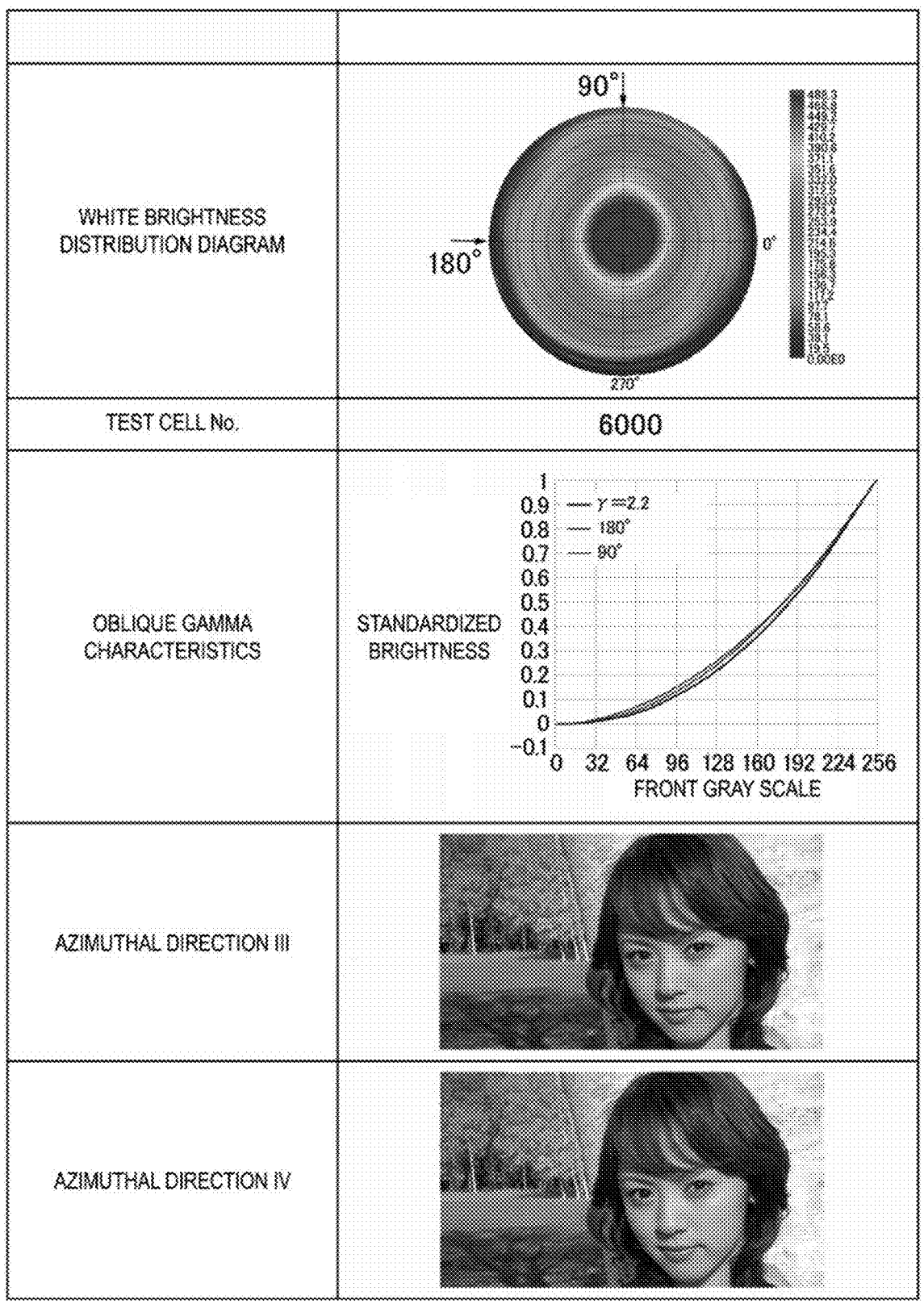
FIG. 35D is a diagram depicting results of Verification Example 3.
Figure 36A:
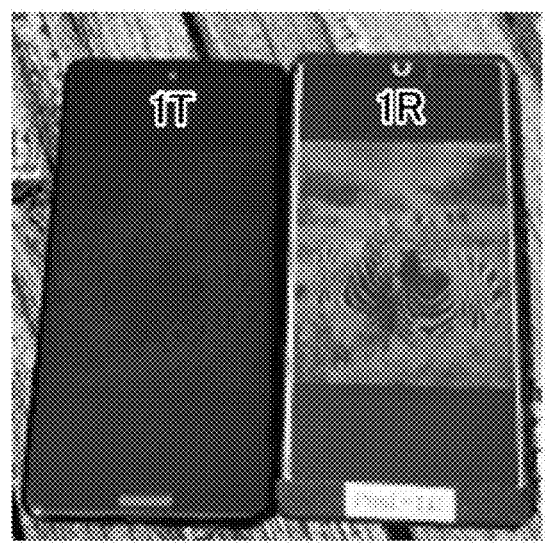
FIG. 36A is an observation photograph when an image is displayed by each of a transmissive liquid crystal display device 1T and a reflective liquid crystal display device 1R outdoors under direct sunlight.
Figure 36B:
FIG. 36B is an observation photograph when an image is displayed by each of the transmissive liquid crystal display device 1T and the reflective liquid crystal display device 1R indoors.

Mode Image simulation when a display screen was viewed from each of the azimuthal direction III and the azimuthal direction IV obtained from the distribution diagrams of FIG. 30A to FIG. 30C was carried out. Specifically, a color source image was set as a front view image (also referred to as an original image), and the original image was converted in accordance with a γ curve at each azimuth angle and a polar angle of 50°. The results are depicted in FIG. 30A to FIG. 30C. For comparison, the front view image is depicted in FIG. 31.

From FIG. 30A to FIG. 30C, it was found that the display quality of the image in the oblique view was most favorable in Example 3-9 and favorable in Example 3-4 (and Example 3-6), but was poor in Example 3-1. From the viewpoints of a film cost, a production yield, and the like, Example 3-4 using the test cell 4000 (and Example 3-6 using the test cell 6000) are most effective.

(1) Viewing Angle Characteristics of White Display in Transmission Mode

With respect to each test cell, a distribution diagram of transmissive brightness at a gray scale of 255 level of white display was measured using "EZContrast" manufactured by ELDIM. Taking the three o'clock direction on the clock as 0°, the azimuthal directions of the brightness characteristics graph were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. The brightness characteristics of the azimuthal direction I where the white brightness distribution was widest and the brightness characteristics of the azimuthal direction II where the white brightness distribution was narrowest were each plotted in a graph. The results are depicted in FIG. 32A to FIG. 32D. FIG. 32A to FIG. 32D are diagrams depicting the results of Verification Example 3.

From the white brightness distribution diagram in each drawing, the azimuthal direction I is 30° and the azimuthal direction II is 300° in Example 3-1, the azimuthal direction I is 225° and the azimuthal direction II is 315° in Example 3-4, the azimuthal direction I is 150° and the azimuthal direction II is 240° in Example 3-9, and the azimuthal direction I is 180° and the azimuthal direction II is 90° in Example 3-6. In each distribution diagram, a value of the center portion is 500 or more.

From FIG. 32A to FIG. 32D, it was found that the viewing angle characteristics of white display in the transmission mode were most favorable in Example 3-6, the second most favorable in Example 3-9, and the third most favorable in Example 3-4, but were poor in Example 3-1. From the viewpoints of the film cost, the production yield, and the like, Example 3-4 using the test cell 4000 is most effective.

(m) Viewing Angle Characteristics of Black Display in Transmission Mode

For each test cell, taking the three o'clock direction on the clock as 0°, the azimuthal directions of the brightness characteristics graph obtained by measuring the distribution diagram of the transmissive brightness at a gray scale of 0 level of black display with "EZContrast" manufactured by ELDIM were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. The brightness characteristics of the azimuthal direction I where the black brightness distribution was widest and the brightness characteristics of the azimuthal direction II where the black brightness distribution was narrowest were each plotted in a graph. The results are depicted in FIG. 33A to FIG. 33D. FIG. 33A to FIG. 33D are diagrams depicting the results of Verification Example 3.

From the black brightness distribution diagram in each drawing, the azimuthal direction I is 30° and the azimuthal direction II is 300° in Example 3-1, the azimuthal direction I is 225° and the azimuthal direction II is 315° in Example 3-4, the azimuthal direction I is 150° and the azimuthal direction II is 240° in Example 3-9, and the azimuthal direction I is 180° and the azimuthal direction II is 90° in Example 3-6. In each distribution diagram, a value of the center portion is 50 or more.

From FIG. 33A to FIG. 33D, it was found that the viewing angle characteristics of black display in the transmission mode were most favorable in Example 3-6, the second most favorable in Example 3-9, and the third most favorable in Example 3-4, but were poor in Example 3-1. From the viewpoints of the film cost, the production yield, and the like, Example 3-4 using the test cell 4000 is most effective.

(n) Contrast Characteristics in Transmission Mode

For each test cell, the distribution of contrast in the transmission mode was obtained from the white brightness distribution diagram and the black brightness distribution diagram. Specifically, the brightness ratio (white display brightness/black display brightness) was obtained at each azimuth angle and a polar angle. Taking the three o'clock direction on the clock as 0°, the azimuthal directions of the brightness characteristics graph were as follows: the upward direction was an azimuthal direction of 90°, the downward direction was an azimuthal direction of 270°, the leftward direction was an azimuthal direction of 180°, the rightward direction was an azimuthal direction of 0°, and the oblique directions were respectively azimuthal directions of 45°, 135°, 225°, and 315°. The results are depicted in FIG. 34A to FIG. 34D. FIG. 34A to FIG. 34D are diagrams depicting the results of Verification Example 3.

From FIG. 34A to FIG. 34D, it was found that the contrast characteristics in the transmission mode were most favorable in Example 3-6, the second most favorable in Example 3-9, and the third most favorable in Example 3-4, but were poor in Example 3-1. In Example 3-6, the vertical and horizontal viewing angle balance is best. In each contrast distribution diagram, a value of the center portion is 50 or more.

(o) Viewing Angle Characteristics (Oblique γ Characteristics) in Transmission Mode With respect to each test cell, a distribution diagram of transmissive brightness from a gray scale of 255 level of white display to a gray scale of 0 level of black display was measured every 32 levels using "EZContrast" manufactured by ELDIM. As a typical example, a distribution diagram of transmissive brightness at a gray scale 255 level of white display is depicted. A γ curve was calculated from the results of predetermined gray scales (255, 224, 192, 160, 128, 96, 64, 32, 0). From the obtained distribution diagram, an azimuthal direction III where the gray scale is higher than that of the front (γ=2.2) and an azimuthal direction IV where the gray scale is lower than that of the front (γ=2.2) or unique characteristics are exhibited were obtained, and then the γ curve was analyzed at a polar angle of 50° in these azimuthal directions. In the graph of the oblique γ characteristics, the horizontal axis represents the gray scale (0 to 255 level) in the front view, and the vertical axis represents the standardized brightness. The front was corrected to γ=2.2. The results are depicted in FIG. 35A to FIG. 35D. FIG. 35A to FIG. 35D are diagrams depicting the results of Verification Example 3.

From the white brightness distribution diagram in each drawing, the azimuthal direction III is 30° and the azimuthal direction IV is 300° in Example 3-1, the azimuthal direction III is 225° and the azimuthal direction IV is 315° in Example 3-4, the azimuthal direction III is 150° and the azimuthal direction IV is 240° in Example 3-9, and the azimuthal direction III is 180° and the azimuthal direction IV is 90° in Example 3-6. Each angle represents an angle of the azimuth direction when the three o'clock direction on the clock is taken as 0°.

(p) Viewing Angle Characteristics (Image Simulation) in Reflection Mode

Image simulation when a display screen was viewed from each of the azimuthal direction III and the azimuthal direction IV obtained from the distribution diagrams of FIG. 35A to FIG. 35D was carried out. Specifically, a color source image was set as a front view image (also referred to as an original image), and the original image was converted in accordance with a γ curve at each azimuth angle and a polar angle of 50°. The results are depicted in FIG. 35A to FIG. 35D. For comparison, the front view image is depicted in FIG. 31.

From FIG. 35A to FIG. 35D, it was found that the display quality of the image in the oblique view was most favorable in Example 3-6, the second most favorable in Example 3-9, and the third most favorable in Example 3-4, but was poor in Example 3-1. From the viewpoints of the film cost, the production yield, and the like, Example 3-4 using the test cell 4000 is most effective.

Each aspect of the disclosure described above may be combined as appropriate without departing from the gist of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transflective liquid crystal display device comprising a liquid crystal display device provided with a plurality of pixels, the liquid crystal display device comprising:
  a first polarizer; a first phase difference layer; a first substrate; a liquid crystal layer; a second substrate; a second phase difference layer; and a second polarizer in this order from a back face side toward an observation face side,
  wherein the first substrate includes a reflective layer, a pair of electrodes configured to generate a transverse electrical field in the liquid crystal layer, and a first horizontal alignment film in contact with the liquid crystal layer,
  the second substrate includes a second horizontal alignment film in contact with the liquid crystal layer,
  the first phase difference layer includes a first λ/2 plate and a first λ/4 plate that are arranged in this order from the back face side,
  the second phase difference layer includes a second λ/2 plate, a first positive C plate, and a second λ/4 plate that are arranged in this order from the observation face side,
  the liquid crystal layer includes a liquid crystal material having a negative-type anisotropy of dielectric constant and takes a twist alignment when no voltage is applied, and
  each of the plurality of pixels includes a reflective region in which light from the observation face side is reflected by the reflective layer to perform display and a transmissive region in which light from the back face side is transmitted to perform display.

2. The transflective liquid crystal display device according to claim 1,
wherein a second positive C plate is located between the first polarizer and the first λ/2 plate, and
a third positive C plate is located between the first λ/2 plate and the first λ/4 plate.

3. The transflective liquid crystal display device according to claim 2, wherein a fourth positive C plate is located between the second λ/2 plate and the second polarizer.

4. The transflective liquid crystal display device according to claim 2,
wherein an absolute value of a thickness-direction phase difference of the second positive C plate is 50 to 130 nm.

5. The transflective liquid crystal display device according to claim 1,
wherein in-plane phase differences of the first λ/2 plate and the second λ/2 plate are substantially the same, and
in-plane phase differences of the first λ/4 plate and the second λ/4 plate are substantially the same.

6. The transflective liquid crystal display device according to claim 1,
wherein an absolute value of a thickness-direction phase difference of the first positive C plate is 150 to 270 nm.

7. The transflective liquid crystal display device according to claim 1,
wherein a twist angle of the liquid crystal layer, when no voltage is applied, is 70° or greater and 85° or less.

8. The transflective liquid crystal display device according to claim 1,
wherein a product of a thickness of the liquid crystal layer and a birefringence index of a liquid crystal material forming the liquid crystal layer is 218 nm or more and 255 nm or less.

9. The transflective liquid crystal display device according to claim 1,
wherein in a case that an alignment direction of a liquid crystal molecule defined by the first horizontal alignment film is taken as 0° and a twist direction is set as a positive angle,
a polarization axis of the first polarizer, an in-plane slow axis of the first λ/2 plate, and an in-plane slow axis of the first λ/4 plate are located at angles of 33.6° to 40.2°, 48.8° to 52.1°, and −74.8° to −68.2°, respectively.

10. The transflective liquid crystal display device according to claim 1,
wherein in a case that an alignment direction of a liquid crystal molecule defined by the first horizontal alignment film is taken as 0° and a twist direction is set as a positive angle,
a polarization axis of the second polarizer, an in-plane slow axis of the second λ/2 plate, and an in-plane slow axis of the second λ/4 plate are located at angles of −69.5° to −64.0°, −51.5° to −47.5°, and −26.9° to −22.9°, respectively.

11. The transflective liquid crystal display device according to claim 1,
wherein at least one of the pair of electrodes includes a plurality of belt-shaped portions and a slit located between two belt-shaped portions adjacent to each other among the plurality of belt-shaped portions.

12. The transflective liquid crystal display device according to claim 11,
wherein in a case that a direction in which the plurality of belt-shaped portions extends is taken as 0°, an alignment direction of a liquid crystal molecule defined by the first horizontal alignment film is in a range from −30° to 30°.

13. The transflective liquid crystal display device according to claim 11,
wherein a direction in which the plurality of belt-shaped portions extends in the reflective region and a direction in which the plurality of belt-shaped portions extends in the transmissive region are parallel to each other.

14. The transflective liquid crystal display device according to claim 1,
wherein the liquid crystal layer has a single domain alignment.

15. The transflective liquid crystal display device according to claim 1,
further performing display in a normally black mode.

16. The transflective liquid crystal display device according to claim 1,
wherein one of the pair of electrodes is a pixel electrode provided in each of the plurality of pixels and the other one of the pair of electrodes is a common electrode including a plurality of segments, each configured to function as a touch sensor electrode, and
the first substrate further includes a plurality of touch wiring lines, each connected to a corresponding one of the touch sensor electrodes.

17. The transflective liquid crystal display device according to claim 1, further comprising a light source.

18. The transflective liquid crystal display device according to claim 1,
wherein a thickness of a portion of the liquid crystal layer in the reflective region and a thickness of another portion of the liquid crystal layer in the transmissive region are the same.

* * * * *